US012712787B2

(12) United States Patent
Khan et al.

(10) Patent No.: US 12,712,787 B2
(45) Date of Patent: Aug. 18, 2026

(54) POWER CONSUMPTION FORECASTING AND MAINTENANCE WINDOW DETERMINATION FOR MAINTENANCE OF DATA CENTERS

(71) Applicant: Microsoft Technology Licensing, LLC, Redmond, WA (US)

(72) Inventors: Hassan Ali Khan, Redmond, WA (US); Nithish Mahalingam, Campbell, CA (US); Kyle Woolcock, Redmond, WA (US); Ahmed Mohamed Saad Abdelmaksoud, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 112 days.

(21) Appl. No.: 18/932,371

(22) Filed: Oct. 30, 2024

(65) Prior Publication Data

US 2025/0373502 A1 Dec. 4, 2025

Related U.S. Application Data

(60) Provisional application No. 63/655,345, filed on Jun. 3, 2024.

(51) Int. Cl.
*H04L 41/149* (2022.01)
*H04L 41/16* (2022.01)

(52) U.S. Cl.
CPC ............ *H04L 41/149* (2022.05); *H04L 41/16* (2013.01)

(58) Field of Classification Search
CPC .............................. H04L 41/149; H04L 41/16
See application file for complete search history.

(56) References Cited

U.S. PATENT DOCUMENTS

2021/0004000 A1* 1/2021 Kalaskar ............. G06F 9/45545
2024/0345886 A1* 10/2024 Thirumalachar ... G06F 11/3006

FOREIGN PATENT DOCUMENTS

JP 3468602 B2 * 11/2003

OTHER PUBLICATIONS

Khan, et al., "Characterizing Power Usage in Zero Reserved Power Data Centers to Enable Planned Maintenance", In 2024 IFIP Networking Conference, Jun. 3, 2024, pp. 59-67.

(Continued)

*Primary Examiner* — Soe Hlaing
(74) *Attorney, Agent, or Firm* — Weaver IP L.L.C.

(57) ABSTRACT

Systems, methods, and techniques described herein relate to forecasting power consumption for maintenance of data centers. In an aspect, a maintenance window request for a requested maintenance task with respect to a data center is received. A machine learning (ML) model utilized to generate a window recommendation result, the model trained to determine a period of time where the task's impact on performance of the data center satisfies an impact criterion. The window recommendation result comprising a window indicating a period of time wherein impact of the requested maintenance task satisfies the impact criterion. Performance of the maintenance task is to be performed during the window. In an alternative aspect, the ML model is trained to forecast power consumption of a data center in a period of time. In this alternative, a maintenance window determiner determines the window recommendation result based on a power consumption forecast of the ML model.

20 Claims, 16 Drawing Sheets

(56) References Cited

OTHER PUBLICATIONS

"XGBoost-PyPI," accessed on: https://pypi.org/project/xgboost/, Retrieved on: Aug. 10, 2024, 5 pages.
Alharbi, et al., "A seasonal autoregressive integrated moving average with exogenous factors (SARIMAX) forecasting model-based time series approach." Inventions, vol. 7, Issue No. 94, Oct. 16, 2022, 21 pages.
Borkowski, et al., "Predicting cloud resource utilization," In Proceedings of the 9th International Conference on Utility and Cloud Computing, 2016, 6 pages.
Cao, et al., "Analyzing the power consumption of the mobile page load," In Proceedings of the 2016 ACM SIGMETRICS International Conference on Measurement and Modeling of Computer Science, 2016, pp. 369-370.
Chen, et al., "XGBoost: A Scalable Tree Boosting System", Proceedings of the 22nd ACM sigkdd international conference on knowledge discovery and data mining, Aug. 2016, pp. 785-794.
Cokelaer, Thomas., "Fitter 1.7.0 documentation," retrieve from: https://fitter.readthedocs.io/en/latest/, 2019.
Deepika, et al., "Power consumption prediction in cloud data center using machine learning," Int. J. Electr. Comput. Eng. (IJECE), vol. 10, Issue No. 2, 2020, pp. 1524-1532.
Flores, et al., "Autocorrelation and partial autocorrelation functions to improve neural networks models on univariate time series forecasting," In The 2012 International joint conference on neural networks (IJCNN), Jun. 2012, 8 pages.
Fu, et al., "On the use of {ML} for blackbox system performance prediction," In 18th USENIX Symposium on Networked Systems Design and Implementation (NSDI 21), 2021, pp. 763-784.
Ince, et al., "A statistical framework for neuroimaging data analysis based on mutual information estimated via a gaussian copula," Human brain mapping, vol. 38, Issue No. 3, 2017, pp. 1541-1573.
Khan, et al., "RMS: Removing Barriers to Analyze the Availability and Surge Pricing of Ridesharing Services," In Proceedings of the 2022 CHI Conference on Human Factors in Computing Systems, 2022, pp. 1-18.
Kim, et al., "An approach to sensor network throughput enhancement by PHY-aided MAC," IEEE Transactions on Wireless Communications, vol. 14, Issue No. 2, Feb. 2015, pp. 670-684.
Liang, et al., "Power consumption model based on feature selection and deep learning in cloud computing scenarios," IET Communications, vol. 14, Issue No. 10, 2020, pp. 1610-1618.
Lin, et al., "An adaptive workload-aware power consumption measuring method for servers in cloud data centers," Computing, vol. 105, May 27, 2020, 24 pages.
Methot, Laura L., "Autocorrelation in single-subject data: a meta-analytic view," Western Michigan University, 1995, pp. 1-120.
Mushtaq, Rizwan., "Testing Time Series Data for Stationarity, Augmented Dickey Fuller Test," retrieve from: https://papers.ssrn.com/sol3/papers.cfmabstract_id=1911068, 2011, 19 pages.
Rovetta, Alessandro., "Raiders of the Lost Correlation: A Guide on Using Pearson and Spearman Coefficients to Detect Hidden Correlations in Medical Sciences," In Cureus, 2020, vol. 12, Issue No. 1, 7 pages.
Roy, et al., "Reliable energy consumption modeling for an electric vehicle fleet," In Proceedings of the 5th ACM SIGCAS/SIGCHI Conference on Computing and Sustainable Societies, 2022, pp. 29-44.
Ruiz, et al., "Energy consumption modeling by machine learning from daily activity metering in a hospital," In 2017 22nd IEEE International Conference on Emerging Technologies and Factory Automation (ETFA), 2017, pp. 1-7.
Sherstinsky, Alex., "Fundamentals of recurrent neural network (RNN) and long short-term memory (LSTM) network," Physica D: Nonlinear Phenomena 404, vol. 404, Mar. 2020, pp. 1-43.
Yeung, et al., "Towards {GPU} utilization prediction for cloud deep learning," In 12th USENIX Workshop on Hot Topics in Cloud Computing (HotCloud 20), 2020, pp. 1-9.
Zhang, et al., "Short-term traffic flow prediction based on LSTM-XGBoost combination model," Computer Modeling in Engineering & Sciences, vol. 125, Issue No. 1, 2020, pp. 95-109.
Zhang, et al., "Flex: High-Availability Datacenters with Zero Reserved Power", ACM/IEEE 48th Annual International Symposium on Computer Architecture (ISCA), Jun. 2021, 14 pages.
Zhao, et al., "Feature selection for predicting building energy consumption based on statistical learning method," Journal of Algorithms & Computational Technology, vol. 6, Issue No. 1, 2012, pp. 59-76.

* cited by examiner

400A

402 Receive power consumption data associated with the data center

404 Does an ML model exist for the datacenter?

NO

YES

412 Evaluate a precision of the ML model

414 Does the precision satisfy a model precision criterion?

NO

YES

406 Determine a time series dataset based on the power consumption data, the time series data set indicating power consumed by the data center over time 408 Generate the ML model based on the time series dataset 410 Evaluate the ML model 416 Update the ML model based on the received power consumption data

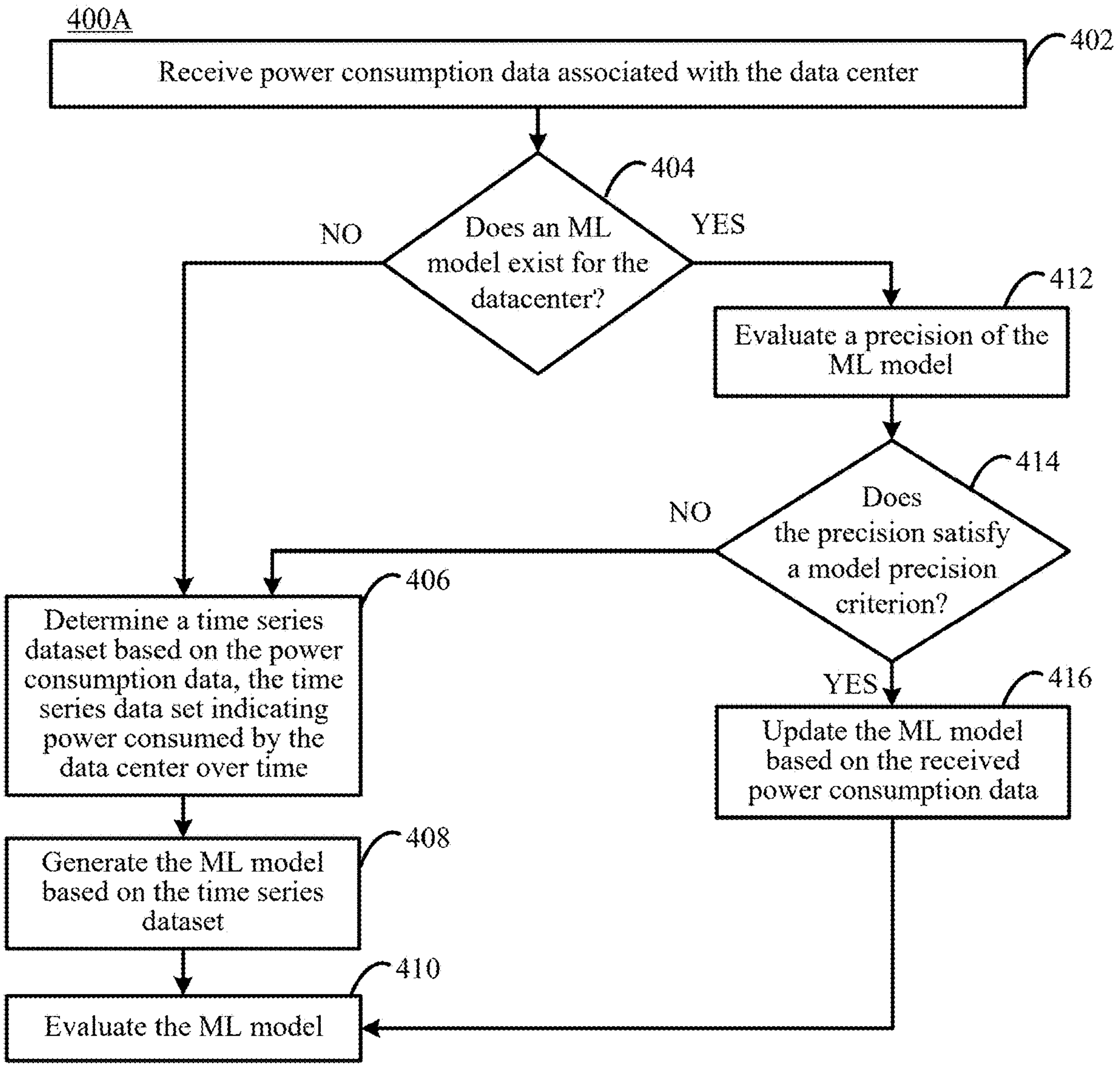

FIG. 4A

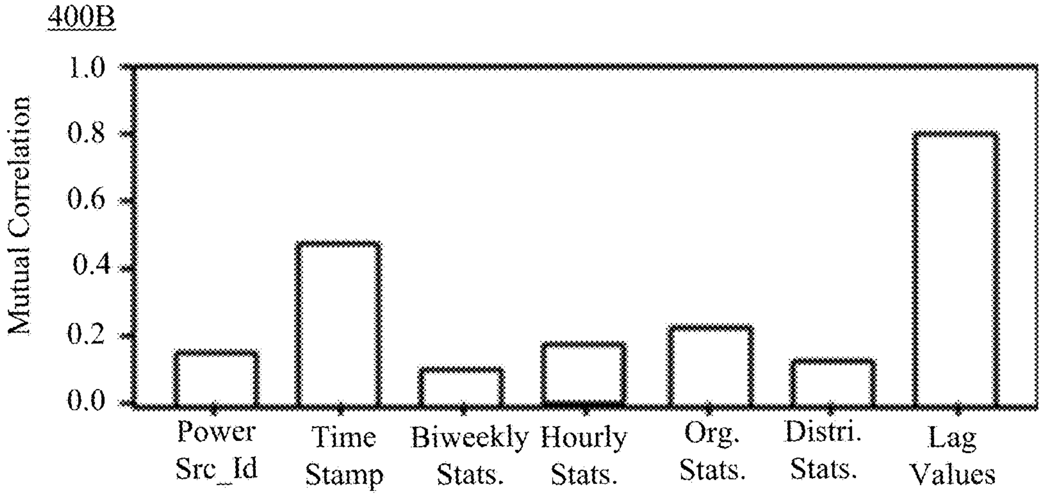

The first value of the maximum power is determined to be zero based on the power consumption data not including data for the first interval

602

1000

Perform the requested maintenance task during the first window — 1002

Prior to performing the requested maintenance task, migrate data stored by the first server of the data center to a second server of the data center — 1102

Provide the ML model with a range of dates the requested maintenance task is to be performed within — 1202

↓

Cause the ML model to determine forecasted power consumption data for the data center at a set of intervals within the range of dates — 1204

↓

Receive, from the ML model, a forecast of power consumption for a power cell — 1206

↓

Determine, based on the forecast of power consumption, the window prediction result comprising the first window, the first window within the range of dates — 1208

Cause the ML model to determine the forecasted power consumption prior to the maintenance window predictor receiving the maintenance window request — 1302

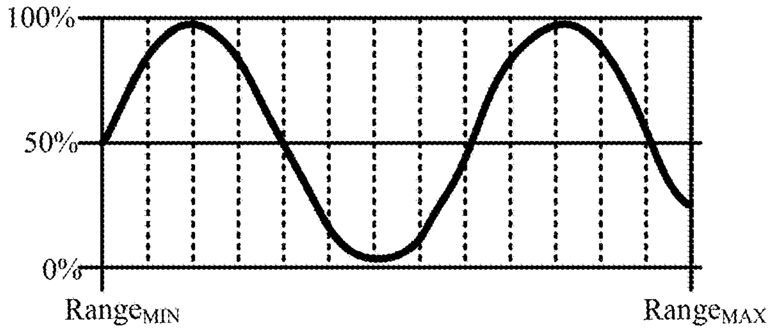

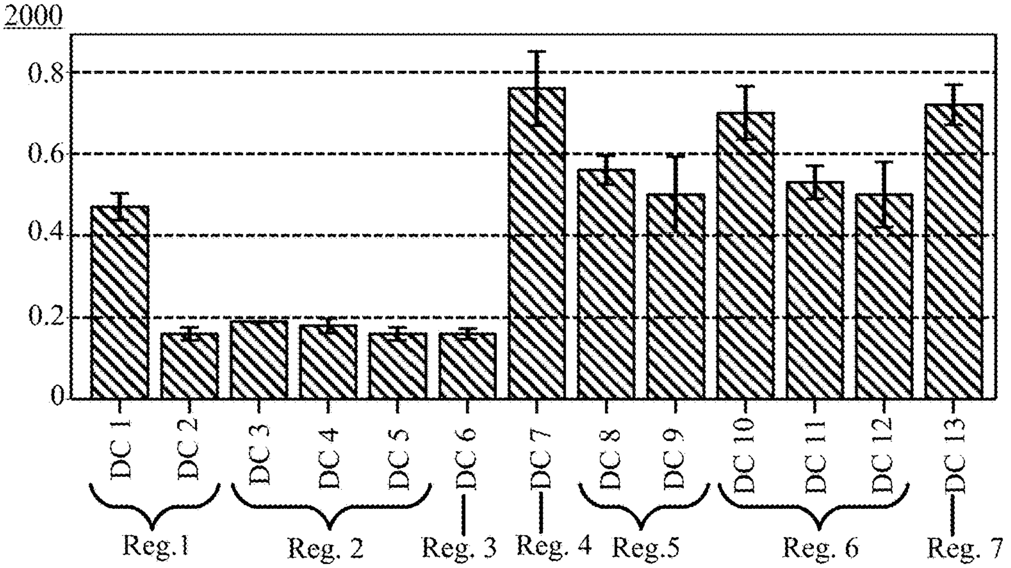
FIG. 20
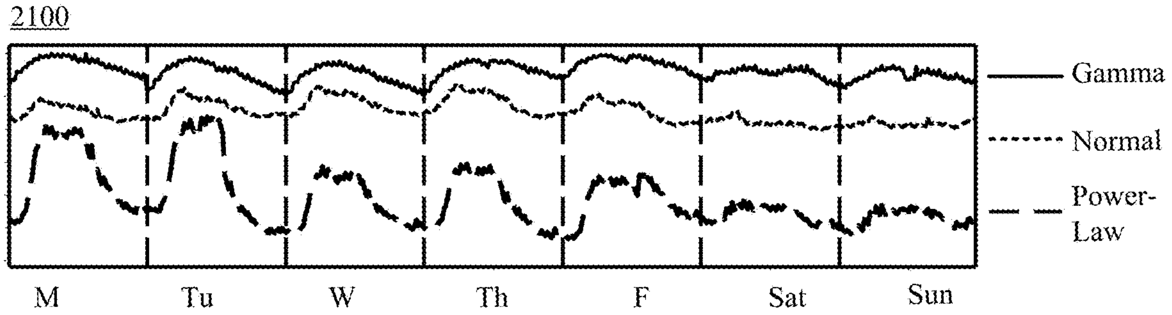
FIG. 21
2200
| | | | | | | |
|---|---|---|---|---|---|---|
| 0.63 | 0.57 | 0.58 | 0.57 | 0.56 | 0.41 | 0.41 |
| 0.57 | 0.66 | 0.61 | 0.60 | 0.60 | 0.43 | 0.42 |
| 0.58 | 0.61 | 0.67 | 0.60 | 0.60 | 0.44 | 0.43 |
| 0.57 | 0.60 | 0.60 | 0.66 | 0.60 | 0.40 | 0.42 |
| 0.56 | 0.60 | 0.60 | 0.60 | 0.65 | 0.44 | 0.39 |
| 0.41 | 0.43 | 0.44 | 0.40 | 0.44 | 0.58 | 0.51 |
| 0.41 | 0.42 | 0.43 | 0.42 | 0.39 | 0.51 | 0.55 |
FIG. 22

POWER CONSUMPTION FORECASTING AND MAINTENANCE WINDOW DETERMINATION FOR MAINTENANCE OF DATA CENTERS

CROSS-REFERENCE TO RELATED APPLICATIONS

This application claims priority to U.S. Provisional Patent Application No. 63/655,345, entitled "POWER CONSUMPTION ESTIMATION FOR MAINTENANCE OF DATA CENTERS," and filed on Jun. 3, 2024, the entirety of which is incorporated by reference herein.

BACKGROUND

Data centers are collections of servers maintained by a data center service provider (also referred to as a DC provider or a large data center provider (LDCP)). In some implementations of data centers, a data center operates at less than full capacity of its available power. In this context, compute resources of the data center are under-utilized in order to allow for spikes in usage of the data center's compute resources.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Systems, methods, devices, and computer readable storage media described herein provide techniques for forecasting power consumption for maintenance of data centers. In an aspect, a maintenance window request for a requested maintenance task with respect to a data center is received. A machine learning (ML) model is utilized to determine forecasted power consumption data of the data center based on the maintenance window request, the ML model trained to forecast power consumption of the data center over intervals of time. A window recommendation result is determined based on the forecasted power consumption data. The result comprises a window indicating a period of time in which an impact of the requested maintenance task satisfies an impact criterion of the request. The maintenance task is caused to be performed during the window.

In another aspect, a maintenance window is validated. In this aspect, a maintenance window request is received, the request specifying a period of time. A determination of whether an impact on performance of the data center by the requested task satisfies an impact criterion during the period of time is made. If so, the maintenance window is validated. If not, the maintenance window request is invalidated.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 4A shows a flowchart of a process for training and updating an ML model to determine a forecast of power consumption of a data center, in an embodiment.

FIG. 4B shows a graph of mutual correlation of features, in an embodiment.

FIG. 10 shows a flowchart of a process for performing a maintenance task, in an embodiment.

FIG. 11 shows a flowchart of a process for preparing for a maintenance task, in an embodiment.

FIG. 12 shows a flowchart of a process for determining a maintenance window based on a range of dates, in an embodiment.

FIG. 13A shows a flowchart of a process for forecasting power consumption offline, in an embodiment.

FIG. 13B shows a graph of a forecast of power consumption, in an embodiment.

Figure 19:
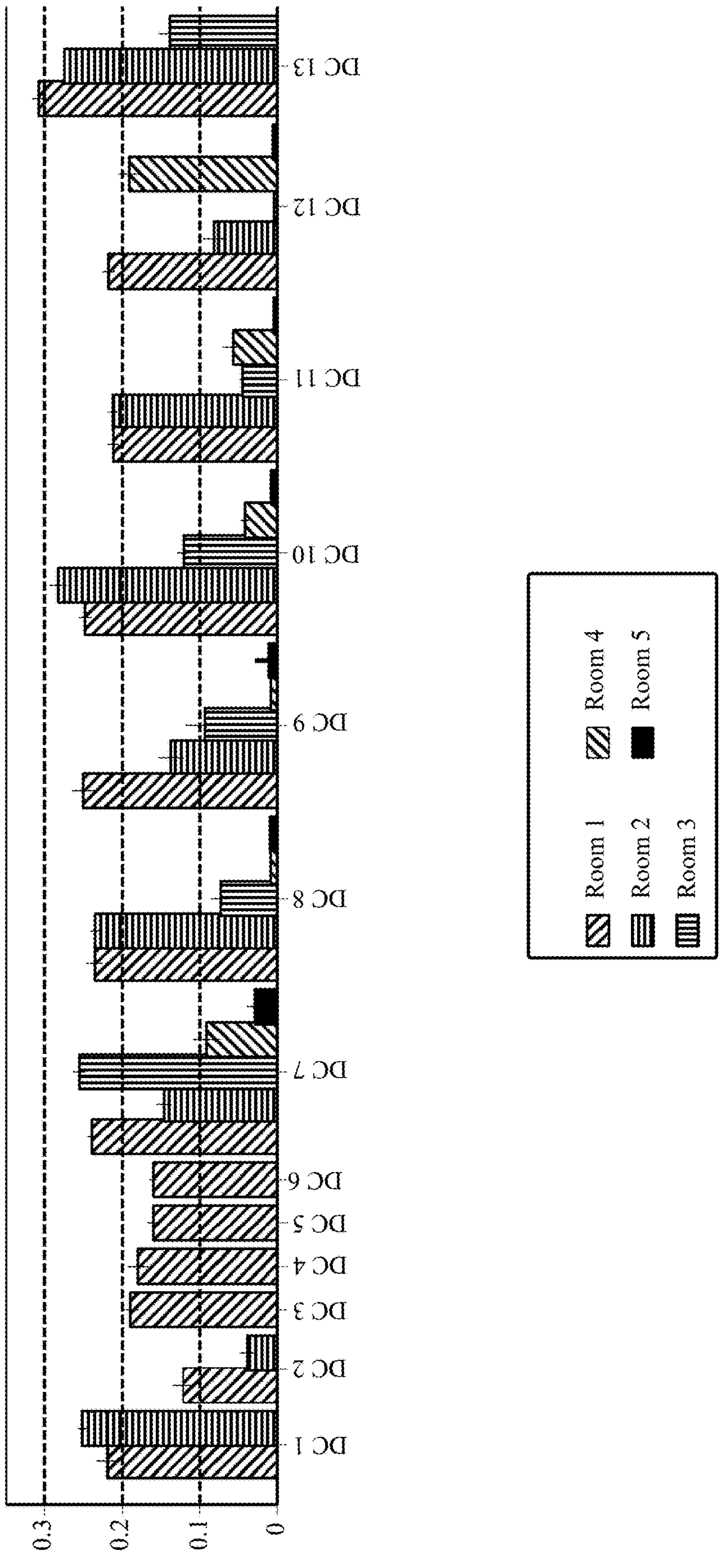

FIGS. 19 and 20 respectively show graphs of power consumed in rooms of multiple data centers and total power consumption of the multiple data centers, in an embodiment.

FIG. 21 shows a graph of power usage values of power sources, in an embodiment.

FIG. 22 shows a graph of power usage value correlation across days in a week, in an embodiment.

Figure 23:
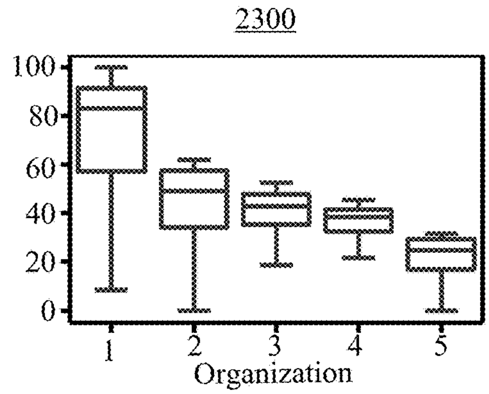
Figure 24:
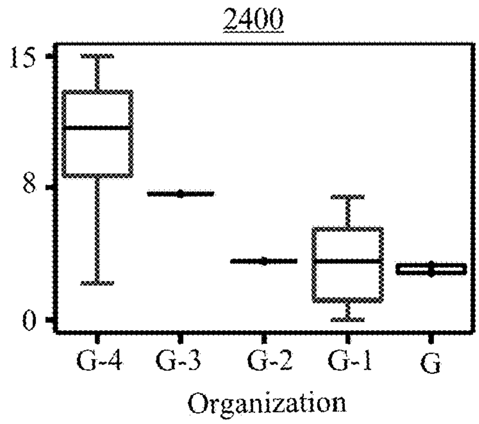

FIGS. 23 & 24 show graphs of percentage of power consumption used by different organization types, in an embodiment.

Figure 25A:
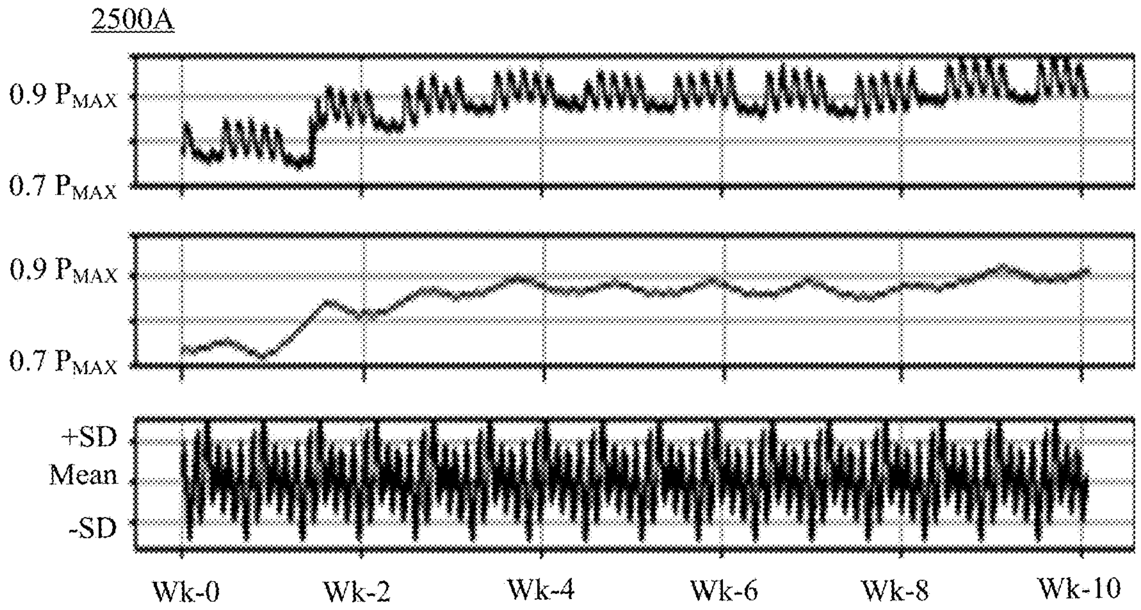

FIG. 25A shows a graph of trend and seasonal components of power usage value time-series of a selected power source, in an embodiment.

Figure 25B:
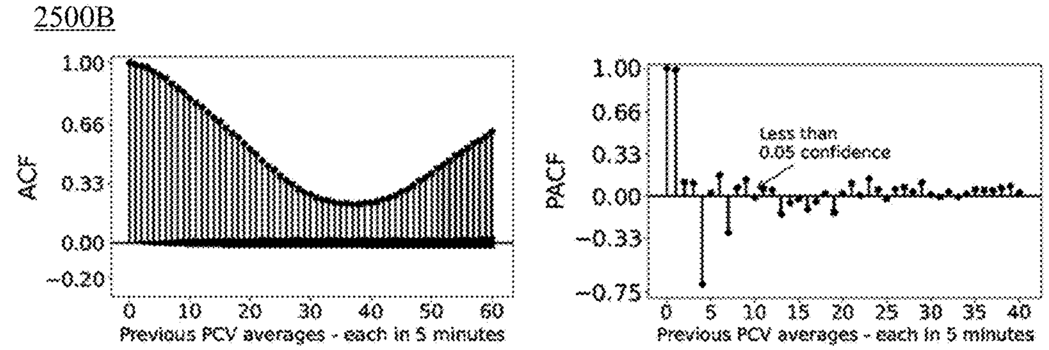
Figure 26:
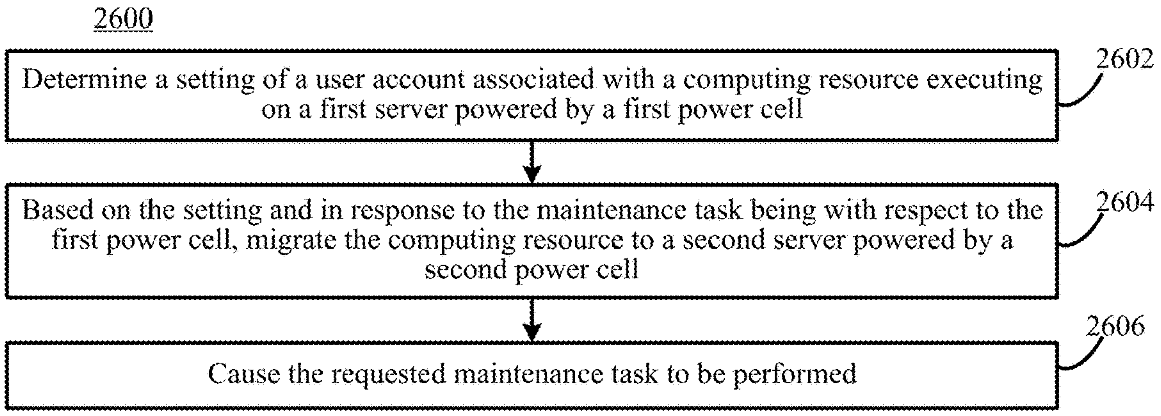

FIG. 25B shows graphs of the ACF and PACF of the PUV time-series in FIG. 25A FIG. 26 shows a flowchart of a process for performing pre-maintenance tasks, in an embodiment.

Figure 27:
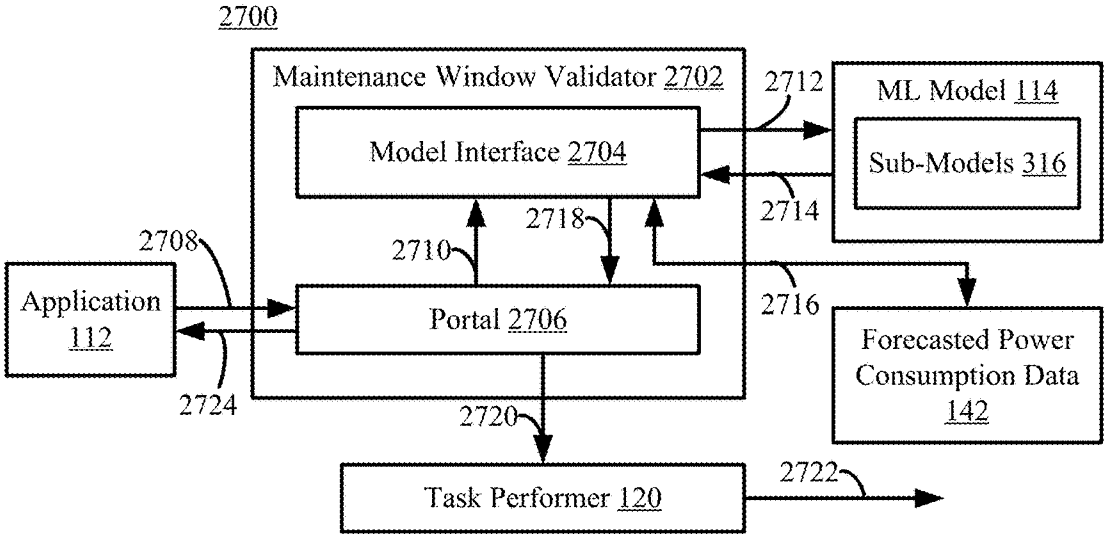

FIG. 27 shows a block diagram of a system for window validation, in an embodiment.

Figure 28:
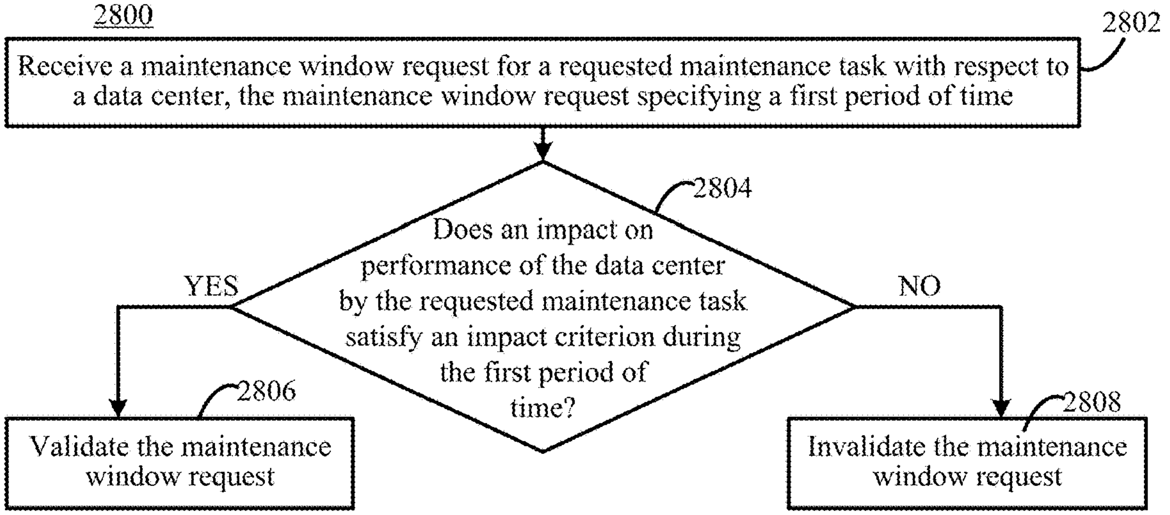

FIG. 28 shows a flowchart of a process for window validation, in an embodiment.

Figure 29:
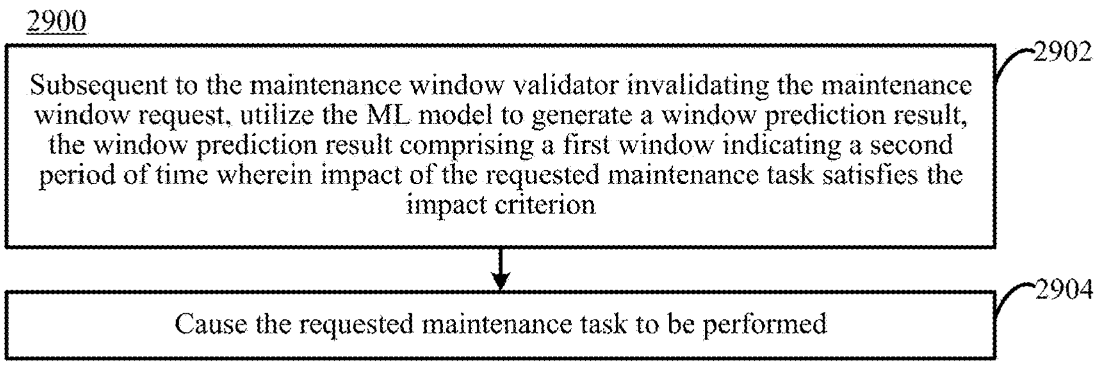

FIG. 29 shows a flowchart of a process for suggesting an alternative maintenance window, in an embodiment.

Figure 30:
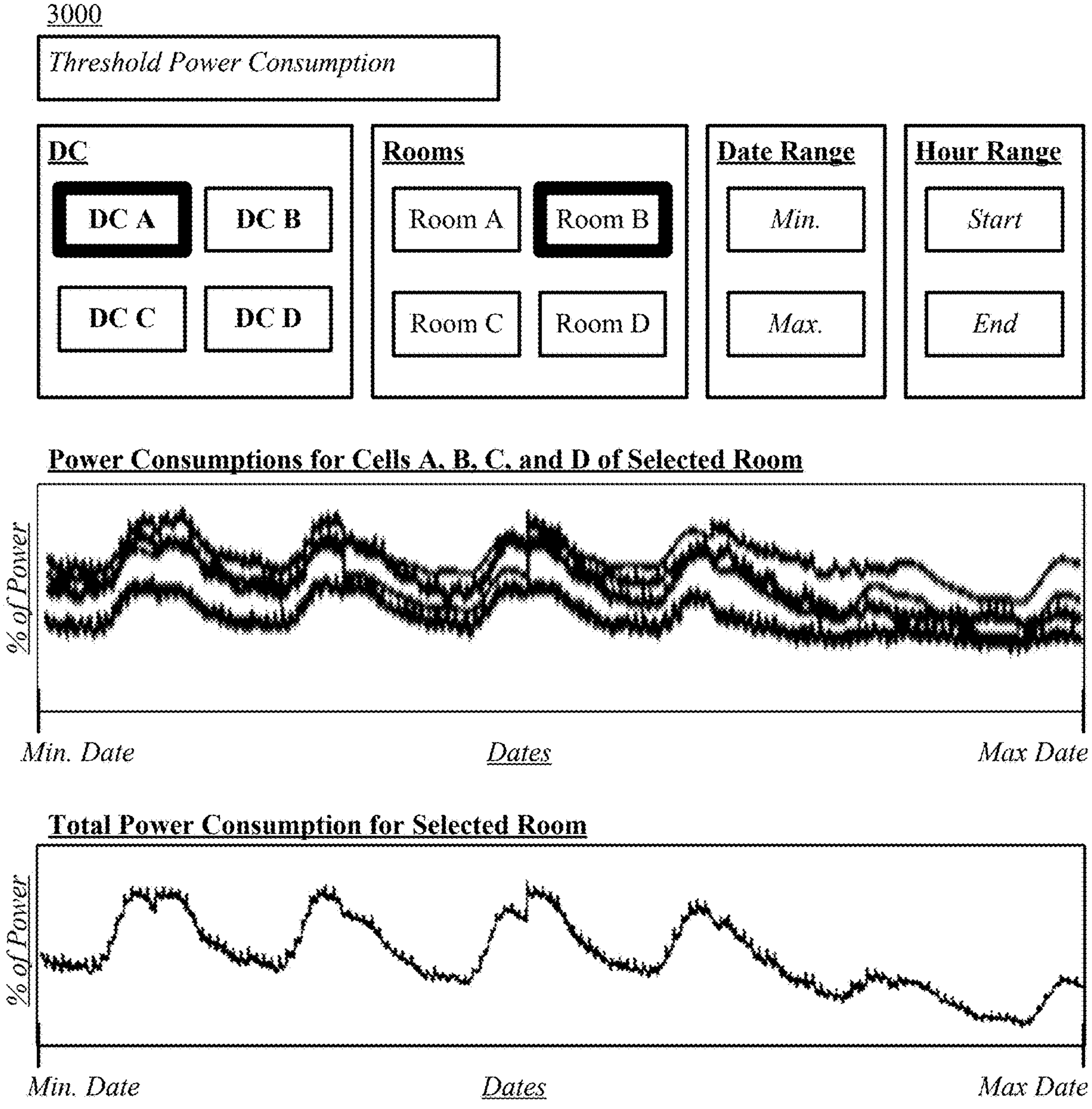

FIG. 30 shows a block diagram of a user interface, in an embodiment.

Figure 31:
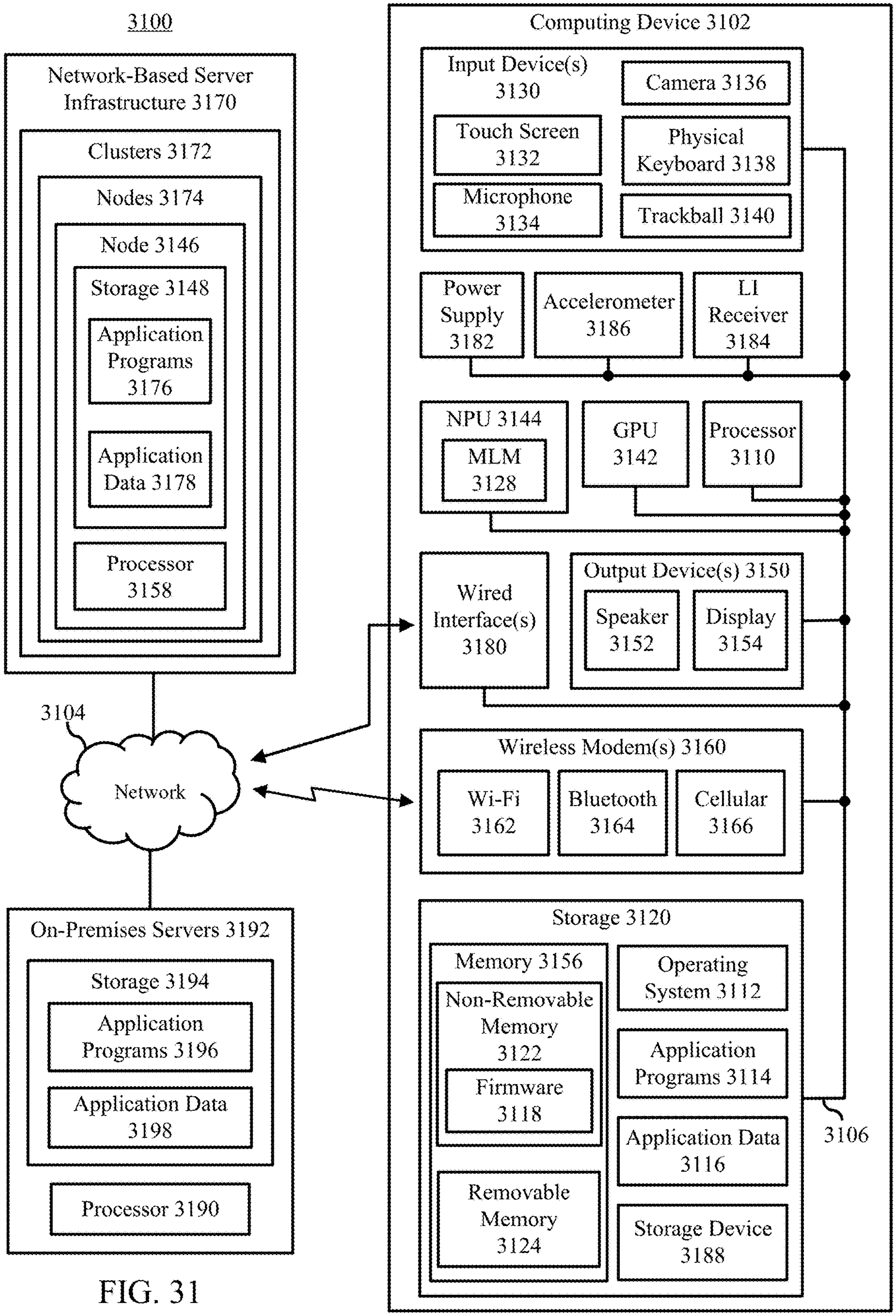

FIG. 31 shows a block diagram of an example computing environment in which embodiments may be implemented.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Power Consumption Forecasting in Data Center Maintenance In some implementations, a service provider of a data center (DC) (also referred to as a "DC provider" or a large data center provider ("LDCP")) limits the workloads in their DCs such that there is significant reserve power to prevent unavailability events due to failures. In these cases, the DC is operating at less than full capacity of its available power (e.g., compute resources of the DC are under-utilized). Alternatively, a DC provider implements a zero reserved power (ZRP) DC that operates at up to full (e.g., 100%) capacity. Some ZRP DCs use a system that monitors power usage to maintain a safe power consumption level and, if needed, reduce clock speeds of select computing resources (also referred to as "throttling") or shut down some servers after moving workloads to underutilized servers. Some such systems take action responsive to detecting excessive power consumption (e.g., power consumption satisfying an excess power draw criterion (e.g., an amount of power (e.g., in Watts) consumed within a period of time is above a threshold), and/or the like). By allowing for operation near or at full capacity, ZRP DCs are able to add additional servers and support more compute resources at a time.

Power sources of DCs, as well as other components of DCs, require routine and/or ad-hoc maintenance. Examples of routine maintenance (also referred to as "routine maintenance tasks") include, but are not limited to, software patches, hardware patches, replacing corrupt batteries, infrastructure upgrades, etc. Other examples of maintenance (e.g., ad-hoc maintenance ("ad-hoc maintenance tasks")), include, but are not limited to, diagnosing and/or repairing operation errors of a server, diagnosing and/or debugging operation errors of a power cell, replacing a power cell, replacing a server, replacing other hardware and/or software in a DC, and/or another task performed with respect to maintaining and/or repairing a DC and its components. During maintenance, some or all of a DC is powered down, reducing the power capacity of the DC. For instance, suppose a room of a DC is powered by four power sources (e.g., power cells). If maintenance is to be performed on one of the power cells, the remaining three power cells handle the power load of servers normally assigned to the powered down cell, resulting in (e.g., only) 75% of power being available in the room during maintenance (e.g., if a room is allocated 8 MW of power, the room is capable of providing 6 MW under maintenance). In an implementation, the system triggers throttling and/or other preemptive measures to prevent power outages or failure of the DC. This results in power degradation of workloads executed by servers in the room. Furthermore, excessive power draw could lead to a room blackout, e.g., suppose a workload executing on a server operating at a limited power capacity requires more power than the limited capacity can provide. This could place the room at risk of a blackout.

Embodiments of the present disclosure determine a forecasted power consumption and recommend maintenance windows where power degradation is less likely to occur or has a reduced impact on workloads. For instance, in an embodiment, a maintenance window request for a maintenance task with respect to a DC is received. An ML model is utilized to determine forecasted power consumption data of the DC based on the maintenance request. A window recommendation result is determined based on the forecasted power consumption data. In embodiments, the ML model is trained to forecast power consumption of the DC (or a component thereof) based on historic power consumption for the DC, a room of the DC, and/or a power cell of the room. The window recommendation result comprises a window indicating a period of time in which an impact of the requested maintenance task satisfies an impact criterion. The maintenance window determiner causes the requested maintenance task to be performed during the window. By determining a maintenance window and causing maintenance tasks to be performed within the maintenance window in this manner, embodiments reduce the likelihood of workload degradation and blackouts, thereby improving the operation of the DC, the servers executing the workload, and/or external computing devices leveraging the servers.

In some implementations, the maintenance window determiner utilizes the ML model to forecast power consumption "offline," e.g., agnostic to when a maintenance window request is received, on a periodic basis (e.g., daily, every predetermined number of days, weekly, monthly, and/or the like), and/or the like. By generating this data offline, such embodiments reduce the time to determine a recommendation in response to a request. Furthermore, redundant uses of the ML model to forecast power consumption during overlapping time periods are reduced, thus conserving compute resources.

In some cases, a maintenance team already has a planned time for performing maintenance tasks. In this context, embodiments of the present disclosure enable validation of whether or not the pre-planned time satisfies impact criterion. For instance, in an embodiment, a maintenance window validator receives a maintenance window request for a requested maintenance task with respect to a DC specifying a period of time. The maintenance window validator determines if an impact on performance of the DC by the requested maintenance task satisfies an impact criterion during the period of time (e.g., based on forecasted power consumption data). If the impact satisfies the impact criterion, the maintenance window request is validated. If not, the request is invalidated. By enabling validation of pre-planned maintenance windows in this manner, such embodiments are able to notify a maintenance team or system if requested maintenance is at an elevated risk for negatively impacting workloads and/or causing a blackout.

Figure 1:
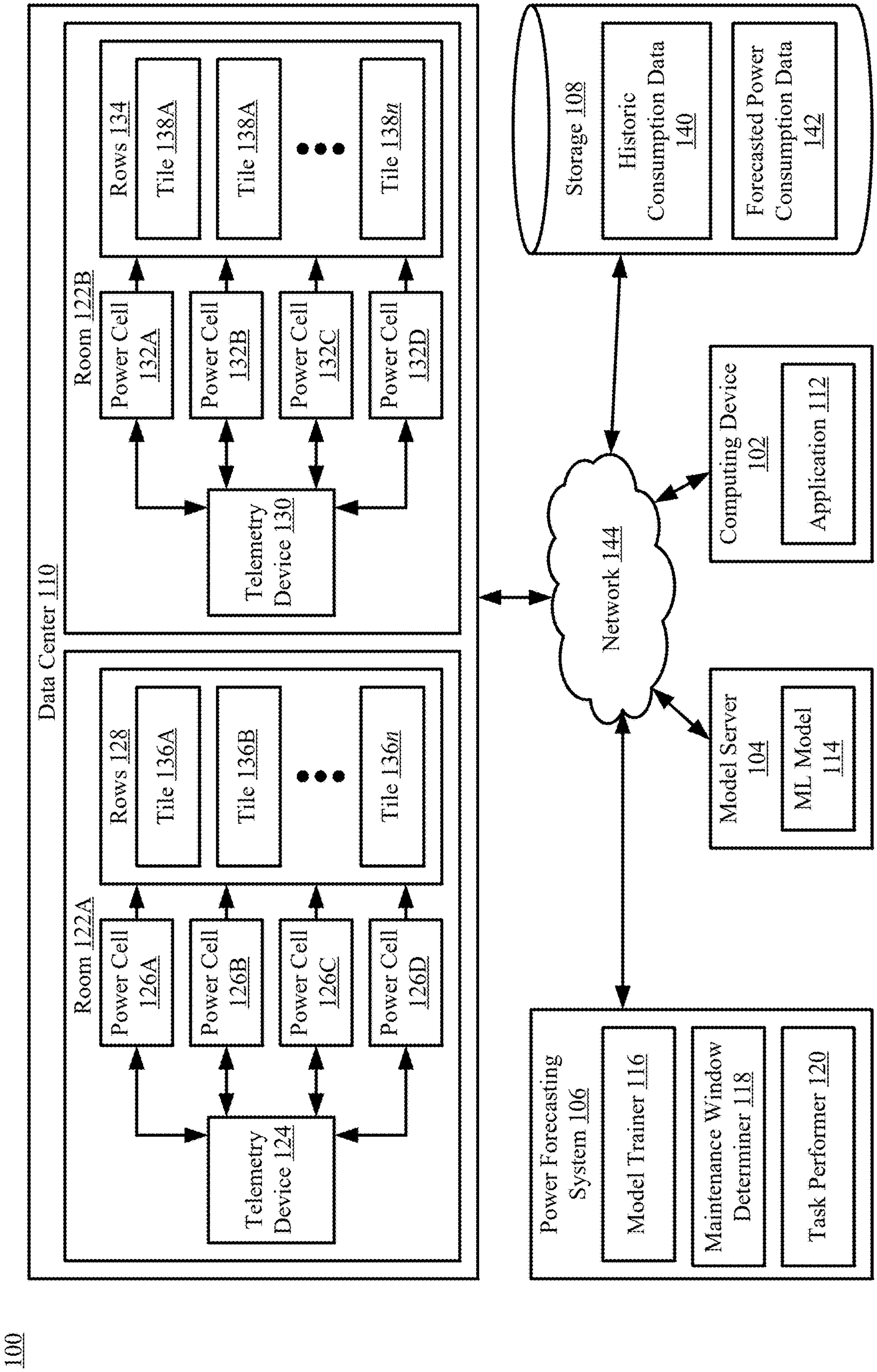
FIG. 1 shows a block diagram of a system for forecasting power consumption and performing maintenance of a data center, in an embodiment.

Systems, devices, and apparatuses are configurable in various ways for determining window recommendations. For example, FIG. 1 shows a block diagram of a system 100 for forecasting power consumption and performing maintenance of a DC, in an example embodiment. As shown in FIG. 1, system 100 comprises a computing device 102, a model server 104, a power forecasting system 106, a storage 108, and a data center 110 ("DC 110" herein), each of which are communicatively coupled via a network 144 (in an embodiment). In examples, network 144 comprises one or more networks such as local area networks (LANs), wide area networks (WANs), enterprise networks, the Internet, etc. In examples, network 144 comprises one or more wired and/or wireless portions. The features of system 100 are described in detail as follows.

Storage 108 is configured to store data utilized by and/or generated by computing device 102, model server 104, power forecasting system 106, and/or components thereof and/or services executing thereon. For instance, as shown in FIG. 1, storage 108 stores historic consumption data 140 and forecasted power consumption data 142. Historic consumption data 140 comprises data indicative of power consumed by DC 110 and/or its components. Forecasted power consumption data 142 comprises data indicative of forecasted power consumption by DC 110 and/or its components. In an embodiment, forecasted power consumption data 142 is retained for a minimum or maximum amount of time (e.g., storage 108 discards portions of forecasted power consumption data 142 that are older than a predetermined number of days, weeks, months, and/or the like, discards oldest portions once storage space reaches a threshold, and/or maintains portions for a minimum number of days (e.g., at least one month, at least thirty days, at least four weeks, etc.)).

DC 110 is configured to house servers and/or other computing systems and associated components. In some embodiments, DC 110 is a building. Alternatively, DC 110 is a dedicated portion of a building. In some embodiments, DC 110 is a group of buildings (e.g., collocated, within the same region, or distributed across different regions). DC 110 can have one or more rooms utilized to store the servers. For instance, as shown in FIG. 1, DC 110 comprises rooms 122A and 122B. Depending on the implementation, rooms 122A and 122B are separate rooms in the same building, separate rooms of collocated buildings, or separate portions of the same room in a building. Each of rooms 122A and 122B comprise one or more servers and supporting architecture. For instance, as shown in FIG. 1, room 122A comprises a telemetry device 124, power cells 126A-126D, and rows 128 (comprising tiles 136A-136*n*) and room 122B comprises a telemetry device 130, power cells 132A-132D, and rows 134 (comprising tiles 138A-138*n*). Each of the components of rooms 122A and 122B are described as follows.

Rows 128 and 134 comprise tiles of servers. For example, as shown in FIG. 1, rows 128 comprises a first tile 136A of servers, a second tile 136B of servers, and an nth tile 136*n* of servers and rows 134 comprises a first tile 138A of servers, a second tile 138B of servers, and an nth tile 138*n* of servers. Each tile of rows 128 and 134 comprises one or more servers. In embodiments, servers of a tile are arranged in racks comprising multiple servers. A tile can include multiple racks of servers.

Power cells 126A-126D and 132A-132D are power sources for tiles of their respective rooms. For instance, power cells 126A-126D provide power for rows 128 and power cells 132A-132D provide power to rows 134. In an embodiment, a power cell provides power to at least one tile of a room. In some embodiments, multiple power cells are utilized to power a tile. For instance, a first power cell (e.g., power cell 126A) provides primary power to tile 136A and reserve power to tile 136B and a second power cell (e.g., power cell 126B) provides primary power to tile 136B and reserve power to tile 136A. In this context, when one power cell is turned off (e.g., for maintenance), another power cell is able to provide power to the servers normally powered by the first power cell.

Telemetry devices 124 and 130 monitor power consumed by power cells of the respective room. For instance, telemetry device 124 monitors power consumed by power cells 126A-126D and telemetry device 130 monitors power consumed by power cells 132A-132D. Depending on the implementation, telemetry devices 124 and/or 130 comprise separate sub-devices (or sets of sub-devices) for each respective power cell. In some embodiments, telemetry device 124 and/or telemetry device 130 store measurements of power consumption as historic consumption data (e.g., historic consumption data 140). For instance, in an embodiment, telemetry device 124 and telemetry device 130 store measurements as variables in a database table. Alternatively, telemetry device 124 and/or telemetry device 130 stream measurement data to power forecasting system 106.

Embodiments of telemetry devices 124 and 130 are configurable to measure power consumption at different rates or sizes. For instance, some embodiments of telemetry devices measure power consumption at a fine rate (e.g., power consumed every second, power consumed ever five seconds, etc.). By measuring power consumption at a fine rate, such embodiments of telemetry devices provide insight to fluctuations in power consumption in short intervals to systems for determining a forecast of power consumption. Alternatively, telemetry devices 124 and 130 measure power consumption at a course rate (e.g., every hour, every few hours, etc.). By utilizing a courser resolution, such embodiments reduce the storage space consumed by historic consumption data 140. Furthermore, systems are able to process smaller amounts of data at a faster rate.

In embodiments, a service provider that manages DC 110 provides different services through DC 110 (e.g., e-mails, public cloud services, DevOps (e.g., tools and/or other services for integrating and/or automating software development and/or information technology (IT) operations)). In an embodiment, the service provider assigns servers and/or tiles to host services and/or other compute resources for a customer based on the power cell powering the tiles/servers. In an example, a service provider assigns all tiles powered by power cell 126A to a Customer C. In this manner, the service provider is able to measure power consumed by Customer C. In a further embodiment, the service provider assigns multiple power sources to a customer with larger computational requirements (e.g., multiple power sources within a single room, across multiple rooms in the same DC, or across different DCs).

Computing device 102 is any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. In an embodiment, computing device 102 is associated with a user (e.g., an individual user, a group of users, an organization, a family user, a customer user, an employee user, an admin user (e.g., a service team user, a developer user, a management user, etc.), etc.). Computing device 102 is configured to execute an application 112. In an embodiment, application 112 enables a user to interface with model server 104, power forecasting system 106, storage 108, and/or DC 110 (e.g., over network 134). For example, an embodiment of application 112 transmits an application programming interface (API) call to power forecasting system 106 (or a component thereof) to cause power forecasting system 106 to perform one or more operations described elsewhere herein. In an embodiment, application 112 receives an API response to the API call from power forecasting system 106 (or a component thereof).

Model server 104 is a network-accessible server (or set of servers or other computing device). In some embodiments, model server 104 is executed by a server or servers of DC 110. Alternatively, model server 104 is external to DC 110 (as shown in FIG. 1). Alternatively, model server 104 is incorporated in power forecasting system 106. As shown in FIG. 1, model server 104 is configured to execute, host, and/or store an ML model 114. ML model 114 is a trained model. Examples of ML model 114 include, but are not limited to, seasonal autoregressive integrated moving average+exogeneous variables (SARIMAX) models, recurrent neural network (RNN) models, long short-term memory (LSTM) models, and extreme gradient boosting (XGBoost) models. Several non-limiting examples are described herein with respect to XGBoost models, however, described embodiments can utilize any type of ML model. In some embodiments, ML model 114 comprises one or more sub-models. In embodiments, ML model 114 is trained to determine a forecasted power consumption result indicating a forecast of power consumed by some or all of DC 110 over a future period of time.

Power forecasting system 106 is configured to train ML model 114, utilize ML model 114, utilize results of ML model 114, provide forecast results to a user, cause performance of maintenance tasks, and/or perform other operations related to power consumption forecast and maintenance, as described elsewhere herein. As shown in FIG. 1, power forecasting system 106 is external to DC 110; however, in an alternative embodiment, power forecasting system 106 is incorporated in DC 110. As shown in FIG. 1, power forecasting system 106 comprises a model trainer 116, a maintenance window determiner 118, and a task performer 120, each of which are implemented as sub-services/components of power forecasting system 106. Model trainer 116 executes operations to collect data related to historic consumption of DC 110 (e.g., from telemetry devices 124 and/or 130), write power consumption data to a data store, impute missing values into historic consumption data 140, prepare training data for ML model 114, train ML model 114, and/or save trained versions of ML model 114. In an embodiment, data obtained by model trainer 116 is saved in a separate storage from power consumption data generated by DC 110, thereby reducing the likelihood of other entities modifying/interfering with the data utilized by model trainer 116 to train ML model 114.

Model trainer 116 trains ML model 114 based on observable factors that correlate with power utilization values (PUVs). For instance, model trainer 116 trains ML model 114 based on historic consumption data 140. Model trainer 116 trains ML model 114 to generate a forecasted power consumption of a power cell, a room, or a DC (e.g., over a range of time) and/or generate a throttle forecast result indicating a time window where usage of compute resources executing on servers powered by the power cell, within the room, or of the DC would be throttled. In an embodiment, model trainer 116 stores the trained model in a data store (e.g., a blob storage).

Maintenance window determiner 118 executes operations to receive maintenance window requests, place calls to ML model 114, analyze results of ML model 114, provide responses to user computing devices (e.g., computing device 102), and/or the like. In an embodiment, maintenance window determiner 118 places a call to ML model 114 to forecast power consumption based on a received maintenance window request. Alternatively, and as described with respect to FIG. 13 (as well as elsewhere herein), maintenance window determiner 118 leverages offline-generated results of ML model 114 forecasting power consumption for DC 110.

Task performer 120 executes operations to perform and/or cause performance of maintenance tasks based on requests and determined/selected maintenance window recommendation results. In some embodiments, task performer 120 automatically performs a task based on determinations made by maintenance window determiner 118. In another embodiment, and as further described with respect to FIGS. 16 and 17, task performer 120 performs a maintenance task based on a selection made in a user interface.

Embodiments described herein are able to determine "safe" maintenance windows with a likelihood of workload interruption and/or failure in functionality is reduced. Furthermore, some embodiments of workloads of different organizations/customers/user-groups are distributed across rooms to improve power usage trends, as the systems are able to determine a forecast of power usage for that customer/organization.

Figure 2:
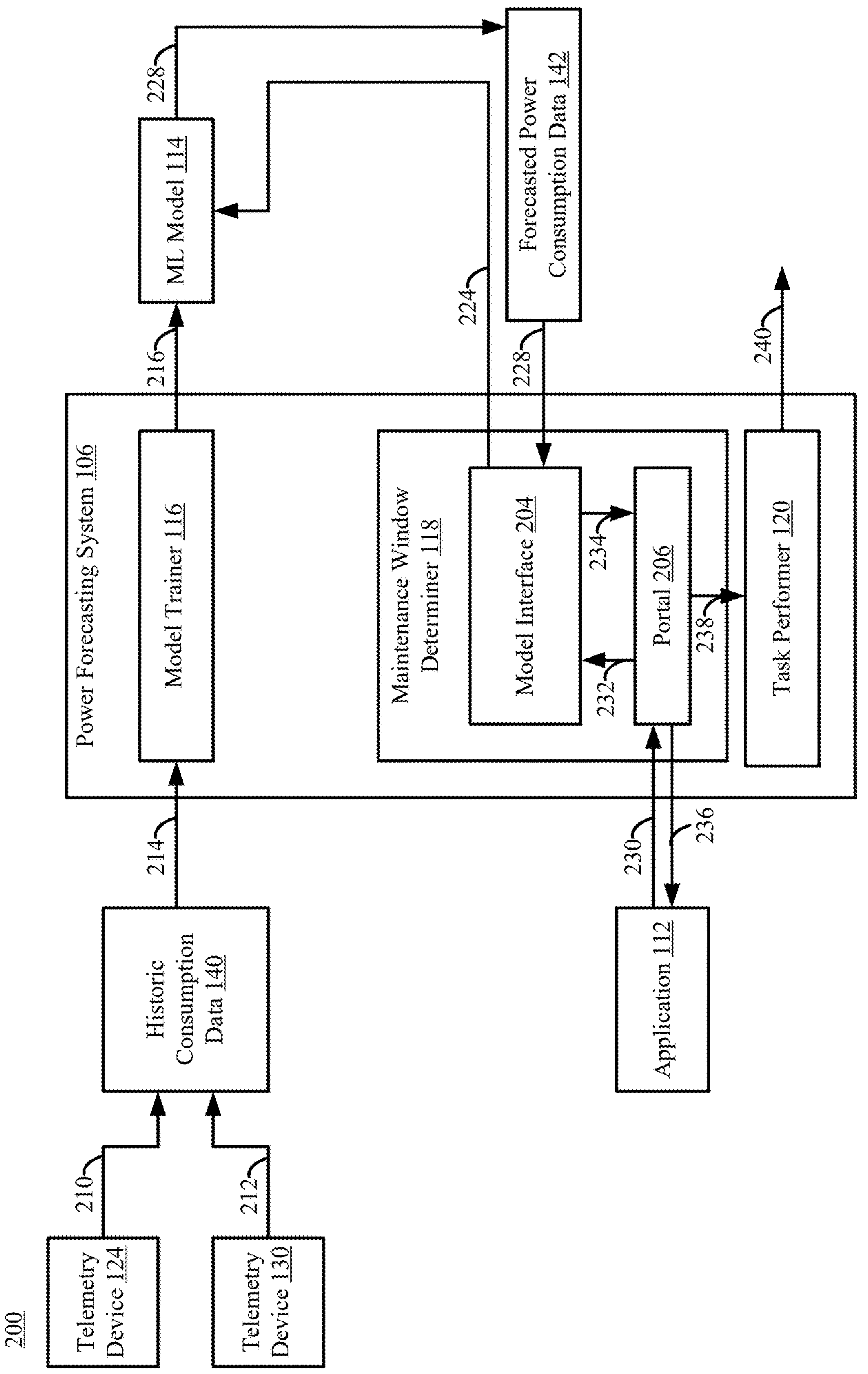
FIG. 2 shows a block diagram of a system for forecasting power consumption and performing maintenance of a data center, in another embodiment.

Embodiments of power forecasting system 106 are configured in various ways. For example, FIG. 2 shows a block diagram of a system 200 for forecasting power consumption and performing maintenance of a DC, in another example embodiment. As shown in FIG. 2, system 200 comprises power forecasting system 106 (comprising model trainer 116, maintenance window determiner 118, and task performer 120), application 112, ML model 114, telemetry device 124, telemetry device 130, historic consumption data 140, and forecasted power consumption data 142, as described with respect to FIG. 1. As also shown in FIG. 2, maintenance window determiner 118 comprises a model interface 204 and a portal 206. Model interface 204 transmits calls to ML model 114 and receives results from ML model 114. Portal 206 interfaces requesting applications (e.g., application 114) with power forecasting system 106. In an embodiment, portal 206 comprises one or more application programming interfaces (APIs), as described elsewhere herein. The operation of the components of system 200 are described as follows.

In embodiments, telemetry devices 124 and 130 generate power consumption data 210 and 212, respectively. As shown in FIG. 2, power consumption data 210 and 212 is stored as historic consumption data 140. Model trainer 116 accesses historic consumption data 140 and obtains at least a portion 214 of the data. Model trainer 116 utilizes the data to train ML model 114 via training input 216. Additional details regarding the training of ML model 114 are described with respect to FIGS. 3-7, as well as elsewhere herein.

Once ML model 114 is trained, maintenance window determiner 118 is able to leverage ML model 114 to generate forecasted power consumption data 142. For instance, suppose application 112 places a maintenance window request 230 to portal 206, as shown in FIG. 2. Portal 206 provides information 232 corresponding to the request to model interface 204, causing model interface 204 to place a call 224 to ML model 114. Call 224 causes ML model 114 to generate forecasted power consumption result 228 for the window of time corresponding to maintenance window request 230. Forecasted power consumption result 228 is stored as some or all of forecasted power consumption data 142. Model interface 204 receives forecasted power consumption result 228 and provides it to portal 206 via forecast data signal 234. In some embodiments, ML model 114 generates forecasted power consumption data 142 offline (e.g., separate from when requests are received). In this case, model interface 204 (responsive to receiving information 232) obtains the forecasted power consumption result 228 corresponding to a time range included in information 232, and provides it to portal 206 via forecast data signal 234.

Embodiments are configured to forecast power consumption $N_{WEEK}$ weeks from the current date. In an embodiment, $N_{WEEK}$ is defined based on observations of error percentages in determined forecasts of power usage. In some embodiments, ML model 114 improves forecasted result generation over time. In this context, the value of $N_{WEEK}$ increases over time. In some embodiments, an ML model degrades overtime (e.g., as customers change, as customer needs/operations change, as the performance of the DC changes, and/or the like) and the value of $N_{WEEK}$ can decrease. In an embodiment, systems described herein retrain ML model 114, retrain a sub-model of ML model 114, train a replace model for ML model 114, and/or otherwise modify/retrain/alter ML model 114 if $N_{WEEK}$ falls below a threshold.

In an embodiment, portal 206 determines a safe maintenance window based on forecast data signal 234. In some embodiments, portal 206 leverages ML model 114 to determine the safe maintenance window. As shown in FIG. 2, in embodiments, portal 206 provides a maintenance window response 236 to application 112 indicating a window recommendation for performing maintenance on some or all of DC 110 (also referred to as a "window recommendation result"). In some embodiments, and as also shown in FIG. 2, portal 206 provides a maintenance window signal 238 to task performer 120 to cause task performer 120 to perform one or more task related to the requested maintenance. Example tasks performed by task performer 120 include, but are not limited to, causing a selected maintenance window to be scheduled on a calendar application that manages operation tasks with respect to maintaining DCs, migrating data from a server of a DC to another server of the DC, migrating data from one DC to another DC, powering down a power cell of a room of a DC, obtaining and installing a software/firmware update to a power cell, server, or other component of a DC, and/or performing any other task related to the maintenance of a DC, as described elsewhere herein. Additional details regarding the utilization of ML model 114 and/or its results to suggest maintenance windows are described with respect to FIGS. 8-17, as well as elsewhere herein.

III. ML Model Training Embodiments

Figure 3:
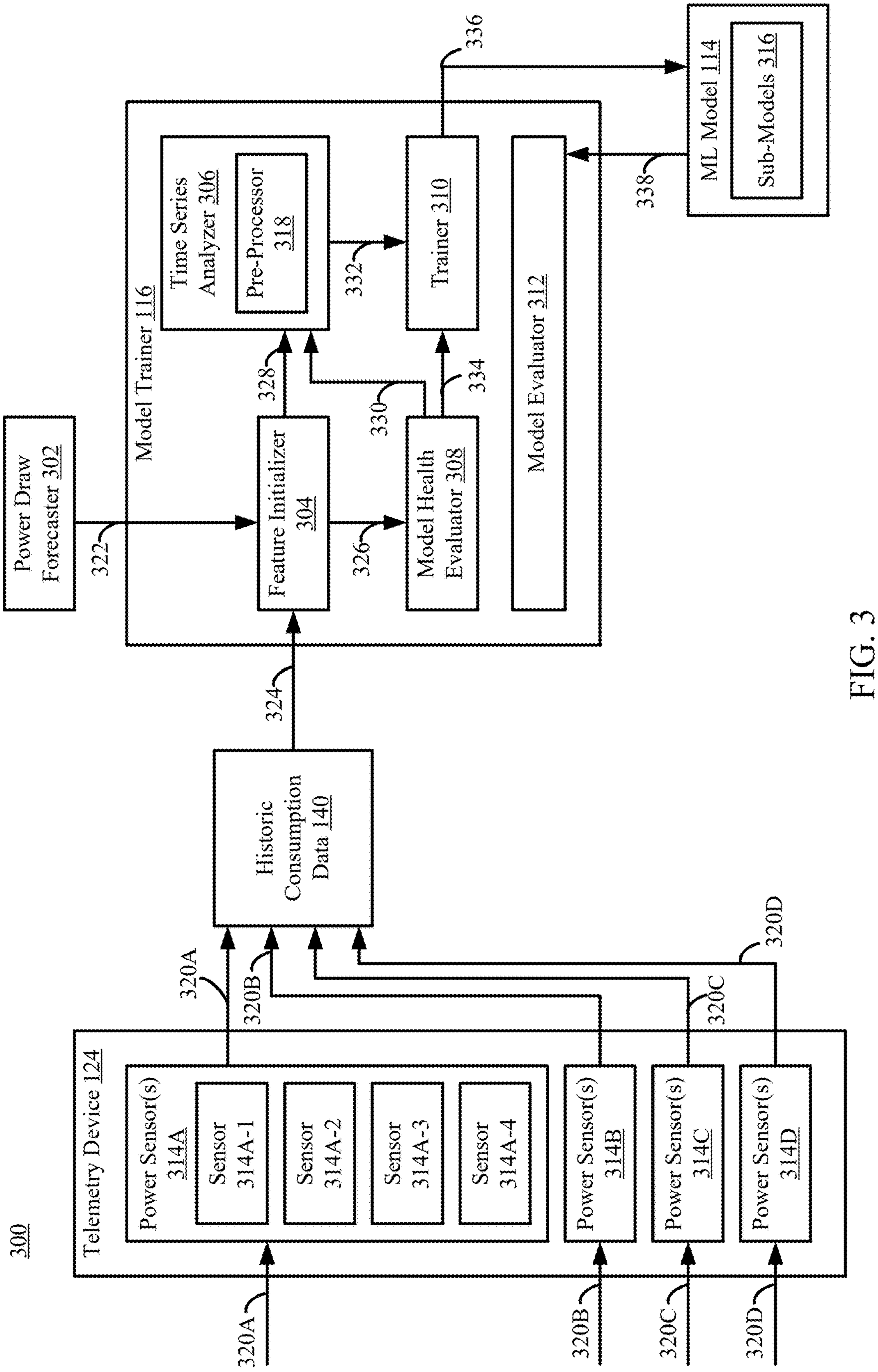
FIG. 3 shows a block diagram of a system for training an ML model to determine forecasted power consumption data, in an embodiment.

As described herein, embodiments of the present disclosure utilize a trained model to determine a forecast of power consumption of a DC. Such embodiments are configured in various ways. For example, FIG. 3 shows a block diagram of a system 300 for training an ML model to determine a forecast of power consumption of a DC, in an example embodiment. As shown in FIG. 3, system 300 comprises ML model 114, model trainer 116, telemetry device 124, and historic consumption data 140, as described with respect to FIG. 1, as well as a power draw forecaster 302. Power draw forecaster 302 causes model trainer 116 to train ML model 114 to update and/or generate new forecast results.

As shown in FIG. 3, telemetry device 124 comprises one or more power sensors 314A, one or more power sensors 314B, one or more power sensors 314C, and one or more power sensors 314D (collectively referred to herein as "power sensors 314A314D"). Each of power sensors 314A-314D measure power drawn by a measured power cell over time. For instance, one or more power sensors 314A ("power sensors 314A") measure power drawn by power cell 126A over time, one or more power sensors 314B ("power sensors 314B") measure power drawn by power cell 126B over time, one or more power sensors 314C ("power sensors 314C") measure power drawn by power cell 126C over time, and one or more power sensors 314D ("power sensors 314D") measure power drawn by power cell 126D over time. Telemetry device 130 comprises power sensors that measure power drawn by power cells 132A-132D over time. In embodiments, telemetry device 124 measures power drawn by power cells of room 122A and stores it as data of historic consumption data 140. For instance, as shown in FIG. 3, measurement 320A of power cell 126A by power sensors 314A, measurement 320B of power cell 126B by power sensors 314B, measurement 320C of power cell 126C are stored in historic consumption data 140. In an embodiment, telemetry device 124 stores the data in a table, such as Table 1.

TABLE 1

| Sensor | DC | Room | Power Cell | Time | Draw |
|---|---|---|---|---|---|
| PS 314A | DC 110 | Room 122A | Cell 126A | 12:00 PM 12/12/2024 | 1.2 MW |
| PS 314B | DC 110 | Room 122A | Cell 126B | 12:00 PM 12/12/2024 | 2.1 MW |
| PS 314C | DC 110 | Room 122A | Cell 126C | 12:00 PM 12/12/2024 | 1.8 MW |
| PS 314D | DC 110 | Room 122A | Cell 126D | 12:00 PM 12/12/2024 | 1.7 MW |

In some embodiments, any of power sensors 314A-314D comprise one or more respective power sensors. For example, as shown in FIG. 3, power sensors 314A comprises a sensor 314A-1, a sensor 314A-2, a sensor 314A-3, and a sensor 314A-4. Alternatively, a single power sensor is used for a respective power cell. In embodiments, telemetry device 124 handles discrepancies between measurements of a particular power cell by multiple power sensors in various ways. For example, in an embodiment, telemetry device 124 (or another component of system 300, not shown for brevity) compares measurements of power cell 126A by sensors 314A-1, 314A-2, 314A-3, and 314A-4. In some embodiments, if a difference between measurements made by the different sensors is greater than a threshold, telemetry device 124 drops the measurement value for that timestamp (e.g., does not store the measurement in historic consumption data 140). Alternatively, or additionally, embodiment, telemetry device 124 averages the measurements of power cell 126A by sensors 314A-1, 314A-2, 314A-3, and 314A-4 to generate measurement 320A as an averaged measurement. In a further embodiment, telemetry device 124 drops an outlying measurement prior to averaging the other measurements to generate measurement 320A (e.g., dropping a sensor's measurement deviating more than a threshold amount from other sensors' measurements). In another alternative embodiment, telemetry device 124 stores each measurement made by sensors 314A-1, 314A-2, 314A-3, and 314A-4 in historic consumption data 140. In an embodiment, telemetry device 124 (or a developer or engineer or administrator associated with telemetry device 124) sorts sensors of a group of power sensors based on a confidence rating. In an embodiment, a confidence rating for a particular sensor is determined based on hardware specification of the sensor, error percentages in measurements made by the sensor, accuracy rating of the sensor, and/or the like. In an embodiment, telemetry device 124 determines a measurement value for a power cell at a power stamp based on an average or sum of measurements made by the different sensors by applying a respective weight to each measurement made by the different sensors based on the respective confidence rating for the sensor. For instance, if a confidence rating for power sensor 314A is lower than the confidence rating for power sensors 314B-314D, telemetry device 124 applies a weight to the measurement made by power sensor 314A to lower the impact the measurement has in the overall determination of the measurement for power cell 126A at that timestamp.

As also shown in FIG. 3, model trainer 116 comprises a feature initializer 304, a time-series analyzer 306, a model health evaluator 308, a trainer 310, and a model evaluator 312. Feature initializer 304 identifies the (e.g., optimal) set of features required for (e.g., precise) future power consumption forecasting for each cell. In an embodiment, feature initializer 304 identifies the set of features in response to receiving forecast instructions 322 from power draw forecaster 302. In an embodiment, power draw forecaster 302 provides forecast instructions 322 to feature initializer 304 on a periodic basis or in response to user interaction with an interface of power draw forecaster 302. In an embodiment, feature initializer 304 examines the influence of significant spatiotemporal factors on the power consumption patterns of individual cells. Examples of these factors include, but are not limited to, allocation percentage, relationships between Organization-Workload-Rack-Cell, day of the week, week of the month, month of the year, effects of national and regional holidays (both immediate and delayed), weather attributes, methods for addressing missing values, power consumption correlations across time, cells, rooms, organizations, and DCs, peak consumption hours, statistics related to peak hours, and lag values. In some examples, if power consumption for a room or a DC is not located, an error is written to the table for that particular day, timestamp, or other period of time indicating the data of the corresponding sensor(s) power sensors 314A-314D was unavailable. In an embodiment, feature initializer 304 provides the determined features to time series analyzer 306 as initialized features 328. Alternatively, e.g., for an evaluating an existing model, feature initializer 304 provides the determined features to model health evaluator 308 as updated features 326.

Time-series analyzer 306 is configured to analyze features of historic consumption data 140 (e.g., provided by feature initializer 304 or otherwise) and generate a time-series dataset. For example, in an embodiment, time-series analyzer 306 analyzes spatial features (e.g., features associated with how power utilization varies in DCs across different geographical regions as well as within different rooms of any given DC), temporal features (e.g., features associated with diurnal patterns in the PUV time-series of the power sources, identifying various types of PUV time-series, and how PUVs differ between weekdays and weekends), organization features (e.g., power consumption patterns of LDCP's various internal and public organizations), distribution features (e.g., statistical analysis of the PUV time-series of all power sources, where what distributions these time-series follow and what trend and seasonality components exist in them), and/or any other features derived from historic consumption data 140 for use in training ML model 114 to determine future power consumption data.

In embodiments, time-series analyzer 306 determines patterns in power consumption based on historic configuration data. The patterns are used for training ML model 114 in a manner that it closely approximates the power consumption time-series of each cell of the DC. In some embodiments, time-series analyzer 306 (e.g., automatically) performs exploratory analysis on power consumption time-series of each cell involving exploring recent probabilistic distributions, basic statistics (minimum, maximum, average, moving average, variance, standard deviation, range, and interquartile range), advanced statistics (cumulative distribution function, stochastic processes, probability density function, random walk, autocovariance, smoothing effect, autocorrelation, partial autocorrelation, stationary test, and Granger causality test to identify the optimal subset length for forecasting), and/or the like.

In some embodiments, and as shown in FIG. 3, time-series analyzer 306 includes a pre-processor 318. In some embodiments, pre-processor 318 is a separate component of model trainer 116 from time-series analyzer 306. Pre-processor 318 aims to reveal the underlying elements within each time-series, allowing determination of the number of models to be trained to reconstruct (e.g., all of) the components present in any given series. Breaking down the power consumption data from each time-series for training involves steps such as grouping-wise aggregation, time-series decomposition including components like trend, seasonality, cycles, noise, and zero-mean series, as well as differencing, in embodiments. In embodiments, pre-processor 318 outputs training data for model trainer 310 to utilize to train ML models. In an embodiment, pre-processor 318 stores the training data in a data store (e.g., a blob storage) (e.g., in the form of a table) for later training.

Model Health Evaluator 308 evaluates the precision of the most appropriate forecasting (or prediction generation) model ($M_{AP}$PM) using new real-time power consumption data of each cell after uniform intervals and retrain $M_{AP}PM$ with the new data. In an embodiment, model health evaluator 308 receives updated features 326 from feature initializer 304 for evaluating the health of the model. In an embodiment, feature initializer 304 generates updated features 326 in a similar manner as described with respect to initialized features 328. If an elevated error percentage is detected in any $M_{AP}PM$'s accuracy, model health evaluator 308 initiate a sequential execution of all the previously mentioned modules for a specific cell. In this context, the iterative process identifies a new (e.g., optimal) model by retraining it with complete historical data.

Trainer 310 trains power consumption forecasting models using the output of previous modules. In an example, utilizing the outcomes from the preceding modules, trainer 310 partitions the existing historical power consumption data from each cell into a ration (e.g., a 70:30 ratio) for training and testing to prevent overfitting or underfitting. Trainer 310, in an embodiment, trains (e.g., both) conventional and/or deep learning-based regression models, such as, but not limited to, SARIMAX, LSTM, RNN, XGBoost, and Prophet. In embodiments, trainer 310 employs the training data and various sets of hyperparameters for each model. Additionally, in some embodiments, trainer 310 preserves the hyperparameters for each model during this process.

In some embodiments, to determine the appropriate time resolution to aggregate to, trainer 310 (or ML model 114) analyzes PUV time-series of each power source. For instance, let the $i^{th}$ PUV time-series, $S^i$, contains n values, where $1 \leq i \leq M$. $S^i$ is divided into temporally ordered subsets such that each subset contains t seconds worth of PUVs. This results in $\lceil n/t \rceil$ subsets. Next, for each subset k, where $1 \leq k \leq \lceil n/t \rceil$, the standard deviation $$(\sigma_{k,t}^i),$$

mean $$(\mu_{k,t}^i),$$

and coefficient of variation $$(cv_{k,t}^i = \sigma_{k,t}^i / \mu_{k,t}^i)$$

of the PUVs contained in that subset are calculated. These steps are repeated on $S^i$ for all values of t as the aggregation duration for which $$(\sigma_{k,t}^i) < 3\%$$

all k subsets. A threshold for the standard deviation is set (e.g., as a predetermined criterion (e.g., 3%)). Thus, a ±X % deviation in readings is determined to produce little no risk of a blackout. The aggregation duration is represented for $S^i$ with $T^i$. The steps above are repeated to obtain $T^i$ for each of the M $S^i$ and pick the smallest of these M $T^i$ values as the final aggregation interval to be used. This aggregation interval ensures that the standard deviation observed in all values measured within this interval will be less than X % of the mean, i.e., (e.g., all of) the PUVs are fairly similar and consistent within this interval. In embodiments, the aggregation interval is utilized for determining at which interval historic consumption data 140 should be stored at, thereby allowing systems described herein to reduce storage space if a high interval is determined to satisfy the deviation.

Model evaluator 312 assesses the precision of ML model 114 (and/or its submodels 316) for each cell by employing metrics like R^2 regression analysis, median relative absolute error (MdRAE), and mean absolute percentage error (MAPE). These metrics are used to determine the percentage error in forecast ((1−(forecastedValue/Groundtruth))*100) based on the test dataset. Finally, this module retains the data about the $M_{AP}PM$ for each individual cell. In examples, $M_{AP}PM$ is determined based on the following equation:

$$M_{AP}M = \text{Accuracy} * W1 + \mathit{TimeToTrain} * W2 + \#\mathit{ofFeatures} * W3 + \text{Bootstrapping} * W4 + \mathit{CrossValidation} * W5 + \mathit{DataTransformation} * W6 + \text{Resampling} * W7$$

where W1, W2, W3, W4, W5, W6, and W7 are weights determined during training of the model.

In order to better understand the operation of system 300, FIG. 3 is described with respect to FIG. 4A. FIG. 4A shows a flowchart 400A of a process for training an ML model to determine forecasted power consumption data, in an example embodiment. In an embodiment, system 300 operates in accordance with one or more steps of flowchart 400A. Note that not all steps of flowchart 400A need to be performed in all embodiments. Further structural and operational embodiments will be apparent to persons skilled in the relevant art(s) based on the following descriptions of FIGS. 3 and 4A.

In step 402, power consumption data associated with the DC is received. For example, feature initializer 304 of FIG. 3 receives power consumption data 324 associated with DC 110. In an embodiment, feature initializer 304 receives power consumption data 324 by invoking an API call to a data store storing historic consumption data 140. Responsive to invocation, the API call retrieves the names of (e.g., all or some of) the rooms of (e.g., all or some of) the DC(s). The API call (in an embodiment) iterates over each DC and its room and retrieves the historical power consumption values of the power cells of that room from the last date of the data collection of that room. If the last date is not available, it sets the last date as now—predetermined number of days. The API call collects the power values until the minimum of [now−1 days, last date+7 days]. Collected power consumption data 324 is stored, in an embodiment, in a folder for each DC name\room name\year\month\date (e.g., as raw_ data directory in a blob storage). In an embodiment, a file (e.g., a CSV file) of power values is stored for that date. In an embodiment, a metadata file including the alternative names of the given room and its power sources is stored. In an example a subset of collected data is not included in the training dataset. Instead, this subset of data is utilized to test the accuracy of the ML model's results. For instance, the last three days of power data are utilized for validating the ML model's results.

In an embodiment, feature initializer 304 or time-series analyzer 306 of FIG. 3 obtains power consumption data utilizing a query. An example query for obtaining power consumption values in five minute intervals is shown below in Example PCV Query.

Example PCV Query

```
let Data center = '{current_dc_name}';
let colo = '{current_colo_name}-';
let sensorData= cluster('{current_cluster}').database('{current_db}').GetCETelemetry( )
| where DeviceName has Data center and DeviceName has colo and DataPointTag ==
'.Pwr.kW tot' and env_time between (datetime({current_data_collection_date}) .. 1d)
and DeviceName endswith "DPM01"
| summarize round(avg(Value),2), round(max(Value),2), round(min(Value),2),
round(stdev(Value),2) by bin(env_time, {args.aggregation_window}), DeviceName
| sort by DeviceName asc , env_time asc
| extend ThirdHyphenIndex1 = indexof(DeviceName, '—', 0)
| extend ThirdHyphenIndex2 = indexof(DeviceName, '—', ThirdHyphenIndex1 + 1)
| extend ThirdHyphenIndex3 = indexof(DeviceName, '—', ThirdHyphenIndex2 + 1)
| project env_time, DeviceName, avg_Value, max_Value, min_Value, stdev_Value,
cell = strcat(substring(DeviceName, 0, ThirdHyphenIndex3));
sensorData | summarize avg_Value = round(sum(todouble(avg_Value)), 0), max_Value
= round(sum(todouble(max_Value)), 0), min_Value =
round(sum(todouble(min_Value)), 0), stdev_Value =
round(sum(todouble(stdev_Value)), 0) by env_time, cell
| project PowerDeviceName=cell, CollectionTime = env_time, avg_AvgPowerInKw =
avg_Value, max_MaxPowerInKw = max_Value, min_MaxPowerInKw = min_Value,
stdev_AvgPowerInKw = stdev_Value
```

In embodiments, the data obtained utilizing Example PCV Query is stored in a data store as a table utilized for forecast result generation. In an embodiment, the service maintains the data as static data once generated. Each collected data, in one embodiment, is collected and saved for a DC, a room, and/or a power cell as a separate file/table in the data store. Table 2 below shows an example collection of data over five minute intervals for power cell 126A of FIG. 1 over 25 minute period.

TABLE 2

| Cell | Time | Avg Value | Min Value | Max Value | Stdev_Value |
|---|---|---|---|---|---|
| 126A | 24-12-12 00:00:00 | 80.04 | 80 | 80.1 | 0.05 |
| 126A | 24-12-12 00:05:00 | 80.05 | 80 | 80.1 | 0.05 |
| 126A | 24-12-12 00:10:00 | 80.05 | 80 | 80.1 | 0.05 |
| 126A | 24-12-12 00:15:00 | 80 | 79.9 | 80.1 | 0.06 |
| 126A | 24-12-12 00:20:00 | 80.01 | 79.9 | 80.1 | 0.06 |

In Table 2, each row represents the last five minutes of power consumed by power cell 126A. Time is a timestamp of the end of the five minute interval, Avg Value is the average percentage of power consumed by power cell 126A (e.g., percentage of 2 MW in an embodiment where a room of four power cells is allocated 8 MW of power), Min Value is the minimum percentage of power consumed by power cell 126A in the time interval, Max Value is the maximum percentage of power consumed by power cell 126A in the time interval, and Stdev_Value is the standard deviation of power consumption in the time interval.

In step 404, a determination of whether an ML model exists for the DC is made. For example, trainer 310 (or another component of model trainer 116) determines whether or not ML model 114 has already been trained for DC 110. If not, flowchart 400 proceeds to step 406. Otherwise, flowchart 400 proceeds to step 412.

In step 406, a time-series data set is determined based on the power consumption data, the time-series data set indicating power consumed by the DC over time. For example, time-series analyzer 306 determines a time-series data set 332 based on power consumption data 324 (e.g., and/or initialized features 328 and/or health indication 330). Time-series data set 332 indicates power consumed by DC 110 over time. In an embodiment, time-series analyzer 306 reads the name of each DC and room from the raw-data directory and creates the corresponding folder in a processed_data folder with empty CSVs for each power cell of that room, if they do not already exist. Time-series analyzer 306 reads the latest processed data date from each CSV. If the CSV is empty, then the last data date is considered as the first data collection date for the given (e.g., room). Time-series analyzer 306 adds the maximum power value in each 5-minute interval for a given DC, room, or cell from the collected data to the processed data CSV for each power cell. If a value for a particular timestamp for a particular cell is unavailable in the collected data, in an example, it inserts 0 as the power value for that timestamp in the processed data CSV, from the last processed date to the latest data collection date for the given room. In an example, it fills in the missing data values (values that are 0) of the processed data CSV for each cell.

In step 408, the ML model is generated (e.g., trained) based on the time-series dataset. For example, trainer 310 trains ML model 114 (or sub-models 316) based on time-series data 332. In an embodiment, trainer 310 (or a sub-component of time-series analyzer 306) determines features based on time-series data 332 and/or additional information associated with power cell(s) the model is being trained on. In an embodiment, and as shown in FIG. 3, time-series data 332 and/or determined features are fed to ML model 114 as training data 336. In an embodiment trainer 310 trains ML model 114 to determine forecasted power consumption of the DC over intervals of time based on training data 336.

In an embodiment, trainer 310 generates a power consumption history graph, determines the probabilistic distribution type of power values for each cell, assesses the effectiveness of different methods for replacing missing values by comparing time-series with missing values against those with replaced values, and plots and preserves the components of a time-series such as trends, cycles, and extreme values. In an embodiment, trainer 310 stores the output of this step in a data_analysis folder on the blob storage (not shown in FIG. 1 for brevity). In an embodiment, the power consumption history graph is provided to ML model 114 as part of training data 336.

Embodiments of the present disclosure analyze various features to determine training data. These features are used to determine a forecast of power usage of a DC, a room, and/or a power cell. In some embodiments, the features are derived based on an analysis of characteristics of DCs, power cells, servers, customers utilizing the servers, and/or the like. Additional details regarding these characteristics and their analysis are described with respect to FIGS. 19-25, as well as elsewhere herein. In embodiments, power consumption is determined for an entire DC, a room of a DC, or a power cell of the DC. Embodiments train an ML model (e.g., ML model 114 and/or a sub-model of sub-models 316) to determine the power consumption.

In embodiments, the training data comprises a number of feature vectors. In some examples, for any power source in a given room, the number of feature vectors equals the number of PUVs collected from that source. A feature vector comprises multiple elements, in embodiments. Example elements included in a feature vector include, but are not limited to, a PUV, a power source identifier (ID) that uniquely identifies the power source, a timestamp, biweekly statistics, hourly statistics, organizational elements, distribution parameters, lagged PUVs, and/or any other information that could be included in a feature vector for training an ML model to determine a forecast of power consumption based on the feature vector. Some example elements are further described as follows.

PUV: The last element of the feature vector is a PUV of the power source identified in the first element (described next). This is the element that the ML model uses to determine a forecast of power consumption when looking for safe maintenance windows. In training, the value of this element is known for (e.g., all) feature vectors, and is used as the ground truth during testing.

1. Power Source ID: This is an identifier of the power source in the given DC room. When a DC room has n power sources, each power source is identified with a value from 1 to n.

2-4. Timestamp: These three elements represent the time when the PUV listed in the last element was measured (or is to be forecasted). These include the time (a value between 1 to 1440 minutes), day (1~7), and week (1~52).

5-12. Biweekly Statistics: These eight elements represent various statistics of the power source identified in element #1, calculated using all PUVs collected during the last 14 days. In embodiments, times and durations in biweekly statistics are relative to the timestamp in elements #2-4. In some embodiments, 14 days are selected based on trend components (e.g., a trend component with a duration of one week) and model trainer 116 determining the ZRP DCs typically having a safe maintenance window within the next 14 days. For instance, on average model trainer 116 determines a DC's past 14 days of PUVs show the highest correlation with the next 14 days of PUVs. In an embodiment, the biweekly statistics comprise minimum, maximum, average, mode, standard deviation, and 25th, 50th, and 75th percentiles. In some embodiments, these values were unique for different power sources in different rooms of ZRP DCs. The inclusion of these statistics enables the ML model to be trained on how observed value of PUV relates to the running statistics of the PUV time-series. While biweekly statistics are used in this example, other increments of statistics can be used (e.g., daily, weekly, monthly, quarterly, and/or the like).

13-108. Hourly Statistics: In some embodiments, a strong seasonality component of power consumption repeats every 24 hours. In this context, hourly statistics for the minimum, maximum, average, and standard deviation of PUVs for each of the past 24 hours are included. These statistics enable the ML model to be trained on how their values in the previous 24 hours relate to the next PUV.

109-114. Organizational Elements: In some embodiments, different organizations have different power consumption trends. Thus, including information about statistics of the PUVs of the organization allocated to the power source trains the ML model to consider differences between workloads and behavior of different organizations, customers, and/or customer-types. In an example, the elements provide information about the organization (e.g., an organization code (a value between 1 and the number of organizations in DC), a mean and standard deviation of all PUVs (over the last 14 days) from all power sources assigned to the organization, and/or the top three peak hours of the organization in the past 24 hours, as some examples).

115-122. Distribution Parameters: In some embodiments, different PUV time-series follow different distributions. In this context, elements are included regarding the distribution that the time-series (of which the PUV in the last element is part of) follows. These include a distribution identifier (a value of 1 to n corresponding to the n distributions time-series analyzer 306 fits time-series data to) and up to m parameters (7 parameters in this example) that define the distribution. For the distributions that are fully defined by fewer than m parameters, the remaining elements to 0.

123-182. Lagged PUVs: In some embodiments, for a given power source, any of its PUVs can be (e.g., significantly) impacted by the PUVs of the last 60 minutes. Thus, the last 60 PUVs (averaged per minute) of the power source in the feature vector. In some embodiments, different lengths of time are determined to impact a PUV of a power source. In this context, different numbers of lagged PUVs are included in the feature vector.

In some embodiments, mutual correlation (MC) is calculated to determine the effectiveness of the feature vector. By calculating mutual correlation, trainer 310 (or pre-processor 318) assesses the relationship between features and predictands, independent of the ML algorithm. MC of 0 suggests no association between the given feature and predictand, while 1 indicates a complete overlap between the two. For example, FIG. 4B shows a graph of mutual correlation of features, in an example embodiment. In FIG. 4B, the averaged MC values for 7 types of features. In FIG. 4B, while the highest association exists between lagged PUVs and the predictand (MC=0.79), all types of features have non-zero MC values. This indicates that these types of features contain (e.g., useful) information for an ML algorithm to learn and generate accurate forecasts of power usage.

In embodiments, the processed power values CSVs of each cell are used as time-series data. Additional features are incorporated into each training dataset, such as hour of the day, day of the week, month, lag values derived from autocorrelation plots, and statistics of the power values (including mean, max, min, and median) for each row. Further features are added in subsequent iterations to enhance the accuracy of ML models. In some embodiments multiple types of model learning algorithms are trained (e.g., conventional, deep learning-based, and gradient boosting-based off-the-shelf ML algorithms) for each power cell. In this context, the model with the highest accuracy for each cell, along with a metadata file describing the best model and its mean error percentage, is saved (e.g., in a folder named model_set on blob storage).

In an embodiment, ML model 114 is trained to determine a forecast of power consumption values for a DC, a room, and/or a power cell in a predetermined sized interval (e.g., 1 minute intervals, five minute intervals, hour intervals, etc.) for the next predetermined amount of time (e.g., day, days, week, weeks, month, months, etc.). In an example where ML model 114 is an XGBoost model, ML model 114 is trained to fit a family of equations to a given data set. In this example, ML model 114 automatically creates activation functions during training that, when presented with test data, execute equations based on the values of certain elements of the feature vector to determine a forecast a power usage value.

In some embodiments, multiple models are trained (e.g., sub-models 316 of ML model 114 comprise separately trained models). In this context, each model is trained for a specific power cell of a room of a DC. Alternatively, a single model is trained to determine a forecast of PUVs for multiple power cells, rooms, and/or DCs. For example, an XGBoost implementation of ML model 114 is trained to utilize separate intrinsic activation functions for determining a forecast of PUVs of different power cells. By utilizing a single ML model trained to determine forecasts of power usage across multiple power cells, the ML model is able to learn subtle interdependencies that exist between time-series data of the power-cells. The interdependencies can be for power-cells within the same room, within the same DC (e.g., across different rooms), and/or within the same distributed system (e.g., across multiple DCs), depending on the implementation. By training a model to consider interdependencies of power cells, the accuracy of forecasted power usage and suggested maintenance windows is improved.

In embodiments utilizing a single ML model to determine a forecast of power usage across multiple power cells, additional feature data can be included in the feature vectors provided as training data. For instance, additional features related to DC IDs (e.g., for determining a forecast of usage across different DCs) and/or room IDs (e.g., for determining a forecast of usage across different rooms) can be considered, in an embodiment. These additional features are described as follows.

183 Data Center ID: an integer between 1 and the number of ZRP DCs that identifies the DC in which the power source identified in the first element is located.

184. Data Center Room ID: an integer between 1 to d that identifies the room in the DC containing the power source. d is the total number of rooms in the DC listed in element 184. These two elements, along with the power source ID in the first element of the feature vector, enable the ML model (e.g., an XGBoost model) to create separate activation functions for different DCs, different rooms in a given DC, and different power sources in a given room that exhibit different behaviors in their PUV time-series.

In embodiments, trainer 310 trains ML model 114 by feeding feature vectors in the training set for the given scenario to a training library and performing a grid search with (e.g., 10-fold) cross-validation to select the hyperparameters. In some embodiments, a model and its respective training data are region-locked. For instance, in an embodiment, a model is tied to a particular region (e.g., a particular DC, a particular country, a particular provenance, and/or other geolocation) such that the model and its training data are inaccessible to computing devices outside of that region. Thus, data protection is improved, as fewer devices and/or applications are able to access the data used for training.

Figure 4C:
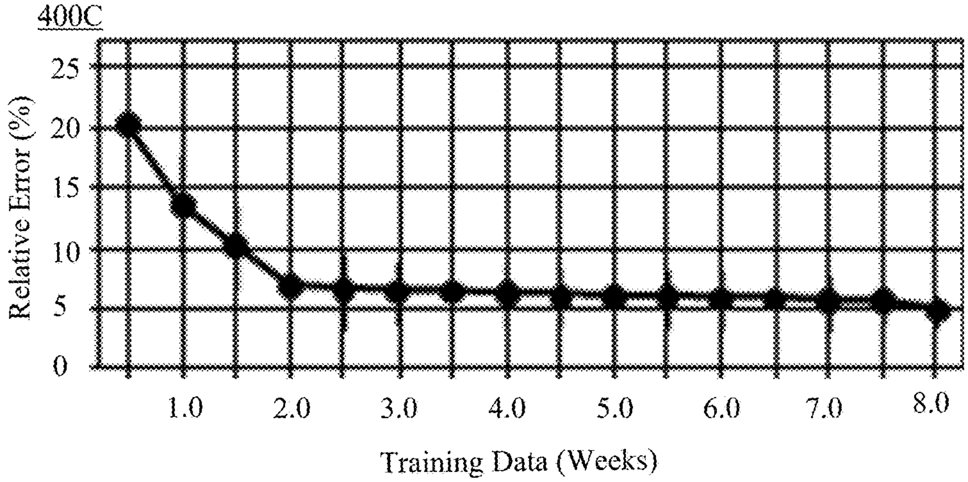
FIG. 4C shows a graph of relative error based on training data, in an embodiment.

In step 410, the ML model is evaluated. For example, model evaluator 312 evaluates ML model 114. Model evaluator 312 evaluates ML model 114 in various ways, in embodiments. For instance, in an embodiment, determining a forecast of an individual PUV is evaluated by quantifying forecast performance for individual PUV of a power cell utilizing relative error. In an embodiment, relative error (RE) is defined as |(determined forecasted value−actual value)|/actual value. FIG. 4C shows a graph 400C of relative error based on size of training data, in an example embodiment. In FIG. 4C, the RE is plotted in forecasting the next value using PUV data from past w weeks, where w ranges from 0.5 to 8 weeks. For any given value of w, 1000 PUVs are (e.g., randomly) selected to forecast such that for each PUV, at least w weeks of PUV data existed right before that PUV was collected. Next, for each of these 1000 PUVs, a forecasting model is generated using the w weeks of data collected right before this PUV. A forecast of the PUV is obtained using the model, and the RE is calculated, resulting in graph 400C. Any point corresponding to any value of w in FIG. 4C is the average of these 1000 RE values and the bars above and below that point represent the standard deviation of these 1000 values.

As shown in graph 400C, as w increases, RE decreases. The decrease is more rapid initially; however, as w reaches 2 weeks, the rate of decrease in the average RE reduces. With w=2 weeks, the average RE (in this example) is just 6%. The RE as well as the standard deviation both continued to decrease as w increased. More past data can be used to get lower RE. In some embodiments, a minimum RE (e.g., RE of 6%) is determined suitable for determining safe maintenance windows with (e.g., relatively) high accuracy.

Figure 4D:
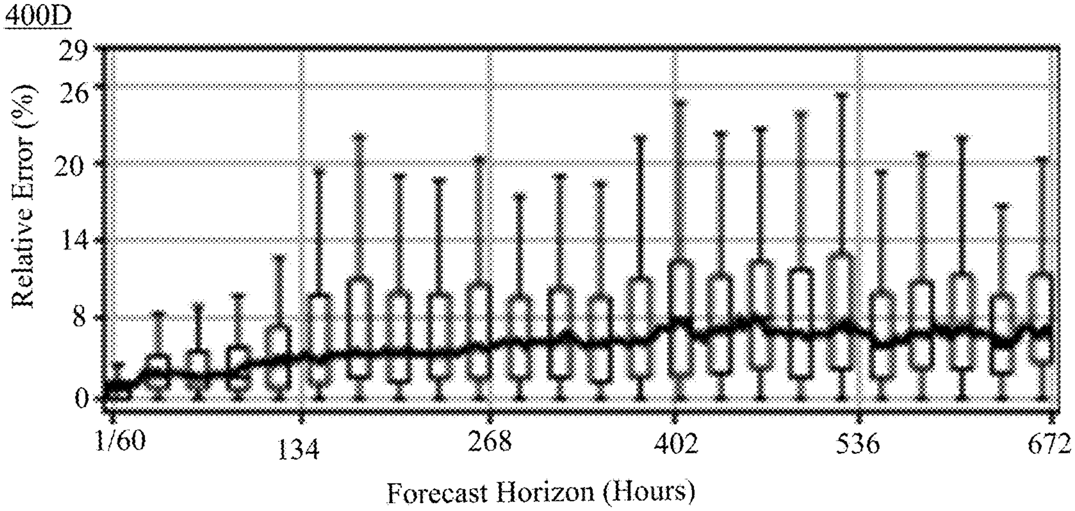
FIG. 4D shows a graph of relative error based on forecast time, in an embodiment.

FIG. 4D shows a graph 400D of relative error based on forecasting time, in an example embodiment. Graph 400D plots the RE in forecasting a power value h hours into future using data from 2 immediate past weeks, where h ranges from 1/60 (one minute) to 672 (four weeks). For any given h, 1000 sets of two-week PUV data are (e.g., randomly) selected. Next, a forecasting model is generated from each of these 1000 sets and iteratively forecasted the next h×60 PUVs (recall that we have one PUV per minute per source) for each of M sources. Furthermore, the RE of the h×60th forecasted PUV of each power source with the actual PUV of that power source is calculated, resulting in 1000 values of RE per power source and M×1000 values across all power sources. A box plot for any value of h in FIG. 4D is made from these M×1000 values. As shown in FIG. 4D, as RE is close to 2% on average for data forecasted up to five days into future. Beyond five days, the RE starts increasing but is still <6% for 2 weeks into future.

In some embodiments, ML model 114 is trained based on recent observations, e.g., observations made in the last 30 days, 60 days, two weeks, four weeks, 8 weeks, and/or the like. The reason for seeing less increase in RE between 2 to 4 weeks into the future is that various internal factors remain relatively stable. For example, long-term power usage averages, peak power usage hours, and seasonal effects persist, allowing the model to maintain consistency. Observing higher standard deviation with increasing value of h is because some external factors become more unpredictable over longer periods. For example, policy changes, weather changes, and national or regional holidays introduce unexpected variability that cause RE for some forecasts to get rather large.

In some embodiments, ZRP DCs schedule most maintenance tasks 1 week into future. In this context, by accurately forecasting power consumption two to four weeks in advance, such embodiments of model 114 are able to satisfy impact criterion with forecasts of safe maintenance windows. This results in a minimal RE (e.g., of only 3%) when forecasting PUVs a week in advance. Furthermore, in situations where maintenance is forecasted more weeks ahead (e.g., two weeks ahead), model 114 is trained to have a low RE (e.g., 6% for two weeks in the example).

In some embodiments, to quantify the performance, false positive rate (FPR) and true positive rate (TPR) are used to evaluate model 114. FPR is the ratio of the number of forecasted maintenance windows determined as safe but were actually unsafe to the number of forecasted maintenance windows determined as safe. TPR is the ratio of the number of forecasted maintenance windows determined as safe and were indeed safe to the number of actual safe maintenance windows.

In an example, to calculate FPR, 10,000 sets of two-week PUV data are (e.g., randomly) selected from the first 8 weeks of data. In some embodiments, the last 2 weeks are left out, as performance of safe maintenance window determination is evaluated up to two weeks in future in some examples. For each set of two-week data, a model is generated and utilized to generate a forecast for the next two weeks of PUVs for each power source. The forecasted PUVs of the power sources in each room are traversed and non-overlapping time windows of duration D are identified such that throughout each time window, the power utilization of the DC room was forecasted to stay under a threshold (e.g., 75%). In an embodiment, model evaluator 312 repeats this for five values of D: 10 min, 30 min, 1 hour, 2 hours, and 3 hours. The number of maintenance windows of duration D determined as safe based on forecasted power usage data is represented with $P^D$. In an embodiment, for each determined safe maintenance window for any given DC room, the corresponding actual PUVs of the power sources of that DC room are analyzed and a determination of whether the actual power utilization of the room stayed below 75% is made. The number of determined safe maintenance windows of duration D that were safe with are identified with $TP^D$. In this context, FPR is calculated as the ratio of $TP^D$ with $P^D$.

To calculate the TPR, for each of the 10,000 sets of two-week data, the actual PUVs of each power source are traversed for the next two weeks and non-overlapping time windows of duration D in which the power utilization of the DC room stayed under a threshold (e.g., 75%) are identified. In an embodiment, such time windows of duration D that had no overlap with any of the $TP^D$ safe maintenance windows determined based on the forecasted power usage are counted and represented with $TN^D$. In this manner, TPR is calculated as the ratio of $TP^D$ with $TP^D+TN^D$.

Figure 4E:
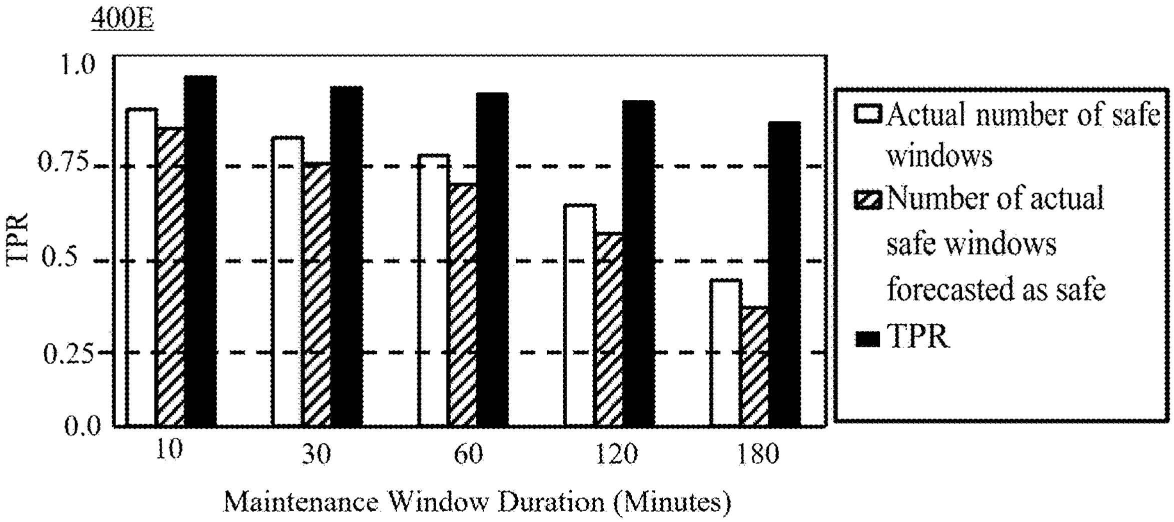
FIG. 4E shows a graph of true positive observations, in an embodiment.
Figure 4F:
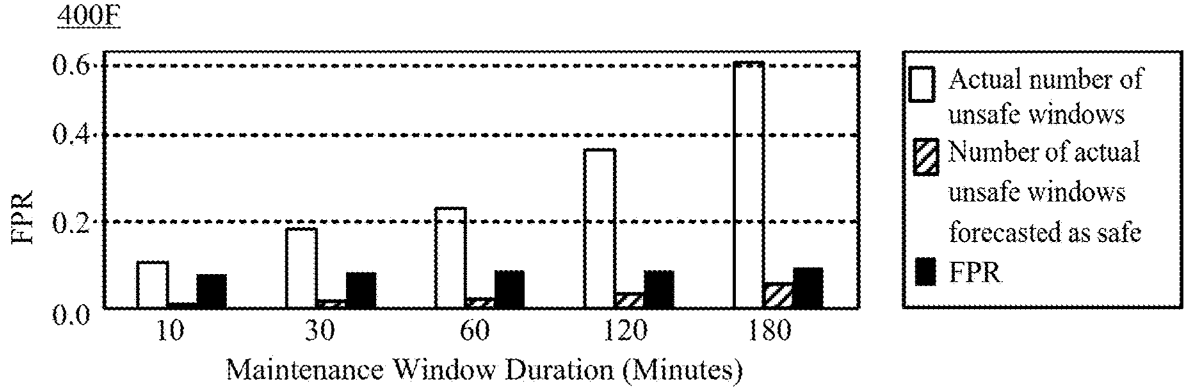
FIG. 4F shows a graph of true negative observations, in an embodiment.

FIGS. 4E and 4F plot the TPRs and FPRs, respectively, for values of D. In particular, FIG. 4E shows a graph 400E of true positive observations, in an example embodiment and FIG. 4F shows a graph 400F of true negative observations, in an example embodiment. As shown in FIGS. 4E and 4F, as D increases, the FPR increases and the TPR decreases. As the size of a time window to forecast power usage increases, the more chances of generating an erroneous forecast of a PUV and determining an unsafe maintenance window as safe also increases, and vice versa. However, in the examples shown in graphs 400E and 400F the longest maintenance window of D=3 hours, the FPR is 0.1, and TPR is 0.82. In some embodiments, the misclassification of windows in terms of False Positives and True Positives can be attributed to observed national and regional holidays during the data collection period. In an embodiment, a network administrator can further configure training of ML model 114 to consider factors such as national/regional holidays for various customers.

Figure 4G:
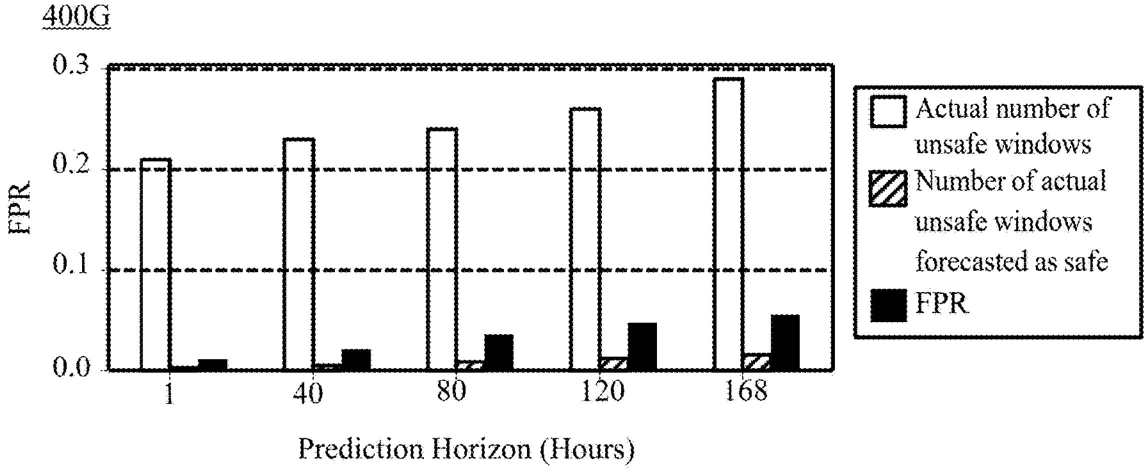
FIG. 4G shows a graph of 1-hour false positive observations, in an embodiment.

FIGS. 4E and 4F show TPRs and FPRs from all actually safe and forecasted to be safe maintenance windows over a two-week period after any selected two-week period in the 10,000 selected sets of two-week data. As PUV forecasts have lower RE when a forecast is made in near-future than in far-future, the FPR is lower for time windows identified in the near future. FIG. 4G shows a graph 400G of 1-hour false positive observations, in an example embodiment. FIG. 4G plots the FPR for one-hour maintenance windows (most maintenance operations take less than an hour) forecasted h hours in advance. In graph 400G, FPR approaches 0 when maintenance window determination is done close in the future. If a network administrator plans maintenance, e.g., 7 days in advance, they can determine multiple safe maintenance windows 7 days in the future. A day or two before the maintenance day, the administrator can leverage the near 0 FPR of forecasting approach and determine a forecast of PUVs again using the latest data to determine which previously determined windows (based on forecasted PUVs 7 days earlier) are still safe based on updated forecasted PUVs. If a window is still determined safe, the maintenance can be scheduled and/or performed during one of the safe windows. Alternatively, task performer 120 re-evaluates forecasted windows and modifies maintenance task performance based on which window is still considered safe.

In step 412, the precision of the existing ML model is evaluated. For example, model health evaluator 308 evaluates the precision of ML model 114 (e.g., utilizing techniques described elsewhere herein, e.g., as described with respect to FIG. 3).

In step 414, a determination of whether or not the precision of the existing ML model satisfies a model precision criterion is made. For example, model health evaluator 308 determines whether or not the precision of ML model 114 (or a sub-model) satisfies a model precision criterion. If so, flowchart 400 continues to step 416. Otherwise, flowchart 400 continues to step 406. In an embodiment where the precision is determined to not satisfy the model precision criterion, the existing model is discarded.

In step 416, the ML model is updated based on the received power consumption data. For example, model health evaluator 308 provides a health indication 334 to trainer 310 and causes trainer 310 to update ML model 114 based on power consumption data received since ML model 114 was last updated.

Thus, an example process of training and/or updating a ML model to forecast power consumption for use in determining a safe maintenance window is described. By training the ML model in this manner, embodiments enable applications to identify time windows in the future where the expected power usage of power sources located in the same physical location (room) is below a certain threshold. Thus, maintenance is able to be performed while reducing the chance of (or completely avoiding) power blackouts caused by scheduled maintenance tasks/operations.

Figure 5:
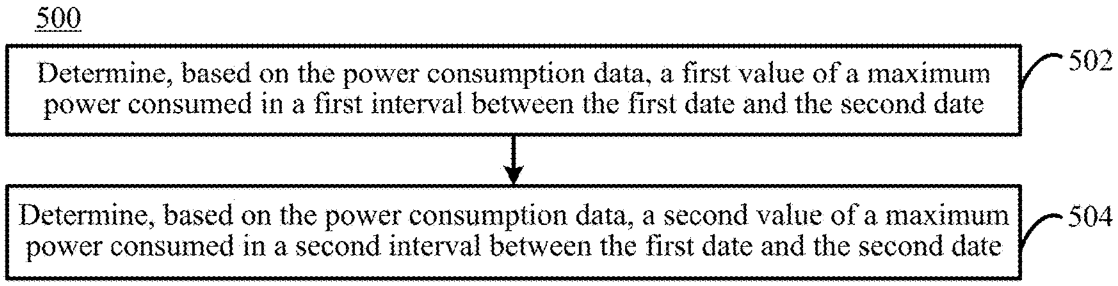
FIG. 5 shows a flowchart of a process for determining historical power consumption of a data center, in an embodiment.

Embodiments of feature initializer 304 and/or time-series analyzer 306 operate in various ways to determine historic power consumption of a DC. For example, FIG. 5 shows a flowchart 500 of a process for determining historical power consumption of a DC, in an example embodiment. In an embodiment, system 300 operates in accordance with one or more steps of flowchart 500. Note that not all steps of flowchart 500 need be performed in all embodiments. Further structural and operational embodiments will be apparent to persons skilled in the relevant art(s) based on the following description of FIG. 5 with respect to FIG. 3.

Flowchart 500 begins with step 502. In step 502, a first value of a maximum power consumed in a first interval is determined based on the power consumption data, the first interval between the first and second dates. For example, time-series analyzer 306 determines a first value of a maximum power drawn in a first interval (e.g., a five minute interval) between a date range.

In step 504, a second value of a maximum power consumed in a second interval is determined based on the power consumption data, the second interval between the first and second dates. For example, time-series analyzer 306 determines a second value of a maximum power drawn in a second interval (different from the first) between the date range. In this manner, embodiments of time-series analyzer 306 determine instances of maximum power consumption drawn over intervals of time of a DC (or component thereof). The determined instances are utilized in generation of training data for training an ML model to determine forecasted power consumption data of a DC.

Figure 6:
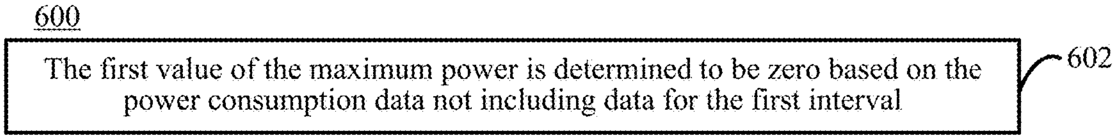
FIG. 6 shows a flowchart of a process for determining a maximum power consumed by a data center in an interval of time, in an embodiment.

As described herein, training data is generated in various ways. For instance, FIG. 6 shows a flowchart 600 of a process for determining a maximum power consumed by a DC in an interval of time, in an example embodiment. In an embodiment, time-series analyzer 306 operates in accordance with one or more steps of flowchart 600. Note that flowchart 600 need not be performed in all embodiments. Further structural and operational embodiments will be apparent to persons skilled in the relevant art(s) based on the following description of FIG. 6 with respect to FIG. 3.

Flowchart 600 comprises step 602. In step 602, the first value of the maximum power is determined to be zero based on the power consumption data not including data for the first interval. For example, time-series analyzer 306 of FIG. 3 inserts zero values for instances where power consumption data is missing in power consumption data 324. In this manner, time-series analyzer 306 is able to generate a uniform sized table or list of power consumption data for use in training an ML model or sub-model.

Figure 7:
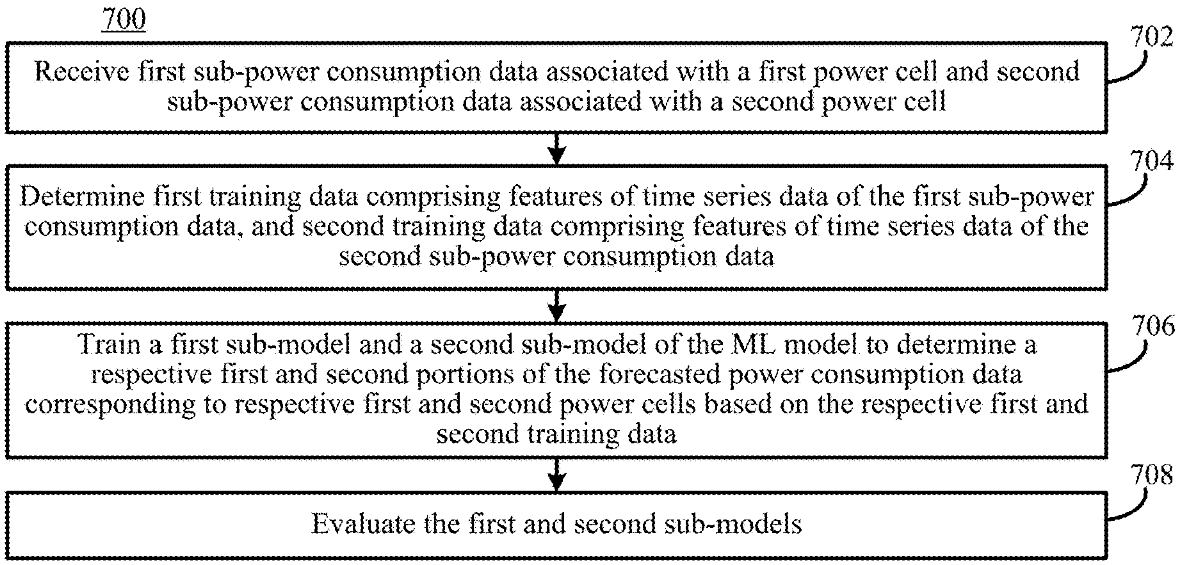
FIG. 7 shows a flowchart of a process for training multiple sub-models to forecast power consumption of respective power cells, in an embodiment.

In some cases, ML model 114 comprises multiple sub-models (e.g., sub-models 316). In embodiments, sub-models 316 are trained in various ways. For instance, FIG. 7 shows a flowchart 700 of a process for training multiple sub-models to forecast power consumption of respective power cells, in an example embodiment. In an embodiment, model trainer 116 operates in accordance with one or more steps of flowchart 700. Note that not all steps of flowchart 700 need be performed in all embodiments. Further structural and operational embodiments will be apparent to persons skilled in the relevant art(s) based on the following description of FIG. 7 with respect to FIG. 3.

Flowchart 700 begins with step 702. In step 702, first and second sub-power consumption data is received, the first-sub power consumption data is associated with a first power cell of the DC and the second sub-power consumption data is associated with a second power cell of the DC. For example, model trainer 116 receives power consumption data 324 comprising power consumption data measured by power sensor 314A (associated with a first power cell) and power sensor 314B (associated with a second power cell). Power consumption data for individual power cells is received in a similar manner as described with respect to step 402 of flowchart 400A of FIG. 4A, as well as elsewhere herein.

In step 704, first training data comprising features of time-series data of the first sub-power consumption data and second training data comprising the features of time-series data of the second sub-power consumption data are determined. For example, time-series analyzer 306 and/or trainer 310 determines training data for the power cells in a similar manner as described with respect to steps 406 and/or 408 of flowchart 400A, as well as elsewhere herein (e.g., based on a portion of power consumption data 324 measured by power sensor 314A and another portion measured by power sensor 314B). In some instances, time-series analyzer 306 and/or trainer 310 determines features of a training maintenance task to include in the first and/or second training data.

In step 706, a first sub-model of the ML model is trained (utilizing the first training data) to determine a first portion of the forecasted power consumption data corresponding to a first power cell of the DC and the second sub-model of the ML model is trained (utilizing the second training data) to determine a second portion of the forecasted power consumption data corresponding to a second power cell of the DC. For example, trainer 310 trains sub-models 316 of ML model 114 for different power cells based on respective training data, e.g., in a similar manner as described with respect to step 408 of flowchart 400A, as well as elsewhere herein.

In step 708, the first and second sub-models are evaluated. For example, model evaluator 312 evaluates sub-models 316 in a similar manner as described with respect to step 410 of flowchart 400A, as well as elsewhere herein.

IV. Maintenance Window Suggestion and Task Performance Embodiments

Figure 8:
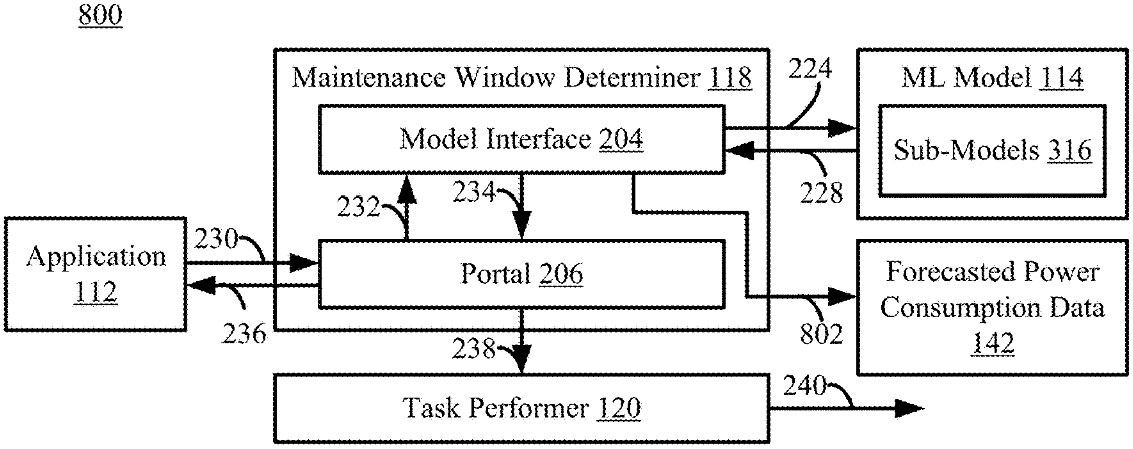
FIG. 8 shows a block diagram of a system for determining a window recommendation and performing a task, in an embodiment.
Figure 9:
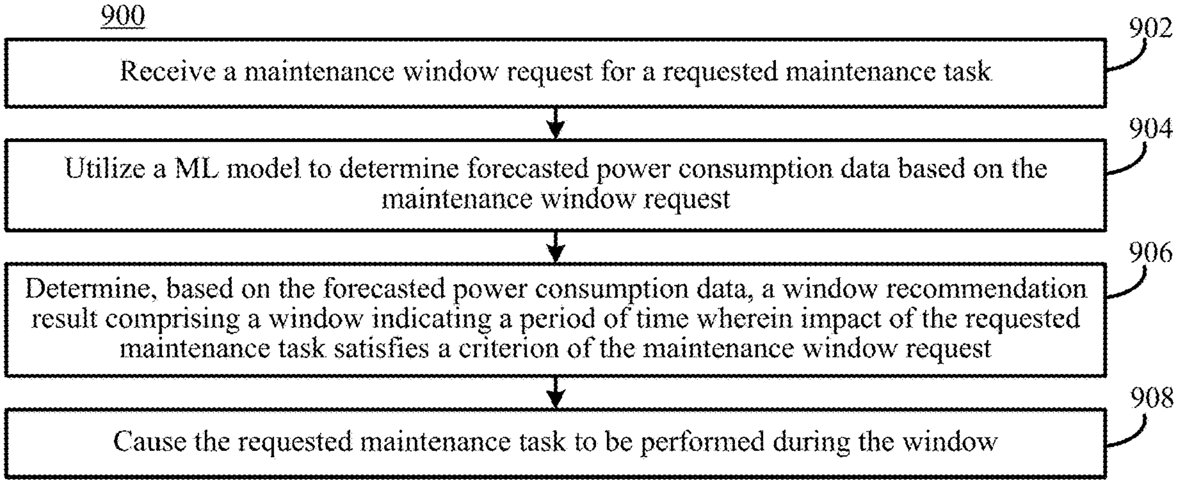
FIG. 9 shows a flowchart of a process for determining a window recommendation and performing a task, in an embodiment.

As described herein, in embodiments, maintenance window determiner 118 is utilized to suggest a window to perform maintenance on a DC. Systems comprising maintenance window determiner 118 can be configured in various ways. For example, FIG. 8 shows a block diagram of a system 800 for determining a window recommendation and performing a maintenance task, in an example embodiment. As shown in FIG. 8, system 800 comprises application 112, ML model 114 (comprising sub-models 316, as described with respect to FIG. 3) maintenance window determiner 118 (comprising model interface 204 and portal 206, as described with respect to FIG. 2), task performer 120, and forecasted power consumption data 142. To better understand the operation of system 800, FIG. 8 is described with respect to FIG. 9. FIG. 9 shows a flowchart 900 of a process for determining a window recommendation and performing a task, in an example embodiment. In an embodiment, maintenance window determiner 118 of FIG. 8 operates in accordance with one or more steps of flowchart 900. Note that not all steps of flowchart 900 need be performed in all embodiments. Further structural and operational embodiments will be apparent to persons skilled in the relevant art(s) based on the following description of FIG. 9 with respect to FIG. 8.

Flowchart 900 begins with step 902. In step 902, a maintenance window request is received for a requested maintenance task with respect to a DC. For example, portal 206 receives maintenance window request 230, as shown in FIG. 8. In an embodiment, the maintenance window request 230 is an application programming interface (API) call. In an embodiment, maintenance window request 230 comprises an endpoint of maintenance window determiner 118, one or more parameters (e.g., an identifier of the DC maintenance is to be performed on, the room (or other colocation) that maintenance is to be performed on/in, a range of dates maintenance is to be performed in (e.g., a preferred time window, a preferred date, a preferred range of dates (e.g., workdays, weekends, and/or the like), a preferred time of day within a range of dates (e.g., during work hours and/or the like), etc.), an indication of whether or not the range of dates can be shifted (and by how much), a power threshold (e.g., in MW), a requested format for a response from maintenance window determiner 118, an expected length of time of the maintenance, which power cell (or other component of the room) maintenance is to be performed on, and/or any other parameter associated with the requested maintenance task), and/or any other information associated with the requested maintenance task.

In some embodiments, portal 206 checks the parameters of the maintenance window request to determine the maintenance window request is valid. For instance, portal 206 checks if the DC is a valid DC, the room of the DC is a valid room, the power cell is a valid power cell, the date range is a valid date range, and/or any other parameter included in the request is valid (e.g., based on a rule of portal 206). For instance, an implementation of portal 206 validates a date range if the minimum date is the current date (or a predetermined minimum number of days past the current date) and the maximum date is below a forecast limit of ML model 114. In this context, portal 206 ensures the accuracy of power consumption forecast results generated by ML model 114 satisfies a forecast accuracy criterion (e.g., is above a predetermined threshold). In embodiments, portal 206 determines the maintenance window request is invalid, portal 206 returns an invalid request response to application 114 (not shown in FIG. 8). In an example, the invalid request response includes details on which parameters of the request are invalid and/or a sample of a valid response. If the request is valid, flow continues to step 904.

In step 904, an ML model is utilized to determine forecasted power consumption data of the DC based on the maintenance window request, the ML model trained to forecast power consumption data of the DC over intervals of time. For example, portal 206 causes model interface 204 to utilize ML model 114 to generate forecasted power consumption data 142. For example, suppose maintenance window request 230 requests a maintenance window for room 122A of FIG. 1 where power consumption by power cells 126A-126D is below a threshold (e.g., 1.6 megawatts). In this context, model interface 204 places a call 224 to ML model 114 to cause ML model 114 (e.g., comprising submodels for power cells 126A-126D and/or a model for room 122A) to determine forecasted power consumption result 228 indicative of a forecast of power consumed by room 122A.

In an example embodiment, model interface 204 stores forecasted power consumption result 228 as forecasted power consumption data 802 (e.g., as a portion of or all of forecasted power consumption data 142). In an embodiment, model interface 204 transforms the data (e.g., prior to storage thereof), e.g., flattening and converting a file into a list where each item of the list represents a row for a table (e.g., a "forecasts_table" table). In an example, a table comprises lists "dc_name", "room_name", "cell_name", "timestamp", and "forecasted_power_consumption_value". In an example, rows of data are filtered out based on a forecast time of the data such that data not already stored in a data store remains, thus reducing the amount of data transmitted from model interface 204 to the data store storing forecasted power consumption data 142). In an example, transformed data is appended to already stored forecasted power consumption data. By storing forecasted power consumption data in a data store (e.g., storage 108 of FIG. 1), model interface 204 enables later usage of forecasted power consumption result 228 (e.g., for determining a window recommendation result in response to another maintenance window request without having to utilize ML model 114 to determine forecasted power consumption data for the time interval corresponding to forecasted power consumption result). This can reduce compute resources by reducing the number of calls placed to ML model 114 or reducing the amount of redundant forecasted power consumption results determined by ML model 114.

In step 906, a window recommendation result is determined based on the forecasted power consumption data, the window recommendation result comprising a window indicating a period of time wherein impact of the requested maintenance task satisfies a criterion of the maintenance window request. For example, model interface 204 (or portal 206) of FIG. 2 determines a window recommendation result from forecasted power consumption result 228 comprising a window indicating a period of time wherein impact of maintenance task requested in maintenance window request 230 satisfies a criterion of the request. For instance, an embodiment of model interface 204 evaluates forecasted power consumption result 228 and identifies a period of time where power consumed by the DC, the room, and/or the power cell is below a threshold amount. In some embodiments, the maintenance window is referred to as a "safe maintenance window." In an example embodiment, a safe maintenance window for a room is a period of time where power usage of the room is below (n−1)/n times the total power that all n power sources can provide. In some embodiments, model interface 204 identifies multiple periods of time. In some embodiments, a minimum length of time is specified in maintenance window request 230. Alternatively (or additionally), model interface 204 determines the window based on an estimated length of time for the maintenance task (e.g., based on historical performances of tasks similar to the requested task). In some embodiments, model interface 204 implements a ML model trained to suggest maintenance windows based on forecasted power consumption data 142 and information included in maintenance window request 230. In this context, the ML model is trained to determine maintenance windows that are most likely to satisfy given parameters of a maintenance request (e.g., maximum power consumption, length of time for a task to be performed, number of servers impacted, etc.). In an embodiment, the ML model is trained to indicate a likelihood that the maintenance task is satisfied in a determined maintenance window suggestion. Alternatively, as described further with respect to FIG. 13, portal 206 accesses previously generated forecasted power consumption data 142 to determine the window recommendation result.

In step 908, the requested maintenance task is caused to be performed during the first window. For example, portal 206 causes task performer 120 to perform a maintenance task 240 during the first window (or schedule the maintenance task to be performed during the first window). Maintenance task 240 includes any type of ad-hoc or routine maintenance task described herein, or a sub-step thereof. In an embodiment, maintenance task 240 includes notifying a tenant and/or user account associated with a workload hosted by a server for which maintenance is scheduled. For example, suppose a maintenance task 240 causes maintenance to be scheduled for power cell 126A of FIG. 1 and that power cell 126A powers servers of tile 136A. Further suppose a customer, "Customer M," has a workload executing on a server of tile 136A. In this context, task perform 120 causes a notification to be sent (e.g., via e-mail, via text-message, via an application portal, via a push notification, and/or the like) to a computing device of Customer M. The notification indicates that maintenance has been scheduled for DC 110, a time window that the maintenance will take place, and a potential impact to the performance of Customer M's workload during that time.

In some embodiments, task performer 120 causes maintenance window determiner 118 to reevaluate a maintenance window prior to scheduled maintenance. For instance, suppose maintenance task 240 comprised scheduling a maintenance task on a particular date where power consumption is expected to satisfy restrictions indicated in maintenance window request 230. In an embodiment maintenance task 240 also comprises scheduling a reevaluation of maintenance window request 230 at a time that precedes the scheduled maintenance (e.g., 24 hours prior, a day prior, a week prior, and/or the like). In this example, the reevaluation causes maintenance window determiner 118 to reevaluate forecasted power consumption for the power cell or power cells that maintenance is to be performed on (e.g., based on updated data learned since the original forecast). If the forecasted power consumption no longer satisfies restrictions of maintenance window request 230 (e.g., the expected power consumption exceeds a limit, the length of the available maintenance window is shorter than required by maintenance window request 230, and/or the like), maintenance window determiner 118 notifies application 112 that the maintenance window is no longer valid. In this context, maintenance window determiner 118 suggests an alternative maintenance window. In another embodiment, maintenance window determiner 118 automatically schedules maintenance for the next available window that satisfies criterion of maintenance requests 230 and notifies application 112 of the rescheduled window.

FIG. 9 has been described with respect to model interface 204 receiving forecasted power consumption result 228 responsive to call 224 generated responsive to maintenance window request 230; however, embodiments described herein are not so limited. For instance, in some examples, model interface 204 causes ML model 114 to generate forecasted power consumption results at regular intervals (e.g., once every day, once every number of hours, predetermined times during a week, and/or the like). In this context, forecasted power consumption data can be generated prior to maintenance window requests being received. Additional details regarding this implementation are described with respect to FIG. 13A, as well as elsewhere herein.

Task performer 120 operates in various ways to perform a maintenance task. For instance, FIG. 10 shows a flowchart 10000 of a process for performing a maintenance task, in an example embodiment. In an embodiment, task performer 120 operates in accordance with flowchart 1000. Note that flowchart 1000 need not be performed in all embodiments. Further structural and operational embodiments will be apparent to persons skilled in the relevant art(s) based on the following description of FIG. 10 with respect to FIG. 8.

Flowchart 1000 comprises step 1002. In step 1002, the requested maintenance task is performed during the first window. For example, task performer 120 performs maintenance task 240, as described elsewhere herein. In an embodiment, maintenance task 240 is a sub-step of the requested maintenance task. In another embodiment, maintenance task 240 causes another component or system to perform a step or the entirety of the requested maintenance task.

In some embodiments, task performer 120 causes a step or sub-task to be performed in preparation for a maintenance task. For instance, FIG. 11 shows a flowchart 1100 of a process for preparing for a maintenance task, in an example embodiment. In an embodiment, task performer 120 operates in accordance with flowchart 1100. Note that flowchart 1100 need not be performed in all embodiments. Further structural and operational embodiments will be apparent to persons skilled in the relevant art(s) based on the following description of FIG. 11 with respect to FIG. 8.

Flowchart 1100 comprises step 1102. In step 1102, prior to performing the requested maintenance task, data stored by the first server of the DC is migrated to a second server of the datacenter. For example, prior to performing a maintenance request with respect to a power cell 126A powering tile 136A, task performer 120 causes data stored by a server of tile 136A to be transferred to a server of another tile powered by another power cell (e.g., tile 136B powered by power cell 126B or a tile of another room (e.g., of Room 122B) or a tile of another DC, not shown in FIG. 1). In an embodiment where the data is tied to a particular region, task performer 120 causes data stored by the server of tile 136A to be transferred to a server, tile, room, or DC that is also tied to that particular region.

In some embodiments, maintenance window determiner 118 operates to determine a window recommendation result with a window falling within a range of dates. For instance, FIG. 12 shows a flowchart 1200 of a process for determining a maintenance window based on a range of dates, in an example embodiment. In an embodiment, maintenance window determiner 118 operates in accordance with one or more steps of flowchart 1200. Note that not all steps of flowchart 1200 need be performed in all embodiments. Further structural and operational embodiments will be apparent to persons skilled in the relevant art(s) based on the following description of FIG. 12 with respect to FIG. 8.

Flowchart 1200 begins with steps 1202-1206. In an embodiment, steps 1202-1206 are further embodiments of step 904 of flowchart 900 of FIG. 9. In step 1202, the ML model is provided with a range of dates the requested maintenance task is to be performed within. For example, maintenance window request 230 comprises a range of dates in which a user of application 112 desires the maintenance task to be performed. Model interface 204 places a call 224 to ML model 114 comprising the range of dates. Alternatively, portal 206 accesses previous forecasted power consumption data 142 for the range of dates.

In step 1204, the ML model is caused to determine forecasted power consumption data for the DC over a set of intervals within the range of dates. For instance, ML model 114, responsive to receiving call 224, determines forecasted power consumption data for DC 110 (or a component thereof) for intervals within the range of dates.

In step 1206, a forecast of power consumption for a power cell is received from the ML model. For instance, model interface 204 receives forecasted power consumption result 228 comprising power consumption data for the range of dates. In an embodiment, forecasted power consumption result 228 comprises power consumption data for a power cell, a room, or the DC, depending on the implementation.

Flowchart 1200 continues to step 1208. In an embodiment, step 1208 is a further embodiment of step 906 of flowchart 900 of FIG. 9. In step 1208, the window recommendation result is determined based on the forecasted power consumption, the window recommendation result comprising the first window, the first window within the range of dates. For instance, model interface 204 determines, based on forecasted power consumption result 228 comprising power consumption data for the range of dates, a window recommendation result. In an embodiment, model interface 204 provides the window recommendation result to portal 206 as forecast data signal 234. Alternatively, model interface 204 provides forecasted power consumption result 228 to portal 206 and portal 206 determines the window recommendation result. In an embodiment, portal 206 provides the window as a recommended maintenance window to application 112 in maintenance window response 236.

In some embodiments, maintenance window determiner 118 determines forecasted power consumption data independent of a received maintenance window request. For example, FIG. 13A shows a flowchart 1300A of a process for forecasting power consumption offline, in an example embodiment. In an embodiment, model trainer 116 operates in accordance with flowchart 1300A. Note that flowchart 1300A need not be performed in all embodiments. Further structural and operational embodiments will be apparent to persons skilled in the relevant art(s) based on the following description of FIG. 13A with respect to FIG. 8.

Flowchart 1300A comprises step 1302. In step 1302, the ML model is caused to determine the forecasted power consumption prior to the maintenance window determiner receiving the maintenance window request. For example, model interface 204 of FIG. 8 in an embodiment utilizes ML model 114 to generate forecasted power consumption result 228 prior to portal 206 receiving window request 230 (or otherwise independent of portal 206 receiving the request). In an implementation, model interface 204 causes ML model 114 to generate a result for a set of intervals (e.g., 1 minute intervals, 5 minute intervals, hourly intervals, and/or the like) over a range of dates (e.g., a range of dates with a minimum date value of the current date or a last date forecasted power consumption data was generated for and a maximum date value determined based on a setting of ML model 104 (e.g., a three week forecast, a period in which accuracy of results of ML model 104 satisfies a threshold, and/or the like), and/or the like). In an embodiment, model interface 204 iterates over ML model 114 for the requested power cell and/or its associated room. In an embodiment, results are generated from the latest forecast timestamp of a stored file in a forecasts folder to another forecast timestamp.

In an embodiment, if there are no previous forecasts available for a given cell, it assigns the current timestamp as the start forecast timestamp. The end forecast time is then set as the current timestamp+a number of days (e.g., 21 days (3 weeks)). Subsequently, ML model 114 determines forecasted power consumption values for (e.g., 5-minute) intervals between the start forecast time and the end forecast time. In an embodiment, the forecasts, along with the corresponding timestamp and an identifier of the cell, are saved in a new_forecasts CSV file inside a forecasts folder on a blob storage.

In this manner, the power draw of each cell in each room of DC 110 (and, optionally, other DCs) are forecasted. DCs are able to utilize the respective $M_{AP}$PM for the next predetermined period of time (e.g., three weeks). In an embodiment, ML model 114 is caused to generate forecasted power consumption data 142 in this manner on a periodic basis (e.g., every three weeks). In an embodiment, forecasted power consumption data 142 is uploaded in a format available to multiple portals/maintenance window determiners/requesting applications.

For example, responsive to portal 206 of FIG. 8 receiving a maintenance window request, an implementation of portal 206 obtains forecasted data for the date range in the request. In this context, portal 206 transforms the obtained data and determines a window recommendation result. Some embodiments of portal 206 return a response in a format specified in the request. For instance, an example of portal 206 returns a response comprising a graph of power consumption over the date range and one or more window recommendations. Graphs of power consumption over time can be displayed in various ways. For example, FIG. 13B shows a graph 1300B of power consumption over a requested date range, in an example. In embodiments, portal 206 returns a response indicating which of the windows in graph 1300B are a recommended window for performing maintenance (and, optionally, the forecasted power consumption of the room at that time).

Portal 206 determines the suggested maintenance window (or windows) in various ways. For instance, in an embodiment where the maintenance is to be performed on a power cell for a room, portal 206 (e.g., by executing a data transformer routine) obtains the forecasted power consumption data for the requested date range. The data transform routine adds up forecasted power consumption for the power cells of the room at each time stamp to determine the cumulative power consumption at all timestamps of the forecast window. Portal 206 determines a sequence of timestamps that has a length of at least equal to the length of the maintenance task (if provided) (or above a predetermined threshold (e.g., if a length of the task was not provided in the request)) where the power consumption for each timestamp in the window satisfies impact criterion (e.g., the likelihood of power consumption above the requested limit is below a threshold, the likelihood of throttling is below a threshold, the number of compute resources to be throttled is below a threshold, the likelihood of a blackout is below a threshold, and/or the like).

Figure 14:
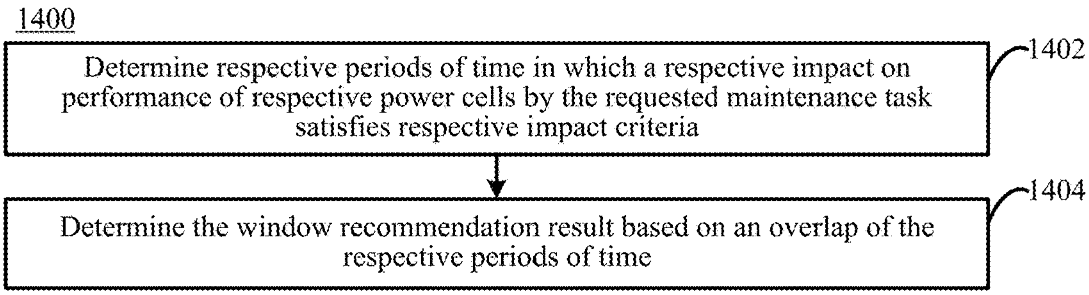
FIG. 14 shows a flowchart of a process for determining a window recommendation result for multiple power cells, in an embodiment.

In some embodiments, a maintenance task is to be performed with respect to multiple power cells and/or rooms. Some implementations of maintenance window determiner 118 determine a window recommendation result that satisfies impact criteria for the multiple power cells and/or rooms. For instance, FIG. 14 shows a flowchart 1400 of a process for determining a maintenance window result for multiple power cells, in an example embodiment. In an embodiment, maintenance window determiner 118 operates in accordance with one or more steps of flowchart 1400. Note that not all steps of flowchart 1400 need be performed in all embodiments. In an example, flowchart 1400 is a further example of step 906 of FIG. 9. Further structural and operational embodiments will be apparent to persons skilled in the relevant art(s) based on the following description of FIG. 14 with respect to FIG. 8.

Flowchart 1400 begins with step 1402. In step 1402, respective periods of time in which a respective impact on performance of respective power cells by the requested maintenance task satisfies respective impact criteria are determined. For example, maintenance window request 230 of FIG. 8 was a request for maintenance to be performed with respect to power cells 126A and 126B of FIG. 1. In this context, portal 206 provides information 232 indicating the maintenance to be performed and the power cells that maintenance is to be performed on (and optionally a range of dates and/or times the maintenance is desired to be performed in) to model interface 204. Model interface 204 places call 224 to ML model 114 to cause ML model 114 to determine forecasted power consumption result 228 indicative of a forecast of power consumed by power cells 126A and 126B (and, optionally, other power cells of DC 110 and/or power cells of other DCs). Model interface 204 determines, based on forecasted power consumption result 228, respective periods of time in which a respective impact on performance of power cells 126A and 126B by the requested maintenance task satisfies respective impact criteria is determined.

In an embodiment, model interface 204 places a call to a first sub-model of sub-models 316 trained to determine a first portion of forecasted power consumption data corresponding to power cell 126A and a call to a second sub-model of sub-models 316 trained to determine a second portion of forecasted power consumption data corresponding to power cell 126B. In this context, model interface 204 receives separate responses from the sub-models or a combined response, depending on the implementation. Model interface 204 determines, based on the first portion of forecasted power consumption data, a period of time in which an impact on performance of power cell 126A by the requested maintenance task satisfies a cell impact criterion of power cell 126A. Model interface 204 also determines, based on the second portion of forecasted power consumption data, a period of time in which an impact on performance of power cell 126B by the requested maintenance task satisfies a cell impact criterion of power cell 126B.

In step 1404, the window recommendation result is determined based on an overlap of the respective periods of time. For example, model interface 204 of FIG. 8 determines the window recommendation result based on an overlap in the respective periods of time determined in step 1404. For instance, in an example where separate sub-models are utilized to determine first and second portions of forecasted power consumption data, model interface 204 determines the window recommendation result based on an overlap in the period of time the cell impact criterion of power cell 126A is satisfied and the period of time the cell impact criterion of power cell 126B is satisfied. In this context, maintenance window determiner 118 is able to determine a window recommendation result where maintenance can be performed on multiple power cells with a reduced likelihood of negatively impacting workloads and/or other operations of the DC.

Figure 15:
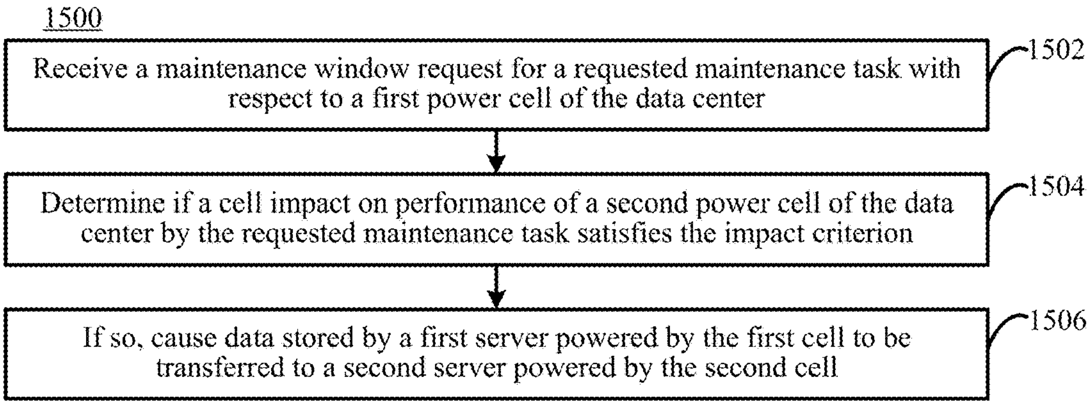
FIG. 15 shows a flowchart of a process for data migration, in an embodiment.

In some embodiments, maintenance window determiner 118 determines data is to be migrated from one server to another as part of maintenance tasks (or pre-maintenance tasks). Maintenance window determiner 118 operates in various ways to determine which server to migrate data to. For example, FIG. 15 shows a flowchart 1500 of a process for migrating data between servers, in an example embodiment. In an embodiment, maintenance window determiner 118 operates in accordance with one or more steps of flowchart 1500. Note that not all steps of flowchart 1500 need be performed in all embodiments. Further structural and operational embodiments will be apparent to persons skilled in the relevant art(s) based on the following description of FIG. 15 with respect to FIG. 8.

Flowchart 1500 begins with step 1502. In step 1502, a maintenance window request is received for a requested maintenance task with respect to a first power cell of the DC. For example, suppose portal 206 receives maintenance window request 230 for a maintenance task to be performed with respect to power cell 126A.

In step 1504, a determination of whether or not a cell impact on performance of a second power cell of the DC by the requested maintenance task satisfies the impact criterion is made. For example, suppose portal 206 determines if a cell impact on performance of a different power cell of DC 110 (e.g., power cell 126B) satisfies an impact criterion. The second power cell can be located in the same or different room and/or DC. In some implementations, maintenance window determiner 118 is power-aware of multiple power cells within a DC (or across DCs) when determining a window recommendation result. If the cell impact satisfies the impact criterion, flowchart 1500 continues to step 1506. Otherwise, portal 206 evaluates another cell, determines a recommendation without evaluating other cells, or determines a window recommendation does not fall within the parameters of the maintenance window request.

In step 1506, if the cell impact satisfies the impact criterion, data stored by a first server powered by the first cell is caused to be transferred to a second server powered by the second power cell. For example, task performer 120 causes data stored by a server powered by power cell 126A to be transferred to a different server powered by the other power cell (e.g., power cell 126B). In this context, maintenance window determiner 118 performs power-aware workload relocation by using the forecasted PUVs of various power sources along with patterns in PUV time-series to move workloads within DCs or across DCs to balance the load on various power sources. This further improves the performance of a DC during maintenance and reduces the likelihood of blackouts. For instance, maintenance window determiner 118 can suggest a maintenance window where power consumption by the first power cell (e.g., power cell 126A) does not normally satisfy impact criteria by relocating data/compute resources executed by servers powered by the power cell to servers powered by under-utilized power cells.

In some embodiments, the power-aware workload relocation considers whether or not the first power cell or second power cell receives energy from a renewable energy source (e.g., solar, wind, and/or the like). In this context, the maximum power the second power cell can support at a particular time of day or year can fluctuate (e.g., solar energy on a cloudy day or at night relies on battery storage of previously harvested solar energy, wind energy on a non-windy day relies on battery storage, etc.).

V. Selection of Windows in User Interface Embodiments

Figure 16:
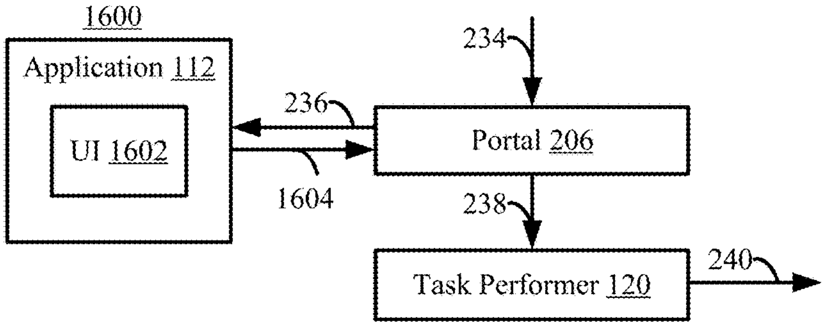
FIG. 16 shows a block diagram of a system for performing a maintenance task based on a selection in a user interface, in an embodiment.
Figure 17:
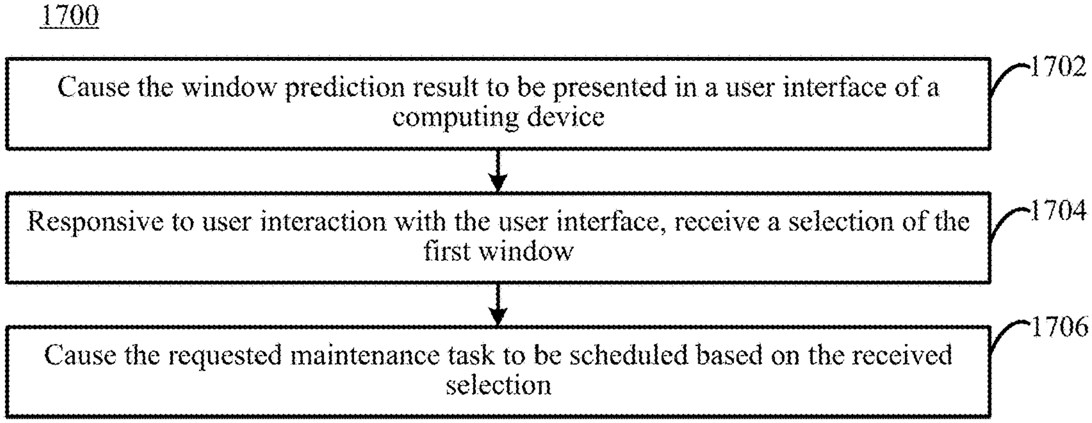
FIG. 17 shows a flowchart of a process for performing a maintenance task based on a selection in a user interface, in an embodiment.

In some embodiments, maintenance window suggestions determined utilizing an ML model or data generated from an ML model provide the suggestions to a user interface. Such embodiments are configured in various ways. For example, FIG. 16 shows a block diagram of a system 1600 for performing a maintenance task based on a selection in a user interface, in an example embodiment. As shown in FIG. 16, system 1600 comprises application 112 and task performer 120, as described with respect to FIG. 1, and portal 206, as described with respect to FIG. 2. As shown in FIG. 16, application 112 comprises a user interface 1602 ("UI 1602"). In embodiments, UI 1602 is a web browser interface, a stand-alone interface, or another type of user interface where a user can provide input via interaction with UI 1602. In order to better understand the operation of system 1600 comprising UI 1602, FIG. 16 is described with respect to FIG. 17. FIG. 17 shows a flowchart of a process for performing a maintenance task based on a selection in a user interface, in an example embodiment. In an embodiment, system 1600 operates in accordance with one or more steps of flowchart 1700. Note that not all steps of flowchart 1700 need be performed in all embodiments. Further structural and operational embodiments will be apparent to persons skilled in the relevant art(s) based on the following descriptions of FIGS. 16 and 17.

Flowchart 1700 begins with step 1702. In step 1702, the window recommendation result is caused to be presented in a user interface of a computing device. For example, portal 206 provides a response 236 that causes a window recommendation result to be presented in UI 1602. In some embodiments, response 236 comprises multiple windows.

In step 1704, responsive to user interaction with the user interface, a selection of the first window is received. For example, portal 206 receives a selection 1604 of a window based on user interaction with UI 1602. In some embodiments, the user interacts with UI 1602 to cause portal 206 to generate new window recommendations (e.g., based on a new range of dates or based on other different parameters), e.g., if none of the recommended windows satisfy criterion of the user.

In step 1706, the requested maintenance task is caused to be scheduled (or performed) based on the received selection. For example, portal 206 causes task performer 120 to perform maintenance task 240 based on received selection 1604.

VI. Example Implementation of a Data Center

Figure 18:
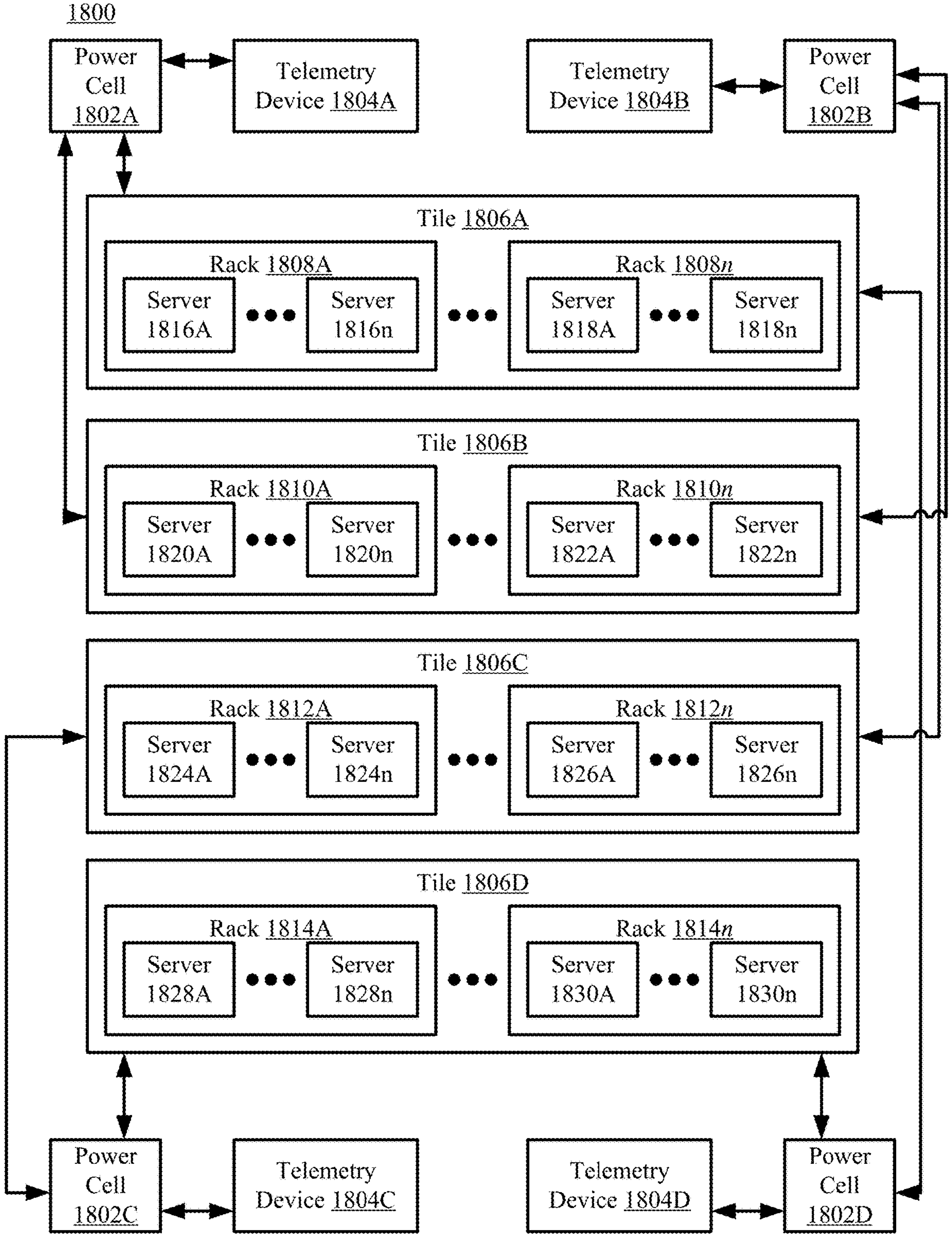
FIG. 18 shows a block diagram of a layout of a data center, in an embodiment.

Embodiments of DCs can be arranged or configured in various ways. For example, FIG. 18 shows a block diagram of a room of a data center 1800 ("room 1800" herein), in an example embodiment. Room 1800 is a further example of room 122A or room 122B of FIG. 1. In an embodiment, room 1800 is a room of a ZRP DC. As shown in FIG. 18, room 1800 comprises power cells 1802A-1802D (which are further examples of power cells 126A-126D or 132A-132D of FIG. 1), telemetry devices 1804A-1804D (which are further examples of telemetry devices 124 or 130 of FIG. 1), and tiles 1806A-1806D (which are further examples of tiles of rows 128 or rows 134 of FIG. 1). As shown in FIG. 18, each of tiles 1806A-1806D comprise one or more racks of servers. For example, tile 1806A comprises racks 1808A-1808*n*, tile 1806B comprises racks 1810A-1810*n*, tile 1806C comprises racks 1812A-1812*n*, and tile 1806D comprises racks 1814A-1814*n*. Each rack comprises one or more servers or other computing devices. For example, rack 1808A comprises servers 1816A-1816*n*, rack 1808*n* comprises servers 1818A-1818*n*, rack 1810A comprises servers 1820A-1820*n*, rack 1810*n* comprises servers 1822A-1822*n*, rack 1812A comprises servers 1824A-1824*n*, rack 1812*n* comprises servers 1826A-1826*n*, rack 1814A comprises servers 1828A-1828*n*, and rack 1814*n* comprises servers 1830A-1830*n*.

In embodiments, each of tiles 1806A-1806D are powered by one or more power cells 1802A-1802D. For example, as shown in FIG. 18, tile 1806A is powered by power cells 1802A and 1802D, tile 1806B is powered by power cells 1802A and 1802B, tile 1806C is powered by power cells 1802B and 1802C, and tile 1806D is powered by power cells 1802C and 1802D. In an embodiment, one power cell is the primary provider for a tile and the other power cell is an auxiliary power provider for the tile (e.g., power cell 1802A is a primary provider for tile 1806A and power cell 1802D is a secondary provider for tile 1806A). In some embodiments, power cells are primary providers for tiles and secondary providers for sub-groups of racks within (e.g., each) other tiles. In this manner, when a power cell is powered down (e.g., for maintenance or otherwise) the other power cells are able to power servers regularly powered by the powered down cell.

In embodiments, telemetry devices 1804A-1804D monitor powered captured by respective power cells and transmit the data to a remote monitor (not shown in FIG. 18) or otherwise capture the power consumption data, as described elsewhere herein. An example remote monitor verifies the correctness of these PUVs and, if the data is correct, stores the PUVs in a persistent storage (e.g., for transformation to historic consumption data). An example of power consumption of DCs and rooms therein are shown in FIGS. 19 and 18. In particular, FIG. 19 shows a graph 1900 of power consumption in rooms of multiple DCs, in an example embodiment. FIG. 20 shows a graph 2000 of total power consumption in the DCs of FIG. 19, in an example embodiment. In graphs 1900 and 2000, the power consumed is shown as a fraction of the maximum power for that room or DC. Graphs 1900 and 2000 show average power consumption over a period of time (e.g., a week, a month, a day, a year, etc.). In some embodiments, the maximum power of a DC varies across each DC, alternatively, each DC has the maximum power. In another alternative, the maximum power represents a fraction of the maximum power across all of the DCs. In the examples shown in graph 2000, the ZRP DCs in Regions 4 through 7 consume the most power. In other words, the majority of the demand of DC resources originates from and around regions 4 through 7. The ZRP DCs in Region 2 showed the lowest average PUVs. Furthermore, the DCs in Region 2 have only 1 room per DC.

In reference to individual room observation shown in graph 1900, other observations are made. In graph 1900, the PUVs of DCs, normalized with their respective number of rooms, are the highest in Region 2 and lowest in Region 4 through 7. In this example, across the selected ZRP DCs, the average PUVs of individual rooms lies between 0.003 P max and 0.31 P max. The rooms with very low PUVs have fewer numbers of servers setup, in an embodiment. Across rooms of DCs, the average PUVs of individual rooms are dissimilar because within LDCP, various organizations use the resources of the ZRP DCs in an embodiment. The LDCP allocates various tiles in different rooms to different organizations. As different organizations (or other customers) offer different workloads, they draw different amounts of power, resulting in diverse average PUVs across rooms.

In the examples of graphs 1900 and 2000, the coefficient of variation (cv) in PUVs is low for most DC rooms, except for room 5 of DC 9, room 5 of DC 7, and room 4 of DC 7, where the cv was 161%, 81%, and 40%, respectively. For the remaining rooms across all ZRP DCs, cv lies in the range of 0.6% to 39% with an average of 11%. This value of the average cv indicates that the power usage is fairly stable and does not experience drastic spikes. In some embodiments, data usage in a DC or room has spikes in usage.

To further understand the monitoring of usage of a power cell over time, FIG. 21 is described. FIG. 21 shows a graph 2100 of power consumption of power cells over the course of a week, in an embodiment. In graph 2100, PUV time-series of power sources exhibit a diurnal pattern, which were more pronounced on weekdays than weekends. In particular, graph 2100 shows three representative PUV time-series, "gamma", "normal", and "power-law". Each of gamma, normal, and power-law time-series represents the power draw of a different power cell of a room of a DC over the course of a week, in an example. In this example, the power draw started peaking around 7 AM and dropped significantly after 3 PM during the weekdays. On weekends, the average PUVs were 4 to 11% lower than the average PUVs on weekdays for every distribution type across all power sources. In graph 2100, the day with the maximum average PUV for gamma was Monday, for normal was Wednesday, and for power-law was Tuesday.

The three types of time-series differed in a few ways. The power-law time-series shows two peaks, whereas the others show a single peak. The power-law time-series also shows the highest standard deviation in PUVs while the gamma time-series shows the smallest. The PUV patterns and intensities (in this example) are similar across the five days of weekdays and across the two days of weekends for normal and gamma time-series. However, for power-law time-series, the PUVs are 5% higher on first two weekdays as compared to the remaining weekdays and 13% higher compared to the weekends. Furthermore, except for the normal time-series, on weekends, all other time-series had similar temporal patterns as weekdays (but with smaller peaks), as seen in FIG. 21.

Thus, graph 2100 has been described as an example of power consumption for three different power cells. Other patterns of power consumption are also possible. For instance, an example of a power cell peaks on the weekend or at different times of a month, quarter, or other length of time. Some DC operations can peak (or lower) at the end of each month or the beginning of each month, at a particular day of the month, at the end of a fiscal quarter, at the end of a fiscal or calendar year, before a holiday, during a holiday, after a holiday, and/or the like. In examples, aggregate PUVs of entire DCs or even entire rooms do not necessarily represent the PUV behavior of individual power sources. Different power sources in the same DC room can produce the same or different type of time-series. In an example, a Pearson temporal correlation coefficient is computed, represented with r (where $|r| \geq 0.7$ indicates strong correlation), between (e.g., all) pairwise combinations of the PUV time-series of the M power sources. In this example, the average value of r from the pairwise combinations of all M power sources is (e.g., approximately) 0.28, from the pairwise combinations of the M power sources within each DC is (e.g., approximately) 0.31, and from the pairwise combinations of all power sources within each room is (e.g., approximately) 0.33. In this example, the correlation is weak (e.g., below a threshold) not just across power sources around the world but even across the power sources within the DC rooms. For instance, suppose in this example that tiles that different power sources are providing power to run different workloads (e.g., game streaming, e-commerce, storage) from different organizations, and thus exhibit different (e.g., non-uniform) power usage patterns. Embodiments of the present disclosure evaluate power usage per power cell in order to account for the non-uniform usage across a DC or a room within a DC.

In some embodiments, feature initializer 304 of FIG. 3 is able to determine if diurnal patterns in PUV time-series repeat across different days of the week. For example, suppose 70 daily PUV time-series of each power source are observed by feature initializer 304. In this example, each time-series is comprised of 1440 values, one per minute. For any given power source, r for each pairwise combination of these 70 time-series of that power source is computed. FIG. 22 shows a graph 2200 of power usage value correlation across days in a week, in an example embodiment. In particular, graph 2200 shows the average value of r obtained between the daily PUV time-series for all pairs of days. Based on graph 2200, a correlation between all pairs of weekdays is moderate (e.g., within a range that satisfies a moderate correlation criterion) and is stronger between the same days across weeks (e.g., above a level that satisfies a strong correlation criterion). This shows that while the workloads that the DC organizations offer throughout the day are somewhat similar across weekdays, the amounts of workloads are highly similar on the same day across weeks. Furthermore, the correlation between a weekday and a weekend day is relatively low. This is expected because, as seen in FIG. 21, on weekends the DC utilization is relatively lower (in this example, though embodiments described herein are not so limited).

Some embodiments of the present disclosure also consider organizational data. An embodiment of an LDCP has multiple internal organizations, represented with G, that operate their workloads in its ZRP DC rooms. The organizations are sorted based on the amount of power they utilize and are numbered from 1 to G. Table 3 lists the five highest and lowest power-consuming organizations. Table 3 also shows the number of rooms across the selected ZRP DCs in which the workloads of any given organization are running. FIGS. 23 and 24 show the box plots for the organizations listed in Table 3. In particular, FIGS. 23 & 24 show graphs 2300 and 2400 of percentage of power consumption used by different organization types, in an example embodiment. A box plot for any organization is made using 70 data points, one per day, normalized using the largest daily value observed across all of the G organizations.

TABLE 3

| Org. # | Organization Name | Rooms | PUV % |
|---|---|---|---|
| 1 | Cloud Service Org. | 33 | 82% |
| 2 | Virtualization Service Org. | 31 | 50% |
| 3 | DC Networking Service Org. | 21 | 46% |
| 4 | Business E-mail Service Org. | 4 | 44% |
| 5 | Storage Service Org. | 17 | 28% |
| *** | *** | *** | *** |
| G-4 | Virtual Networking Org. | 2 | 11% |
| G-3 | DevOps Org. | 2 | 8% |
| G-2 | Platform Service Org. | 1 | 3.5% |
| G-1 | Database Service Org. | 2 | 3.5% |
| G | HPC Org. | 1 | 3.1% |

In Table 3 and FIGS. 23 and 24, approximately 80% of the total power is used by seven organizations, 1 through 5, online file hosting (6) (not shown in FIG. 23 or Table 3), and GPU computing (7) (not shown in FIG. 23 or Table 3). Organization 1, in this example, is the most power-consuming organization, accounting for an average of 26% of total power usage. The organizations with fewer customers consume less power. For example, organization numbered G serves customers primarily engaged in research simulations and consumes just 0.1% of total power.

As shown in Table 3, organizations with higher power usage have their workloads running in more DC rooms. As an outlier, organization 4, which consumes 13% of the total power but operates out of four rooms. In this example, organization 4 utilizes all tiles within the four rooms. In this context, as business emails often contain sensitive information, stricter security measures are implemented with respect to organization 4. For instance, servers of organization 4 are relegated to a separate room (or even a separate DC) from servers of other customers. In some implementations, business emails are not latency sensitive and thus need not be serviced very close to the customer. Therefore, based on these two factors, the email services organization is placed in four dedicated rooms across the selected ZRP DC or DCs. As an example described with respect to FIGS. 23 and 24, except organization 4, organizations that consume ≥6% of total power have workloads running in at least 10 rooms across the selected DCs, while organizations consuming ≤1% have workloads running in no more than 4 rooms.

In the example described with respect to FIGS. 23 and 24, the cv averaged across the all organizations is 21.76%, where six organizations exhibited cv below 10%. In contrast, as described with respect to FIGS. 19 and 20, the cv averaged across all rooms of the selected ZRP DCs was 11%. In this context, the LDCP system analyzes the power usage patterns of organizations and orchestrates the allocation of tiles to different organizations in such a way that the collective power usage of workloads across these tiles experiences lower fluctuations compared to workloads of individual organizations.

Furthermore, embodiments described herein consider temporal trends in power usage of organizations. In particular, the power usage by any organization in an embodiment is higher on weekdays than on weekends. For instance, suppose the organization G-4 exhibited the maximum 11% increase in daily power usage on weekdays compared to weekends, while organization G showed the lowest increase of 3.2%. In this example, further suppose that, except organization 1, all organizations used most power on Tuesdays and the least on Sundays. The outlier of organization 1 is influenced by behavior in online e-commerce markets, which bring peak traffic on weekends when people have more time for shopping. In this example, except for organizations G-2 and G-3, the remaining organizations exhibited diurnal power usage patterns, with peaks occurring on weekdays between 6 AM and 9 AM, and again between 12 PM and 3 PM. In this example, peaks were relatively modest though, with peak usage only 2 to 5% higher than the average for that day. Weekends, in this example however, showed no discernible peak hours for most organizations.

Continuing the example described with respect to FIGS. 19-24, statistical aspects of PUV time-series are also considered. In particular the distributions that PUV time-series follow and temporal auto-correlations within PUVs. These observations are considered by model trainer 116 in training model 114 to determine a forecast of power consumed by a DC (or a component or portion of the DC) for usage in determining a (e.g., potentially or expected) safe maintenance windows. With respect to PUV distributions, a distribution of a PUV time-series enables model 114 to be trained with respect to the frequency of various PUVs in a given time-series, which improves determination of future safe maintenance windows. To determine the distribution that the PUV time-series of any given power source follows, model trainer 116 (or model 114) in an example calculates the sum of squared errors (SSE) of that PUV time-series against a number of (e.g., seven) probabilistic distributions. In an embodiment, the SSE is calculated using a library of probabilistic distributions. Examples of probabilistic distributions include, but are not limited to, normal distribution, power-law distribution, gamma distribution, exponential-power distribution, uniform distribution, Rayleigh distribution, and exponential distribution. As an example, PUV time-series are described as follows with respect to normal, power-law, and gamma distributions. In this example, each of the three distributions represented 27% to 29% of PUV time-series. In some embodiments, the fitted distribution is different across two or more power cells within the same room or DC.

In some embodiments, the autocorrelation within PUV time-series is determined. This enables model trainer 116 to identify patterns, such as seasonality and trends, in PUV time-series, which, in turn, enables determination of a forecast of future PUVs with better accuracy. The seasonality component refers to the regular and periodic fluctuations that occur at fixed intervals in a time-series, while the trend component represents the overall direction in which the time-series is moving, such as upward, downward, flat, etc. In an embodiment, an algorithm is applied on each PUV time-series to decompose the time-series into its seasonal and trend components. FIG. 25A shows a graph 2500A of trend and seasonal components of power usage value time-series of a selected power source, in an embodiment. Graph 2500A plots the PUV time-series of a power source in a room of a selected ZRP DC for an entire 70 days. Graph 2500A also shows the decomposed trend and seasonal components. In graph 2500A, power consumption trend exhibits a repeating cycle of 7 days while the duration of the seasonal component is 1 day. This demonstrates that the time of day and the day of the week are impactful features for determining (e.g., potentially or expected) safe maintenance windows.

The presence of a strong seasonality component is utilized to train model 114 to generate forecast results for future PUVs based on previous (and current) PUVs of a power source. To determine the lag, i.e., the number of previous PUVs that influence the current PUV, model trainer 116 calculates an autocorrelation function (ACF) and partial ACF (PACF) of the PUV time-series of each power source. While ACF considers all past observations, PACF removes the effects of intermediate observations. FIG. 25B shows graphs 2500B of the ACF and PACF of the PUV time-series in FIG. 25A. The x-axis represents the number of observations, where each observation is the average PUV over a 5-minute window. The y-axis represents the confidence interval of the correlation. Unlike the ACF, a cyclic pattern is not shown in PACF. In this context, the PACF removes the intermediate relationships between observations. From the PACF, a determination that each PUV is influenced by the preceding 4 to 12 observations (i.e., 20 to 60 minutes as each observation is aggregated from 5 minutes of PUVs). This dependency is visible in the confidence values shown in the PACF plot. A decrease in autocorrelation with the confidence score drops below 5% after 11 previous observations (which correspond to 55 minutes of PUVs). Thus, a PUV recorded in any given minute of the time-series in FIG. 25A is (e.g., heavily) influenced by the PUVs observed in the preceding 55 minutes. This value lies in the range of 20 to 60 minutes across all PUV time-series in an example data set. In an example, PUVs of the last 1 hour will serve as important features to determine safe maintenance windows.

Thus, examples of power consumption trends, analysis, and training of an ML model have been described with respect to FIGS. 18-25B. While several trends have been described, embodiments described herein are not so limited. Furthermore, time-series have been described to 7-day trend components and 1-day seasonal components, however other such trends and components can be used in the training of an ML model.

VII. Further Example Embodiments

A. Migration Based on User Account Settings

In some embodiments, data of user accounts are handled differently. For example, an organization or user in an embodiment subscribes to a service to reduce throttling. In this context, the compute resources of the user are transferred from servers in response to maintenance being performed on different power cells. Embodiments of the present disclosure operate in various ways to migrate data based on user settings. For example, FIG. 26 shows a flowchart 2600 of a process of migrating data based on a user account, in an embodiment. In an embodiment, system 800 operates in accordance with one or more steps of flowchart 2600. Note that not all steps of flowchart 2600 need be performed in all embodiments. Further structural and operational embodiments will be apparent to persons skilled in the relevant art(s) based on the following description of FIG. 26 with respect to FIG. 8.

Flowchart 2600 begins with step 2602. In step 2602, a setting of a user account associated with a computing resource executing on a first server powered by a first power cell is determined. For example, portal 206 determines a setting of a user account associated with a computing resource executed on a first server powered by the power cell maintenance is requested to be performed on. The setting can indicate a subscription of the customer or another type of setting the customer has, indicating reduced throttling is desired.

In step 2604, based on the setting and in response to the maintenance task being with respect to the first power cell, the computing resource is migrated to a second server powered by a second power cell. For example, task performer 120 causes the computing resource to be migrated from its server to another server powered by a different power cell.

In step 2606, the requested maintenance task is caused to be performed. For example, subsequent to migrating the compute resource, task performer 120 performs (or causes performance of) maintenance task 240 with respect to the first power cell.

In this context, embodiments of system 800 are able to provide dynamic customer performance (e.g., and pricing) where performance of compute resources of the customer/organization are power-aware. For example, cost incentives can be given to customers/organizations that agree to have their compute resources throttled (without transferring). In another example, a customer/organization can subscribe to have their compute resources transferred to an underutilized server prior to maintenance.

B. Maintenance Window Validation Embodiments

Some embodiments described herein are utilized to validate a requested maintenance window from an application. For example, FIG. 27 shows a block diagram of a system 2700 for validating a maintenance window, in an example embodiment. As shown in FIG. 27, system 2700 comprises application 112, ML model 114 (comprising sub-models 316 as described with respect to FIG. 3), task performer 120, and forecasted power consumption data 142, as described with respect to FIG. 1, as well as a maintenance window validator 2702. Maintenance window validator 2702 is configured to determine whether or not a maintenance window included in a validation request is valid. To better understand the operation of system 2700 comprising model validator 2702, FIG. 27 is described with respect to FIG. 28. FIG. 28 shows a flowchart 2800 of a process for validating a maintenance window, in an example embodiment. In an embodiment, maintenance window validator 2702 operates in accordance with one or more steps of flowchart 2800. Note that not all steps of flowchart 2800 need be performed in all embodiments. Further structural and operational embodiments will be apparent to persons skilled in the relevant art(s) based on the following descriptions of FIGS. 27 and 28.

Flowchart 2800 begins with step 2802. In step 2802, a maintenance window request for a requested maintenance task with respect to a DC is received, the maintenance window specifying a first period of time. For example, portal 2706 receives a maintenance window request 2708 for a requested maintenance task with respect to DC 110, maintenance window request 2708 specifying a first period of time. Alternatively, the maintenance window request comprises a few potential periods of time to perform maintenance. In an example, application 112 transmits the maintenance window request 2708 (e.g., as an API call (e.g., a representational state transfer (REST) API call) to portal 206. The request comprises key value pairs as parameters in the GET request: DC name, room, starting date time, ending date time, and power threshold in MW. The API handler will extract the passed parameters in a similar manner described with respect to portal 206 of FIG. 2. An embodiment of portal 2706 verifies the passed values of the parameters, e.g., by verifying if the DC with the passed name exists or not, if the passed room name exists inside the given DC, if the starting date of forecast is greater than or equal to the current time and ending time is less than or equal to the current time+3 weeks (3 weeks is the forecast horizon of FMPredService), and/or the like.

In step 2804, a determination of whether or not an impact on performance of the DC by the requested maintenance task satisfies an impact criterion during the first period of time. For example, portal 2706, in an embodiment, determines if an impact on the performance of DC 110 (or its component) satisfies an impact criterion during the time requested in validation request 2708. In an example, portal 2706 executes an API call to obtain data from a table (e.g., forecasted power consumption data 142) for the requested time. This routine sums the power consumption forecast at every timestamp of between the start and end date and time passed. If all the values inside the start and end date and time are smaller than the threshold then flowchart 2800 proceeds to step 2806. Otherwise, flowchart 2800 continues to step 2808.

In step 2806, the maintenance window request is validated. For example, if portal 2706 determined the impact satisfies an impact criterion, portal 2706 provides a response 2724 indicating the window is valid. In an embodiment, portal 2706 causes task performer 120 to perform a maintenance task 2722 in the validated window utilizing a task instruction signal 2720.

In step 2808, the maintenance window request is invalidated. For example, if portal 2706 determined the impact failed to satisfy the impact criterion, portal 2706 provides a response 2724 indicating the window is invalid. In some embodiments, system 2700 performs one or more operations subsequent to invalidating a window task. For instance, in an embodiment, an alternative maintenance window is proposed. For example, FIG. 29 shows a flowchart 2900 of a process for suggesting an alternative maintenance window, in an embodiment. In an embodiment, maintenance window validator 2702 operates in accordance with one or more steps of flowchart 2900. Note that not all steps of flowchart 2900 need be performed in all embodiments. Further structural and operational embodiments will be apparent to persons skilled in the relevant art(s) based on the following description of FIG. 29 with respect to FIG. 27.

Flowchart 2900 begins with step 2902. In step 2902, subsequent to the maintenance window validator invalidating the maintenance window request, the ML model is utilized to generate a window recommendation result. The window recommendation result comprises a second window indicating a second period of time wherein impact of the requested maintenance task satisfies the impact criterion. For example, portal 2706 utilizes ML model 114 or forecasted power consumption data 142 to determine an alternative maintenance window where impact satisfies the impact criterion. For instance, portal 2706 provides information 2710 to model interface 2704 in a similar manner as described with respect to information 232 of FIG. 2. Model interface 2704 determines forecasted power consumption data based on information 2710 in a similar manner as described with respect to FIGS. 2 and 8, as well as elsewhere herein. For instance, in an embodiment, model interface 2704 places a call 2712 to ML model 114 or a sub-model of sub-models 316 to cause ML model 114 to generate forecasted power consumption data result 2714 in a similar manner as described with respect to forecasted power consumption data result 228 of FIG. 2. Alternatively, model interface 2704 obtains pre-generated forecasted power consumption data 2716 from forecasted power consumption data 142 stored in memory. Model interface 2704 provides forecasted power consumption data signal 2718 comprising the forecasted power consumption data 2714 or 2716 to portal 2706. Portal 2706 determines the alternative maintenance window based on forecasted power consumption data signal 2718. In this example, portal 2706 includes the alternative maintenance window in response 2724.

In step 2904, the requested maintenance task is caused to be performed. For example, suppose portal 2706 provided the suggested window to application 112. In an embodiment, a user interacts with a user interface to select the suggested window and application 112 provides the selection to portal 2706. Portal 2706 receives the selection and causes maintenance task 2722 to be performed in the selected suggested window via instruction signal 2720.

C. Throttle Forecasting Embodiments

Embodiments of the present disclosure have been described with respect to identifying suitable times for power cell maintenance operations; however, embodiments described herein are not so limited. For instance, in an embodiment, a system utilizes the ML model trained to determine a forecast power consumption in order to determine when to resources will (e.g., likely) be throttled. In an embodiment, the system utilizes the ML model to determine when resources have a likelihood of being throttled that satisfies a throttling criterion (e.g., a likelihood of being throttled that surpasses a predetermined threshold). In this context, such embodiments are able to alert customers of potential peak hours/times, so that customers or their associated systems, can reschedule/modify their usage of resources to avoid these times or lower the impact. In an embodiment, a "powercapping" service utilizes an API call (that passes the name of the DC, room, or cell and a forecast window) if data loss occurs during its execution to decide whether to activate powercapping DC server or not. The API returns all the forecasted values for the given DC, room, or cell in the previous time window.

D. User Interface Portal Embodiment

Embodiments of a portal for interacting with maintenance window determiners and maintenance window validators have been described herein. In some embodiments, the forecasts of power usage are accessible via a portal (room power consumption forecast—Power BI). This portal can be opened in a browser (e.g., of computing device 102), allowing the viewer to select the DC, room, and a time range between now and now +21 days to visualize the future forecasts of power usage. In embodiments, the portal uses the data from a table of forecasts of power usage. It displays the forecasted power values of the power sources in the selected room (e.g., separately and/or cumulatively). The user interface can be configured in various ways. For example, FIG. 30 shows a block diagram of a user interface 3000 ("UI 3000"), in an example embodiment. As shown in FIG. 30, UI 3000 comprises a threshold power consumption window, a DC window labeled "DC", a rooms window labeled "Rooms", a date range window labeled "Date Range", a hour range window labeled "Hour Range", a cell power consumption window labeled "Power Consumptions for Cells A, B, C, and D of Selected Room", and a total power consumption window labeled "Total Power Consumption for Selected Room". In the threshold power consumption window, a user is able to input a threshold power consumption (e.g., a maximum power consumption) for which they desire windows to be suggested. In the DC window, selectable options for each DC in a set of DCs are shown. In the Room window, selectable options for each room within a selected DC are shown. For instance, as shown in UI 3000, DC A is the selected DC and Rooms window shows Room A, Room B, Room C, and Room D as selectable options of rooms in DC A. The Date Range window comprises entry fields for entering a minimum and maximum date for a date range power consumption is to be forecasted for. In an alternative or additional embodiment, Date Range comprises a calendar widget that allows a user interact with the calendar widget to select the minimum and maximum dates. In an alternative or additional embodiment, Date Range comprises a sliding toggle bar to select the range of dates. The Hour Range window comprises entry fields for entering an earliest hour ("Start") and a latest hour ("End") in which maintenance is to be performed. In some embodiments, the Hour Range window comprises an entry field for entering an estimated length of time the maintenance is expected to take. In an embodiment, the Hour Range window enables multiple ranges of hours to be input (e.g., a first window prior to regular business hours, a second window subsequent to regular business hours, etc.). In an embodiment, the Hour Range window is a check box that toggles whether or not maintenance windows should be limited to a predetermined range of time (e.g., only show times within regular business hours, only show times outside of regular business hours, show times tied to a particular shift of maintenance team members, etc.).

The cell power consumption window is configured to display forecasted power consumption for each cell in the selected room for the provided date range. For example, UI 3000 shows the forecasted power consumption for each cell in Room B of DC A. The total power consumption window shows the total power consumption of all cells in the room for the provided date range.

In some embodiments, UI 3000 shows suggested safe windows to perform a maintenance task. In some embodiments, UI 3000 comprises an entry field to input a maintenance window request for a particular task.

E. Routine Operation Embodiments

In some embodiments, various operations are performed on a routine basis. For example, in an embodiment, ML models and/or sub-models are re-trained/updated on a periodic basis (e.g., every 24 hours, every predetermined number of days, once a week, once a month, etc.). In an embodiment, training the ML model is shifted by a number of minutes, hours, days based on compute resource usage/availability. In another embodiment, ML models are utilized to generate a forecasted power consumption result on a routine basis. In an embodiment, invocation of an ML model for DCs is rotated through DCs on a region-by-region basis to reduce consecutive potential interruption to operation of DCs in the same region.

F. Renewable Energy Aware Migration Embodiments

In accordance with some embodiments, maintenance window determination has been described with respect to migrating data for maintenance based on whether or not a DC was powered (or partially powered) by renewable energy sources. It is further contemplated herein that renewable energy integration can be used to forecast power consumption data of a DC in other applications as well. For instance, some embodiments utilize ML model 114 to determine forecasted power consumption and another ML model trained to forecast power generated from renewable energy. In this context, the results of ML model 114 and the energy forecast model is utilized to determine whether or not to migrate workloads to prevent blackouts and/or reduce the chance of throttling. This allows a DC or managing system to pre-plan how much power of a particular type of energy to import at different times of day and/or year. Examples of types of energy include, but are not limited to, solar energy, wind energy, grid energy, etc.

VIII. Example Computer System Implementation

Embodiments of maintenance window determination, maintenance window validation, and/or power consumption forecasting described herein are implemented in hardware, or hardware combined with one or both of software and/or firmware. For example, power forecasting system 106, application 112, ML model 114, power draw forecaster 302, maintenance window validator 2702, UI 3000, and/or the components described therein, and/or the steps of flowcharts 400A, 500, 600, 700, 900, 1000, 1100, 1200, 1300A, 1400, 1500, 1700, 2600, 2700, 2800, 2900, are each implemented as computer program code/instructions configured to be executed in one or more processors and stored in a computer readable storage medium. Alternatively, power forecasting system 106, ML model 114, telemetry device 124, telemetry device 130, power draw forecaster 302, telemetry devices 1804A-1804D, maintenance window validator 2702, and/or the components described therein, and/or the steps of flowcharts 400A, 500, 600, 700, 900, 1000, 1100, 1200, 1300A, 1400, 1500, 1700, 2600, 2700, 2800, 2900 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 31. FIG. 31 shows a block diagram of an exemplary computing environment 3100 that includes a computing device 3102. Computing device 3102 is an example of user computing device 102, model server 104, power forecasting system 106, telemetry device 124, telemetry device 130, servers 1816A-1830*n*, and/or telemetry devices 1804A-1804D, which each include one or more of the components of computing device 3102. In some embodiments, computing device 3102 is communicatively coupled with devices (not shown in FIG. 31) external to computing environment 3100 via network 3104. Network 3104 is an example of network 144. Network 3104 comprises one or more networks such as local area networks (LANs), wide area networks (WANs), enterprise networks, the Internet, etc. In examples, network 3104 includes one or more wired and/or wireless portions. In some examples, network 3104 additionally or alternatively includes a cellular network for cellular communications. Computing device 3102 is described in detail as follows.

Computing device 3102 can be any of a variety of types of computing devices. Examples of computing device 3102 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 3102 is a stationary computing device such as a desktop computer, a personal computer (PC), a stationary server device, a minicomputer, a mainframe, a supercomputer, etc.

As shown in FIG. 31, computing device 3102 includes a variety of hardware and software components, including a processor 3110, a storage 3120, a graphics processing unit (GPU) 3142, a neural processing unit (NPU) 3144, one or more input devices 3130, one or more output devices 3150, one or more wireless modems 3160, one or more wired interfaces 3180, a power supply 3182, a location information (LI) receiver 3184, and an accelerometer 3186. Storage 3120 includes memory 3156, which includes non-removable memory 3122 and removable memory 3124, and a storage device 3188. Storage 3120 also stores an operating system 3112, application programs 3114, and application data 3116. Wireless modem(s) 3160 include a Wi-Fi modem 3162, a Bluetooth modem 3164, and a cellular modem 3166. Output device(s) 3150 includes a speaker 3152 and a display 3154. Input device(s) 3130 includes a touch screen 3132, a microphone 3134, a camera 3136, a physical keyboard 3138, and a trackball 3140. Not all components of computing device 3102 shown in FIG. 31 are present in all embodiments, additional components not shown may be present, and in a particular embodiment any combination of the components are present. In examples, components of computing device 3102 are mounted to a circuit card (e.g., a motherboard) of computing device 3102, integrated in a housing of computing device 3102, or otherwise included in computing device 3102. The components of computing device 3102 are described as follows.

In embodiments, a single processor 3110 (e.g., central processing unit (CPU), microcontroller, a microprocessor, signal processor, ASIC (application specific integrated circuit), and/or other physical hardware processor circuit) or multiple processors 3110 are present in computing device 3102 for performing such tasks as program execution, signal coding, data processing, input/output processing, power control, and/or other functions. In examples, processor 3110 is a single-core or multi-core processor, and each processor core is single-threaded or multithreaded (to provide multiple threads of execution concurrently). Processor 3110 is configured to execute program code stored in a computer readable medium, such as program code of operating system 3112 and application programs 3114 stored in storage 3120. The program code is structured to cause processor 3110 to perform operations, including the processes/methods disclosed herein. Operating system 3112 controls the allocation and usage of the components of computing device 3102 and provides support for one or more application programs 3114 (also referred to as "applications" or "apps"). In examples, application programs 3114 include common computing applications (e.g., e-mail applications, calendars, contact managers, web browsers, messaging applications), further computing applications (e.g., word processing applications, mapping applications, media player applications, productivity suite applications), one or more ML models, as well as applications related to the embodiments disclosed elsewhere herein. In examples, processor(s) 3110 includes one or more general processors (e.g., CPUs) configured with or coupled to one or more hardware accelerators, such as one or more NPUs 3144 and/or one or more GPUs 3142.

Any component in computing device 3102 can communicate with any other component according to function, although not all connections are shown for case of illustration. For instance, as shown in FIG. 31, bus 3106 is a multiple signal line communication medium (e.g., conductive traces in silicon, metal traces along a motherboard, wires, etc.) present to communicatively couple processor 3110 to various other components of computing device 3102, although in other embodiments, an alternative bus, further buses, and/or one or more individual signal lines is/are present to communicatively couple components. Bus 3106 represents one or more of any of several types of bus structures, including a memory bus or memory controller, a peripheral bus, an accelerated graphics port, and a processor or local bus using any of a variety of bus architectures.

Storage 3120 is physical storage that includes one or both of memory 3156 and storage device 3188, which store operating system 3112, application programs 3114, and application data 3116 according to any distribution. Non-removable memory 3122 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 3122 includes main memory and is separate from or fabricated in a same integrated circuit as processor 3110. As shown in FIG. 31, non-removable memory 3122 stores firmware 3118 that is present to provide low-level control of hardware. Examples of firmware 3118 include BIOS (Basic Input/Output System, such as on personal computers) and boot firmware (e.g., on smart phones). In examples, removable memory 3124 is inserted into a receptacle of or is otherwise coupled to computing device 3102 and can be removed by a user from computing device 3102. Removable memory 3124 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 3188 are present that are internal and/or external to a housing of computing device 3102 and are or are not removable. Examples of storage device 3188 include a hard disk drive, a SSD, a thumb drive (e.g., a USB (Universal Serial Bus) flash drive), or other physical storage device.

One or more programs are stored in storage 3120. Such programs include operating system 3112, one or more application programs 3114, and other program modules and program data. Examples of such application programs include computer program logic (e.g., computer program code/instructions) for implementing embodiments described herein, and/or the components described therein, and/or the steps of flowcharts described herein, and/or any individual steps thereof.

Storage 3120 also stores data used and/or generated by operating system 3112 and application programs 3114 as application data 3116. Examples of application data 3116 include web pages, text, images, tables, sound files, video data, and other data. In examples, application data 3116 is sent to and/or received from one or more network servers or other devices via one or more wired or wireless networks. Storage 3120 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 3102 through one or more input devices 3130 and receives information from computing device 3102 through one or more output devices 3150. Input device(s) 3130 includes one or more of touch screen 3132, microphone 3134, camera 3136, physical keyboard 3138 and/or trackball 3140 and output device(s) 3150 includes one or more of speaker 3152 and display 3154. Each of input device(s) 3130 and output device(s) 3150 are integral to computing device 3102 (e.g., built into a housing of computing device 3102) or are external to computing device 3102 (e.g., communicatively coupled wired or wirelessly to computing device 3102 via wired interface(s) 3180 and/or wireless modem(s) 3160). Further input devices 3130 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 3154 displays information, as well as operating as touch screen 3132 by receiving user commands and/or other information (e.g., by touch, finger gestures, virtual keyboard, etc.) as a user interface. Any number of each type of input device(s) 3130 and output device(s) 3150 are present, including multiple microphones 3134, multiple cameras 3136, multiple speakers 3152, and/or multiple displays 3154.

In embodiments where GPU 3142 is present, GPU 3142 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 3142 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 3144 (also referred to as an "artificial intelligence (AI) accelerator" or "deep learning processor (DLP)") is a processor or processing unit configured to accelerate artificial intelligence and ML applications, such as execution of ML model (MLM) 3128. In an example, NPU 3144 is configured for a data-driven parallel computing and is highly efficient at processing massive multimedia data such as videos and images and processing data for neural networks. NPU 3144 is configured for efficient handling of AI-related tasks, such as speech recognition, background blurring in video calls, photo or video editing processes like object detection, etc.

In embodiments disclosed herein that implement ML models, NPU 3144 can be utilized to execute such ML models, of which MLM 3128 is an example (which is an example of ML model 114, in an embodiment). For instance, where applicable, MLM 3128 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and generating forecasts on. Examples of a token include, but are not limited to, a word, a character (e.g., an alphanumeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 3144 is used to train MLM 3128. To train MLM 3128, training data is that includes input features (attributes) and their corresponding output labels/target values (e.g., for supervised learning) is collected. A training algorithm is a computational procedure that is used so that MLM 3128 learns from the training data. Parameters/weights are internal settings of MLM 3128 that are adjusted during training by the training algorithm to reduce a difference between forecasts by MLM 3128 and actual outcomes (e.g., output labels). In some examples, MLM 3128 is set with initial values for the parameters/weights. A loss function measures a dissimilarity between forecasts by MLM 3128 and the target values, and the parameters/weights of MLM 3128 are adjusted to minimize the loss function. The parameters/weights are iteratively adjusted by an optimization technique, such as gradient descent. In this manner, MLM 3128 is generated through training by NPU 3144 to be used to generate inferences based on received input feature sets for particular applications. MLM 3128 is generated as a computer program or other type of algorithm configured to generate an output (e.g., a classification, a forecast/inference) based on received input features, and is stored in the form of a file or other data structure.

In examples, such training of MLM 3128 by NPU 3144 is supervised or unsupervised. According to supervised learning, input objects (e.g., a vector of forecasting variables) and a desired output value (e.g., a human-labeled supervisory signal) train MLM 3128. The training data is processed, building a function that maps new data on expected output values. Example algorithms usable by NPU 3144 to perform supervised training of MLM 3128 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 3128 is an LLM, MLM 3128 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 3128 is trained to learn patterns from unlabeled data. For instance, in embodiments where MLM 3128 implements unsupervised learning techniques, MLM 3128 identifies one or more classifications or clusters to which an input belongs. During a training phase of MLM 3128 according to unsupervised learning, MLM 3128 tries to mimic the provided training data and uses the error in its mimicked output to correct itself (i.e., correct weights and biases). In further examples, NPU 3144 perform unsupervised training of MLM 3128 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 3144 need not necessarily be present in all ML model embodiments. In embodiments where ML models are present, any one or more of processor 3110, GPU 3142, and/or NPU 3144 can be present to train and/or execute MLM 3128.

One or more wireless modems 3160 can be coupled to antenna(s) (not shown) of computing device 3102 and can support two-way communications between processor 3110 and devices external to computing device 3102 through network 3104, as would be understood to persons skilled in the relevant art(s). Wireless modem 3160 is shown generically and can include a cellular modem 3166 for communicating with one or more cellular networks, such as a GSM network for data and voice communications within a single cellular network, between cellular networks, or between the mobile device and a public switched telephone network (PSTN). In examples, wireless modem 3160 also or alternatively includes other radio-based modem types, such as a Bluetooth modem 3164 (also referred to as a "Bluetooth device") and/or Wi-Fi modem 3162 (also referred to as an "wireless adaptor"). Wi-Fi modem 3162 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 3164 is configured to communicate with another Bluetooth-capable device according to the Bluetooth short-range wireless technology standard(s) such as IEEE 802.15.1 and/or managed by the Bluetooth Special Interest Group (SIG).

Computing device 3102 can further include power supply 3182, LI receiver 3184, accelerometer 3186, and/or one or more wired interfaces 3180. Example wired interfaces 3180 include a USB port, IEEE 1394 (FireWire) port, a RS-312 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 3180 of computing device 3102 provide for wired connections between computing device 3102 and network 3104, or between computing device 3102 and one or more devices/peripherals when such devices/peripherals are external to computing device 3102 (e.g., a pointing device, display 3154, speaker 3152, camera 3136, physical keyboard 3138, etc.). Power supply 3182 is configured to supply power to each of the components of computing device 3102 and receives power from a battery internal to computing device 3102, and/or from a power cord plugged into a power port of computing device 3102 (e.g., a USB port, an A/C power port). LI receiver 3184 is useable for location determination of computing device 3102 and in examples includes a satellite navigation receiver such as a Global Positioning System (GPS) receiver and/or includes other type of location determiner configured to determine location of computing device 3102 based on received information (e.g., using cell tower triangulation, etc.). Accelerometer 3186, when present, is configured to determine an orientation of computing device 3102.

Note that the illustrated components of computing device 3102 are not required or all-inclusive, and fewer or greater numbers of components can be present as would be recognized by one skilled in the art. In examples, computing device 3102 includes one or more of a gyroscope, barometer, proximity sensor, ambient light sensor, digital compass, etc. In an example, processor 3110 and memory 3156 are co-located in a same semiconductor device package, such as being included together in an integrated circuit chip, FPGA, or system-on-chip (SOC), optionally along with further components of computing device 3102.

In embodiments, computing device 3102 is configured to implement any of the above-described features of flowcharts herein. Computer program logic for performing any of the operations, steps, and/or functions described herein is stored in storage 3120 and executed by processor 3110.

In some embodiments, server infrastructure 3170 is present in computing environment 3100 and is communicatively coupled with computing device 3102 via network 3104. Server infrastructure 3170, when present, is a network-accessible server set (e.g., a cloud-based environment or platform). As shown in FIG. 31, server infrastructure 3170 includes clusters 3172. Each of clusters 3172 comprises a group of one or more compute nodes and/or a group of one or more storage nodes. For example, as shown in FIG. 31, cluster 3172 includes nodes 3174. Each of nodes 3174 are accessible via network 3104 (e.g., in a "cloud-based" embodiment) to build, deploy, and manage applications and services. In examples, any of nodes 3174 is a storage node that comprises a plurality of physical storage disks, SSDs, and/or other physical storage devices that are accessible via network 3104 and are configured to store data associated with the applications and services managed by nodes 3174.

Each of nodes 3174, as a compute node, comprises one or more server computers, server systems, and/or computing devices. For instance, a node 3174 in an embodiment includes one or more of the components of computing device 3102 disclosed herein. Each of nodes 3174 is configured to execute one or more software applications (or "applications") and/or services and/or manage hardware resources (e.g., processors, memory, etc.), which are utilized by users (e.g., customers) of the network-accessible server set. In examples, as shown in FIG. 31, nodes 3174 includes a node 3146 that includes storage 3148 and/or one or more of a processor 3158 (e.g., similar to processor 3110, GPU 3142, and/or NPU 3144 of computing device 3102). Storage 3148 stores application programs 3176 and application data 3178. Processor(s) 3158 operate application programs 3176 which access and/or generate related application data 3178. In an implementation, nodes such as node 3146 of nodes 3174 operate or comprise one or more virtual machines, with each virtual machine emulating a system architecture (e.g., an operating system), in an isolated manner, upon which applications such as application programs 3176 are executed.

In embodiments, one or more of clusters 3172 are located/co-located (e.g., housed in one or more nearby buildings with associated components such as backup power supplies, redundant data communications, environmental controls, etc.) to form a DC, or are arranged in other manners. Accordingly, in an embodiment, one or more of clusters 3172 are included in a DC in a distributed collection of DCs. In embodiments, exemplary computing environment 3100 comprises part of a cloud-based platform.

In an embodiment, computing device 3102 accesses application programs 3176 for execution in any manner, such as by a client application and/or a browser at computing device 3102.

In an example, for purposes of network (e.g., cloud) backup and data security, computing device 3102 additionally and/or alternatively synchronizes copies of application programs 3114 and/or application data 3116 to be stored at network-based server infrastructure 3170 as application programs 3176 and/or application data 3178. In examples, operating system 3112 and/or application programs 3114 include a file hosting service client configured to synchronize applications and/or data stored in storage 3120 at network-based server infrastructure 3170.

In some embodiments, on-premises servers 3192 are present in computing environment 3100 and are communicatively coupled with computing device 3102 via network 3104. On-premises servers 3192, when present, are hosted within an organization's infrastructure and, in many cases, physically onsite of a facility of that organization. On-premises servers 3192 are controlled, administered, and maintained by IT (Information Technology) personnel of the organization or an IT partner to the organization. Application data 3198 can be shared by on-premises servers 3192 between computing devices of the organization, including computing device 3102 (when part of an organization) through a local network of the organization, and/or through further networks accessible to the organization (including the Internet). Furthermore, in examples, on-premises servers 3192 serve applications such as application programs 3196 to the computing devices of the organization, including computing device 3102. Accordingly, in examples, on-premises servers 3192 include storage 3194 (which includes one or more physical storage devices such as storage disks and/or SSDs) for storage of application programs 3196 and application data 3198 and include a processor 3190 (e.g., similar to processor 3110, GPU 3142, and/or NPU 3144 of computing device 3102) for execution of application programs 3196. In some embodiments, multiple processors 3190 are present for execution of application programs 3196 and/or for other purposes. In further examples, computing device 3102 is configured to synchronize copies of application programs 3114 and/or application data 3116 for backup storage at on-premises servers 3192 as application programs 3196 and/or application data 3198.

Embodiments described herein may be implemented in one or more of computing device 3102, network-based server infrastructure 3170, and on-premises servers 3192. For example, in some embodiments, computing device 3102 is used to implement systems, clients, or devices, or components/subcomponents thereof, disclosed elsewhere herein. In other embodiments, a combination of computing device 3102, network-based server infrastructure 3170, and/or on-premises servers 3192 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 3120. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 3114) are stored in storage 3120. Such computer programs can also be received via wired interface(s) 3160 and/or wireless modem(s) 3160 over network 3104. Such computer programs, when executed or loaded by an application, enable computing device 3102 to implement features of embodiments discussed herein. Accordingly, such computer programs represent controllers of the computing device 3102.

Embodiments are also directed to computer program products comprising computer code or instructions stored on any computer-readable medium or computer-readable storage medium. Such computer program products include the physical storage of storage 3120 as well as further physical storage types.

IX. Additional Exemplary Embodiments

A method for determining a maintenance window is described herein. The method for determining a maintenance window comprises: receiving a maintenance window request for a requested maintenance task with respect to a DC; utilizing an ML model to determine forecasted power consumption data of the DC based on the maintenance window request, the ML model trained to forecast power consumption of the DC at intervals of time; determining a window recommendation result based on the forecasted power consumption data, the window recommendation result comprising a first window indicating a first period of time wherein impact of the requested maintenance task satisfies a criterion of the maintenance window request, and causing the requested maintenance task to be performed during the first window.

A method for validating a maintenance window is described herein, the method for validating a maintenance window comprises: receiving a maintenance window request for a requested maintenance task with respect to a DC, the maintenance window request specifying a first period of time; determining if an impact on performance of the DC by the requested maintenance task satisfies an impact criterion during the first period of time; if the impact satisfies the impact criterion, validating the maintenance window request; and if the impact fails to satisfy the impact criterion, invalidating the maintenance window request.

In a further embodiment of the foregoing method for validating a maintenance window, the method further comprises, subsequent to invalidating the maintenance window request, utilizing the ML model to generate a window recommendation result, the window recommendation result comprising a second window indicating a second period of time wherein impact of the requested maintenance task satisfies the impact criterion.

In a further embodiment of any of the foregoing methods, the method further comprises performing the requested maintenance task during the first window.

In a further embodiment of any of the foregoing methods, the maintenance task comprises an operation to be performed with respect to a first server of the DC, and the method further comprises: prior to the performing the requested maintenance task, migrating data stored by the first server of the DC to a second server of the DC.

In a further embodiment of any of the foregoing methods, said utilizing the ML model to determine the forecasted power consumption data comprises: providing the ML model with a range of dates the requested maintenance task is to be performed within; causing the ML model to determine the forecasted power consumption of the DC at a set of intervals within the range of dates; and receiving, from the ML model, the forecasted power consumption data of the power cell.

In a further embodiment of any of the foregoing methods, said determining the window recommendation result comprises: determining, based on the forecasted power consumption data, the window recommendation result comprising the first window, the first window within the range of dates.

In a further embodiment of any of the foregoing methods, the method further comprises training the ML model to determine the forecasted power consumption of the DC prior to receiving the maintenance window request.

In a further embodiment of any of the foregoing methods, the method further comprises receiving the forecasted power consumption data from the ML model and storing the forecasted power consumption data in a data store.

In a further embodiment of any of the foregoing methods, the method further comprises: receiving power consumption data associated with the DC; determining a time-series dataset based on the power consumption data, the time-series data set indicating power consumed by the DC over time; and training the ML model to determine the forecasted power consumption data.

In a further embodiment of any of the foregoing methods, the time-series dataset comprises power consumed by the DC from a first date to a second date.

In a further embodiment of any of the foregoing methods, said determining the time-series dataset comprises: determining, based on the power consumption data, a first value of a maximum power consumed in a first interval between the first date and the second date; and determining, based on the power consumption data, a second value of a maximum power consumed in a second interval between the first date and the second date.

In a further embodiment of any of the foregoing methods, the first value of the maximum power is determined to be zero based on the power consumption data not including data for the first interval.

In a further embodiment of any of the foregoing methods, the method further comprises: causing the window recommendation result to be presented in a user interface of a computing device; responsive to user interaction with the user interface, receiving a selection of the first window; and causing the requested maintenance task to be scheduled based on the received selection.

In a further embodiment of any of the foregoing methods, the maintenance task is with respect to a first power cell of the DC.

In a further embodiment of any of the foregoing methods, the method further comprises utilizing the ML model to determine if a cell impact on performance of a second cell of the DC by the requested maintenance task satisfies the impact criterion.

In a further embodiment of any of the foregoing methods, the method further comprises: if the cell impact satisfies the impact criterion, causing data stored by the first cell to be transferred to the second cell.

In a further embodiment of any of the foregoing methods, the DC comprises the first power cell and a second power cell. The method further comprises: determining a period of time where impact on performance of the first power cell by tasks satisfies a first cell impact criterion; and determining a period of time where impact on performance of the second power cell by tasks satisfies a second sell impact criterion.

In a further embodiment of any of the foregoing methods, the method further comprises determining the impact criterion based on a date range included in the maintenance window request.

A system is described herein. The system comprising a processor and a memory. The memory stores program code executable by the processor circuit to perform any of the described methods.

A computer-readable storage medium having programming instructions encoded thereon is described herein. The programming instructions structured to cause a processor to perform any of the described methods.

X. Conclusion

References in the specification to “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being “in response to” one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where “based on” is used to indicate an effect being a result of an indicated cause, it is to be understood that the effect is not required to only result from the indicated cause, but that any number of possible additional causes may also contribute to the effect. Thus, as used herein, the term “based on” should be understood to be equivalent to the term “based at least on.”

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Further still, example embodiments have been described with respect to determining power consumption of a DC. However it is also contemplated herein that embodiments may be utilized to analyze power consumption of any type of server system, including a standalone server rack, a set of server racks, a dedicated tile of server racks, a room of tiles, and/or the like.

Further still, example embodiments have been described with respect to ZRP DCs. However, embodiments described herein are not so limited. For instance, in some cases, embodiments described herein are implemented in non-ZRP DCs (e.g., DCs that operate with reserved power) or nearly ZRP DCs (e.g., DCs that operate with a reduced reserved power (e.g., 33% reserved power, 25% reserved power, 10% reserved power, and/or the like).

Moreover, according to the described embodiments and techniques, any components of systems, computing devices, servers, applications, power forecasting systems, maintenance window validators, ML models, DCs, data stores, and/or their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system comprising:
- a processor;
- a memory that stores program code executable by the processor, the program code comprising:
  - a maintenance window determiner that:
    - receives a maintenance window request for a requested maintenance task with respect to a data center,
    - utilizes a machine learning (ML) model to determine forecasted power consumption data of the data center based on the maintenance window request, the ML model trained to forecast power consumption of the data center over intervals of time,
    - determines, based on the forecasted power consumption data, a window recommendation result comprising a window indicating a first period of time in which an impact of the requested maintenance task satisfies an impact criterion of the maintenance window request, and a task performer that:
    - performs the requested maintenance task during the window.

2. The system of claim 1, wherein:
- the requested maintenance task is with respect to a first power cell of the data center;
- the ML model comprises:
  - a first sub-model trained to determine a first portion of the forecasted power consumption data corresponding to the first power cell, and
  - a second sub-model trained to determine a second portion of the forecasted power consumption data corresponding to a second power cell of the data center; and
- to determine the window recommendation result, the maintenance window determiner further:
  - determines, based on the first portion of the forecasted power consumption data, a second period of time in which an impact on performance of the first power cell by the requested maintenance task satisfies a first cell impact criterion,
  - determines, based on the second portion of the forecasted power consumption data, a third period of time in which an impact on performance of the second power cell by the requested maintenance task satisfies a second cell impact criterion, and
  - determines the window recommendation result based on an overlap of the second period of time and the third period of time, the first period of time corresponding to the overlap.

3. The system of claim 1, wherein the requested maintenance task comprises an operation to be performed with respect to a first server of the data center, and the task performer:
- prior to the performing the requested maintenance task, migrates data stored by the first server of the data center to a second server of the data center.

4. The system of claim 1, wherein to utilize the ML model to determine forecasted power consumption data, the maintenance window determiner:
- provides the ML model with a range of dates the requested maintenance task is to be performed within; and
- receives, from the ML model, the forecasted power consumption data comprising forecast of power consumed by the data center over a set of intervals within the range of dates.

5. The system of claim 1, wherein the maintenance window determiner causes the ML model to determine the forecasted power consumption data prior to the maintenance window determiner receiving the maintenance window request.

6. The system of claim 1, wherein the maintenance window determiner:
- causes the window recommendation result to be presented in a user interface of a computing device;
- responsive to user interaction with the user interface, receives a selection of the window; and
- causes the requested maintenance task to be scheduled based on the received selection.

7. The system of claim 1, wherein the requested maintenance task is with respect to a first power cell of the data center and the maintenance window determiner:
- determines that a cell impact on performance of a second cell of the data center by the requested maintenance task satisfies the impact criterion; and
- subsequent to determining the cell impact satisfies the impact criterion, causes data stored by the first cell to be transferred to the second cell.

8. The system of claim 1, wherein the maintenance window determiner:
- determines the impact criterion based on a date range included in the maintenance window request.

9. A computer-implemented method comprising:
- receiving a maintenance window request for a requested maintenance task with respect to a data center;

determining forecasted power consumption data of the data center based on the maintenance window request, the forecasted power consumption data representative of an estimation of power consumed by the data center;

determining, based on the forecasted power consumption data, a window recommendation result comprising a window indicating a first period of time in which an impact of the requested maintenance task satisfies an impact criterion of the maintenance window request; and causing the requested maintenance task to be performed during the window.

10. The computer-implemented method of claim 9, wherein said determining the forecasted power consumption data comprises:

utilizing a machine learning (ML) model to determine the forecasted power consumption data, the ML model trained to forecast power consumption of the data center over intervals of time.

11. The computer-implemented method of claim 10, wherein:

the requested maintenance task is with respect to a first power cell of the data center;

the ML model comprises:

a first sub-model trained to determine a first portion of the forecasted power consumption data corresponding to the first power cell, and a second sub-model trained to determine a second portion of the forecasted power consumption data corresponding to a second power cell of the data center; and said determining the window recommendation result comprises:

determining, based on the first portion of the forecasted power consumption data, a second period of time in which an impact on performance of the first power cell by the requested maintenance task satisfies a first cell impact criterion, determining, based on the second portion of the forecasted power consumption data, a third period of time in which an impact on performance of the second power cell by the requested maintenance task satisfies a second cell impact criterion, and determining the window recommendation result based on an overlap of the second period of time and the third period of time, the first period of time corresponding to the overlap.

12. The computer-implemented method of claim 10, wherein said utilizing the ML model to determine forecasted power consumption data comprises:

providing the ML model with a range of dates the requested maintenance task is to be performed within; and receiving, from the ML model, the forecasted power consumption data comprising forecast of power consumed by the data center over a set of intervals within the range of dates.

13. The computer-implemented method of claim 10, wherein said utilizing the ML model to determine forecasted power consumption data is prior to said receiving the maintenance window request.

14. The computer-implemented method of claim 9, wherein the requested maintenance task comprises an operation to be performed with respect to a first server of the data center, and the method further comprises:

prior to the performing the requested maintenance task, migrating data stored by the first server of the data center to a second server of the data center.

15. The computer-implemented method of claim 9, further comprising:

causing the window recommendation result to be presented in a user interface of a computing device;

responsive to user interaction with the user interface, receiving a selection of the window; and causing the requested maintenance task to be scheduled based on the received selection.

16. The computer-implemented method of claim 9, wherein the requested maintenance task is with respect to a first power cell of the data center and the method further comprises:

determining that a cell impact on performance of a second cell of the data center by the requested maintenance task satisfies the impact criterion; and subsequent to determining the cell impact satisfies the impact criterion, causing data stored by the first cell to be transferred to the second cell.

17. The computer-implemented method of claim 9, further comprising:

determining the impact criterion based on a date range included in the maintenance window request.

18. A computer-readable storage medium having programming instructions encoded thereon, the programming instructions structured to cause a processor to perform a method comprising:

receiving a maintenance window request for a requested maintenance task with respect to a data center;

utilizing a machine learning (ML) model to determine forecasted power consumption data of the data center based on the maintenance window request, the ML model trained to forecast power consumption of the data center over intervals of time;

determining, based on the forecasted power consumption data, a window recommendation result comprising a window indicating a first period of time in which an impact of the requested maintenance task satisfies an impact criterion of the maintenance window request; and causing the requested maintenance task to be performed during the window.

19. The computer-readable storage medium of claim 18, wherein the requested maintenance task comprises an operation to be performed with respect to a first server of the data center, and the method further comprises:

prior to the performing the requested maintenance task, migrating data stored by the first server of the data center to a second server of the data center.

20. The computer-readable storage medium of claim 18, wherein the method further comprises:

causing the window recommendation result to be presented in a user interface of a computing device;

responsive to user interaction with the user interface, receiving a selection of the window; and causing the requested maintenance task to be scheduled based on the received selection.

* * * * *